(12) United States Patent
Martin et al.

(10) Patent No.: US 7,023,439 B2
(45) Date of Patent: Apr. 4, 2006

(54) ACTIVATING A FILLING OF A GRAPHICAL OBJECT

(75) Inventors: Michael Anthony Martin, North Ryde (AU); Michael John Webb, West Denistone (AU); Alexander Will, Eastwood (AU); Matthew William Gallagher, Ryde (AU); Alexander Vincent Danilo, Killarney Heights (AU)

(73) Assignee: Canon Kabushiki Kaisha, Tokyo (JP)

( * ) Notice: Subject to any disclaimer, the term of this patent is extended or adjusted under 35 U.S.C. 154(b) by 481 days.

(21) Appl. No.: 10/283,237

(22) Filed: Oct. 30, 2002

(65) Prior Publication Data
US 2003/0179200 A1 Sep. 25, 2003

(30) Foreign Application Priority Data
Oct. 31, 2001 (AU) .................................. PR 8609

(51) Int. Cl.
*G06T 17/00* (2006.01)
(52) U.S. Cl. .................. 345/428; 345/469.1; 345/470; 345/163 FOR
(58) Field of Classification Search ................ 345/421, 345/428, 469.1, 470, FOR. 163; 382/199, 382/267, 268
See application file for complete search history.

(56) References Cited

U.S. PATENT DOCUMENTS
5,471,568 A 11/1995 Webb et al. ................ 395/133
5,625,768 A 4/1997 Dye ............................ 395/141

(Continued)

FOREIGN PATENT DOCUMENTS
EP 323558 A * 7/1989

OTHER PUBLICATIONS
Porter, T., et al., "*Compositing Digital Images*," Computer Graphics, vol. 18, No. 3 (Jul. 1984), pp. 253-259.

*Primary Examiner*—Matthew C. Bella
*Assistant Examiner*—G. F. Cunningham
(74) *Attorney, Agent, or Firm*—Fitzpatrick, Cella, Harper & Scinto

(57) ABSTRACT

A method is disclosed for activating the filling of a graphical object. The method generates, for a current scanline, a plurality of edge records associated with an edge of the object from a previously generated edge record for a previous scanline. One of these edge records comprises fractional data which defines a minimum position of the edge within the current scanline or on a border thereto with respect to a direction along said current scanline. Another of these edge records comprises fractional data which defines a maximum position of the edge within the current scanline or on a border thereto with respect to a direction along the current scanline. One of these edge records comprises fractional data which defines an exit position of the edge from the current scanline. The previously generated edge record comprises fractional data defining an exit point of the edge from the previous scanline. After the edge record generation step, the method then activates, for the current scanline, the filling of the graphical object over a run of pixels or pixel from a minimum pixel position to a maximum pixel position. The minimum pixel position is derived from rounding down a value equal to the fractional data of the edge record defining the minimum position, and the maximum pixel position is derived from rounding up a value equal to the fractional data of the edge record defining the maximum position.

27 Claims, 34 Drawing Sheets

U.S. PATENT DOCUMENTS

| | | |
|---|---|---|
| 6,288,724 B1 | 9/2001 | Kumar et al. ............... 345/434 |
| 6,341,020 B1 | 1/2002 | Rumph et al. ............... 358/1.9 |
| 6,483,519 B1 * | 11/2002 | Long et al. ................. 345/619 |
| 2002/0015039 A1 * | 2/2002 | Moore ....................... 345/421 |

* cited by examiner

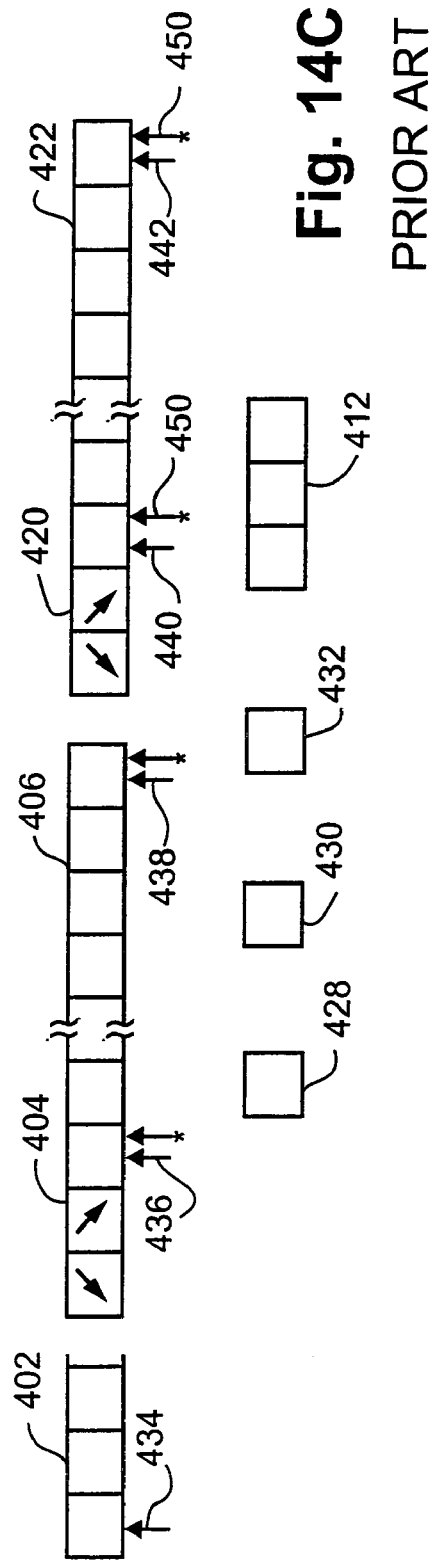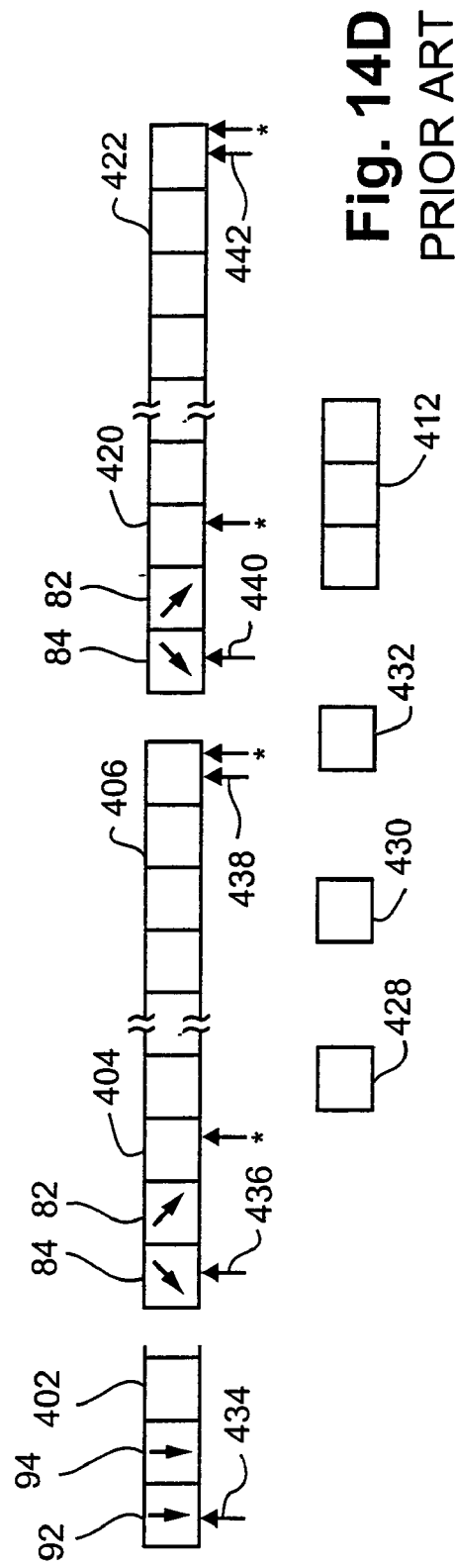

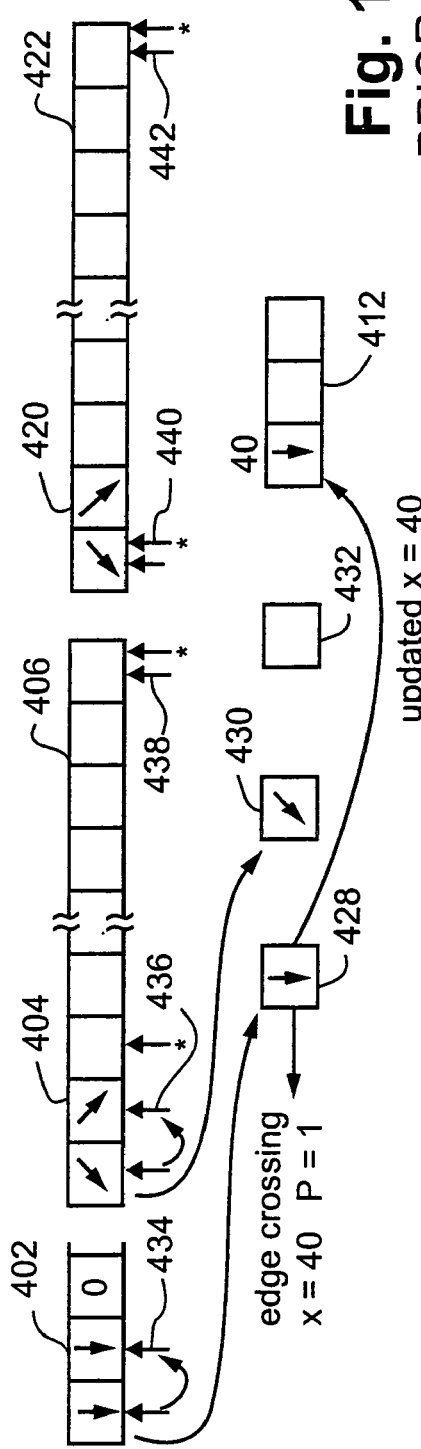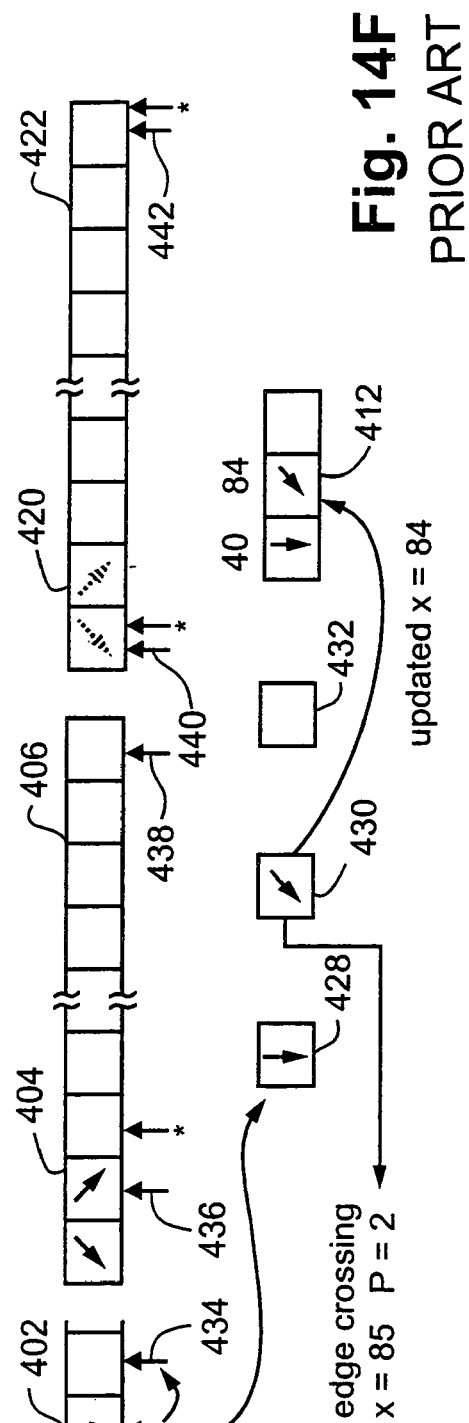

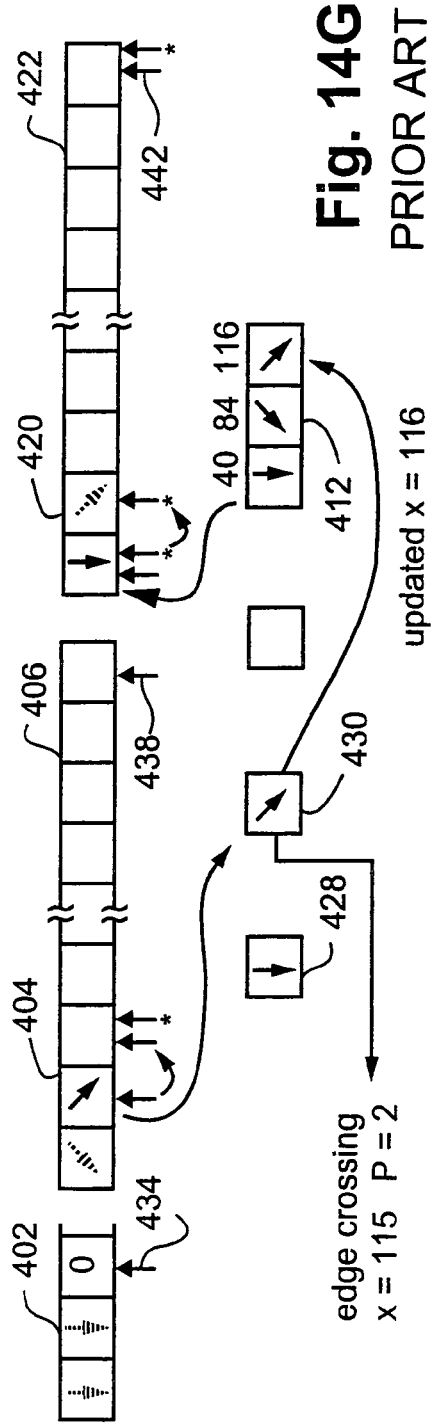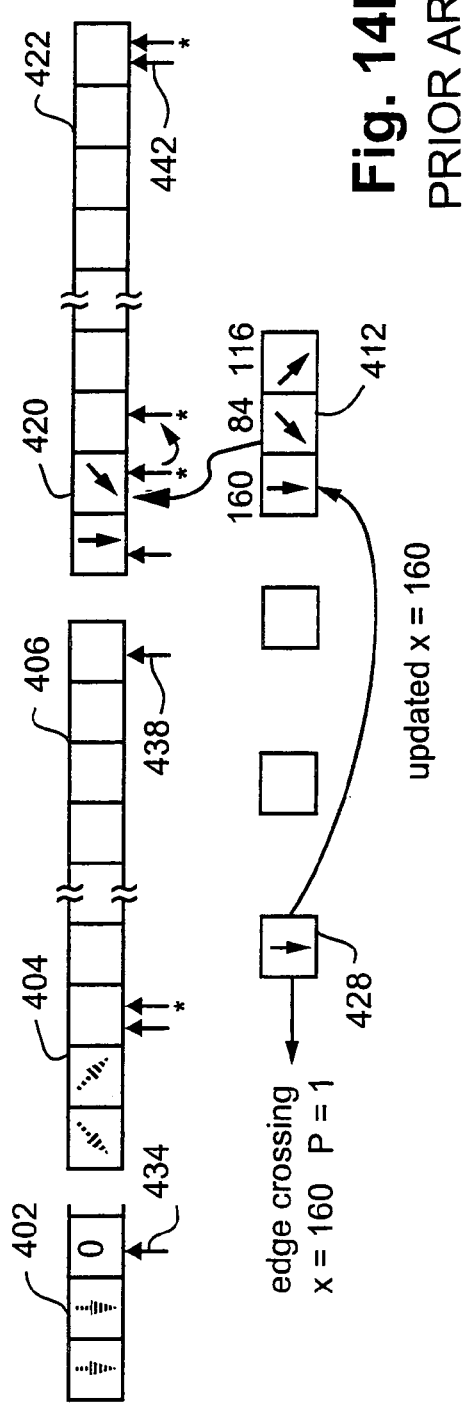

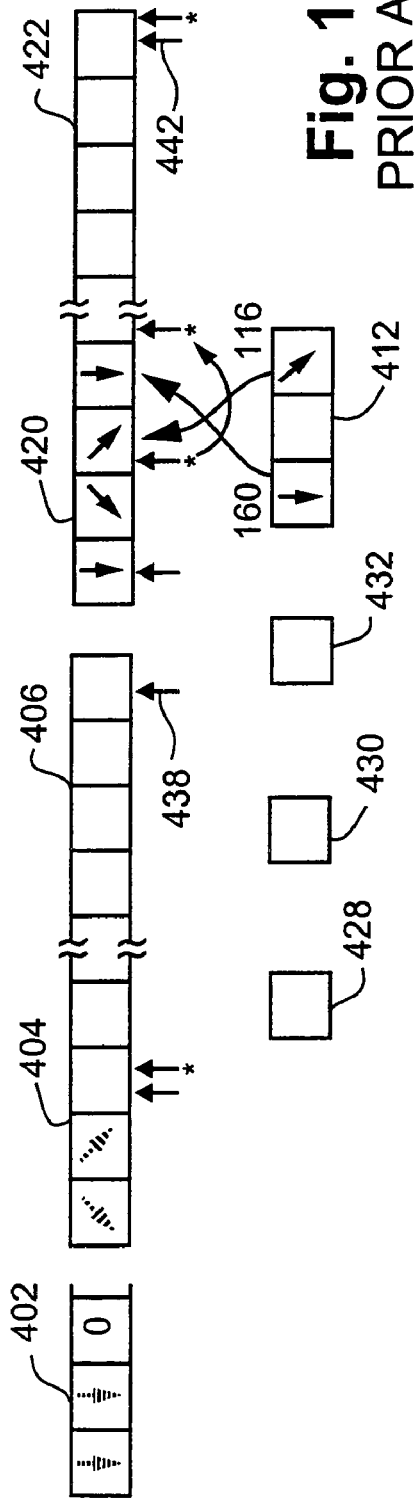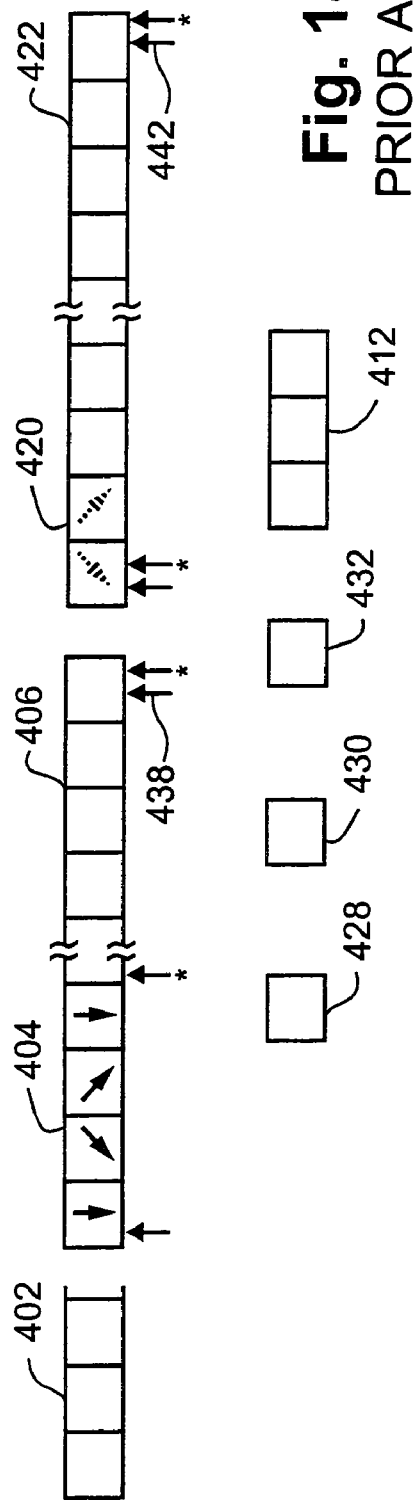
Fig. 14I PRIOR ART
Fig. 14J PRIOR ART

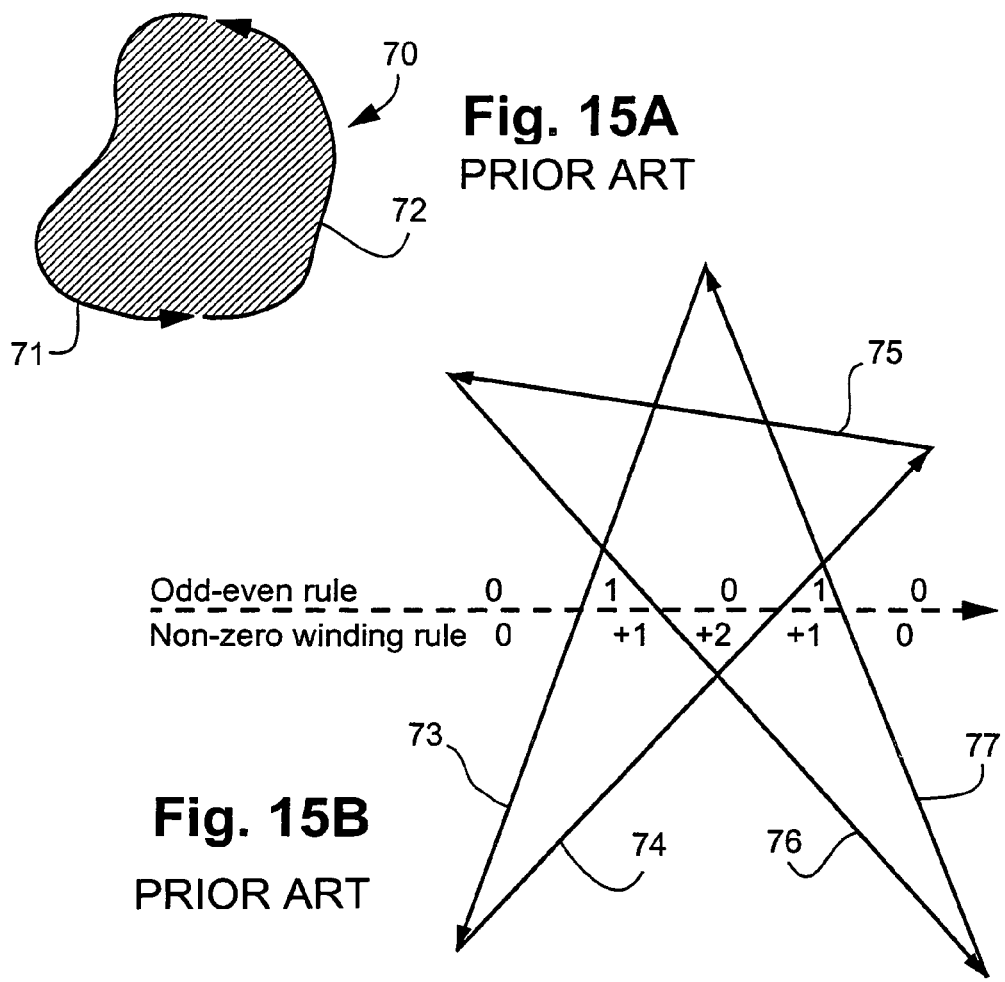
Fig. 15A
PRIOR ART
Fig. 15B
PRIOR ART
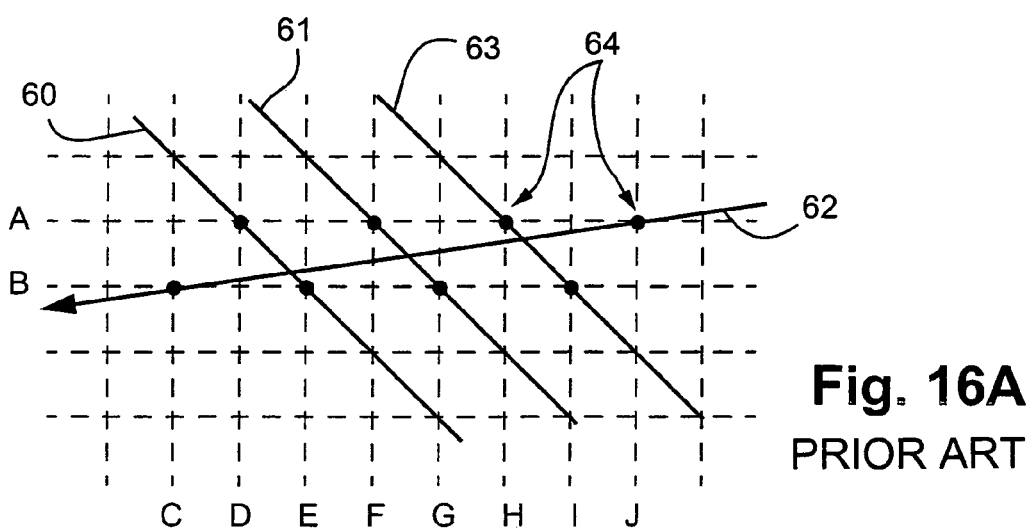
Fig. 16A
PRIOR ART

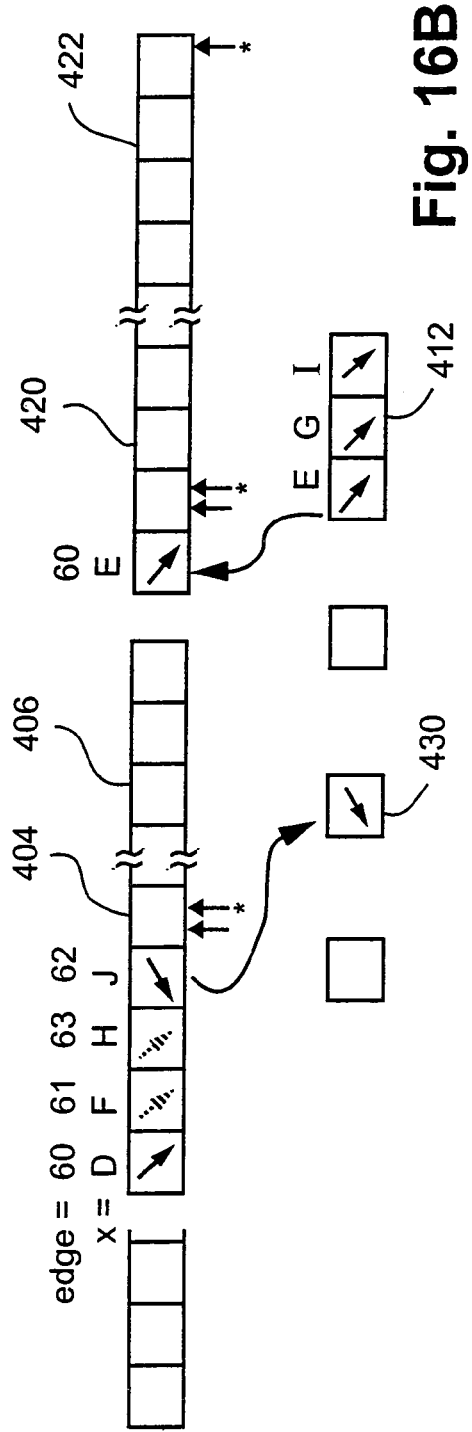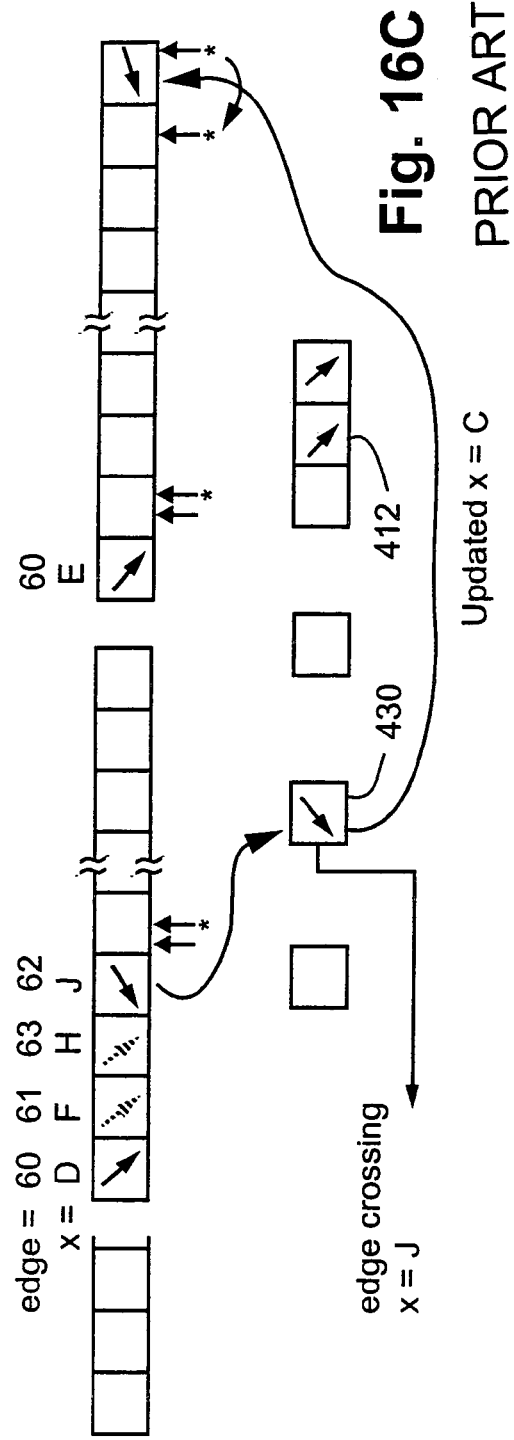

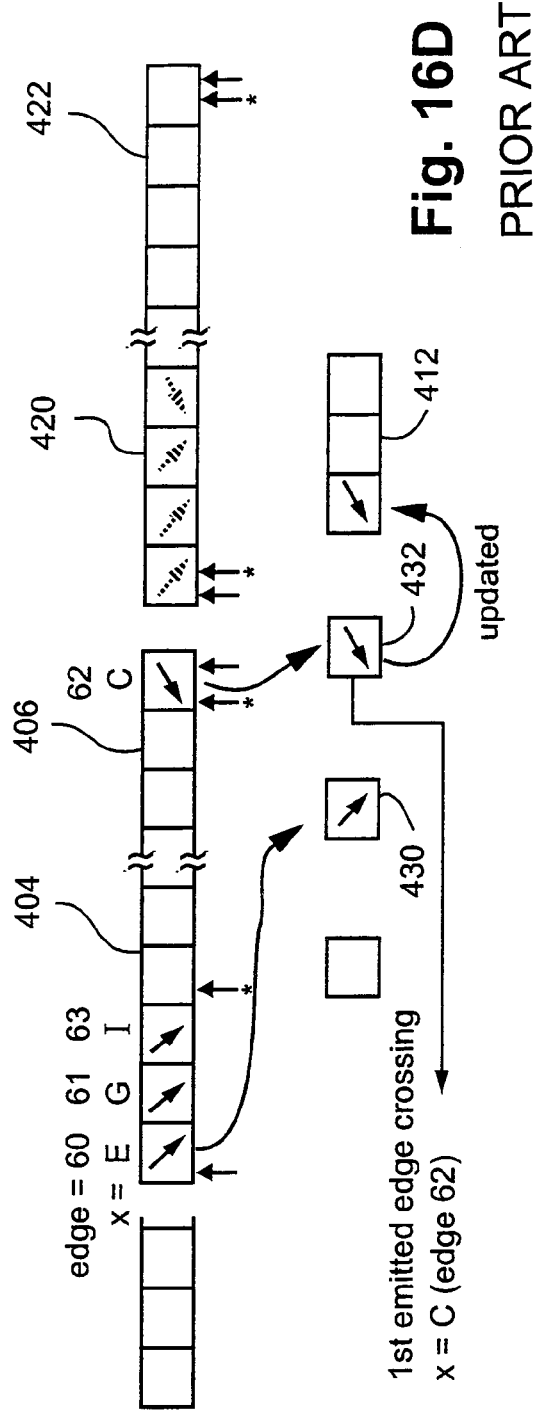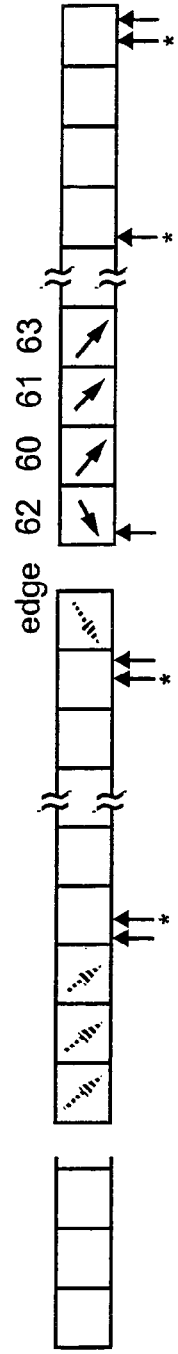
Fig. 16D PRIOR ART
Fig. 16E PRIOR ART

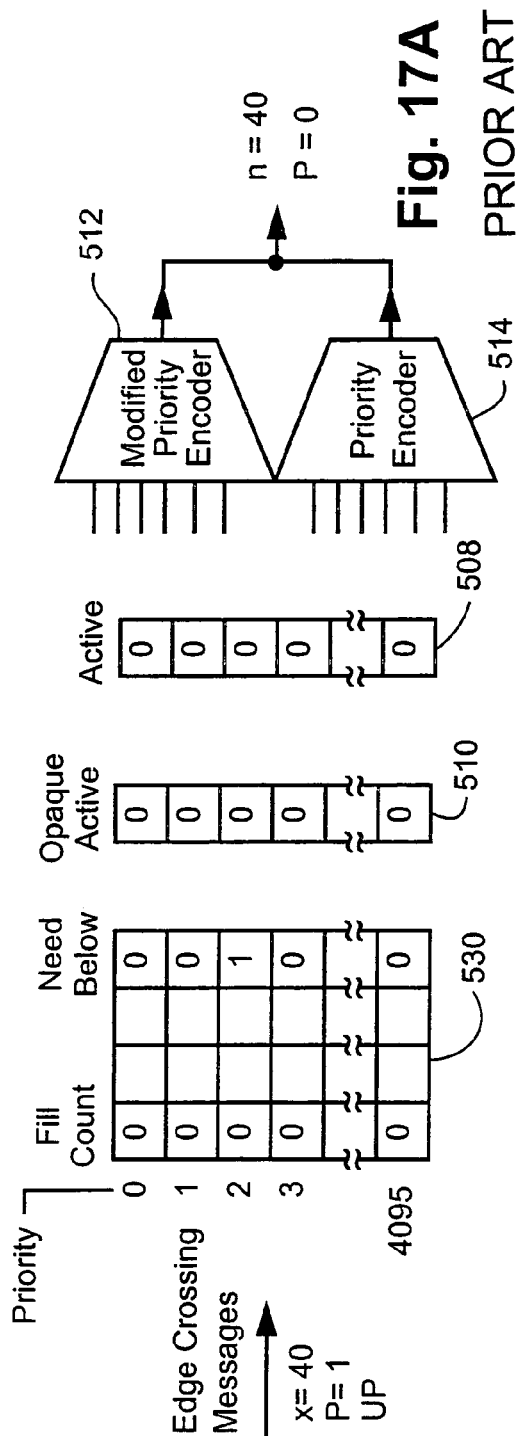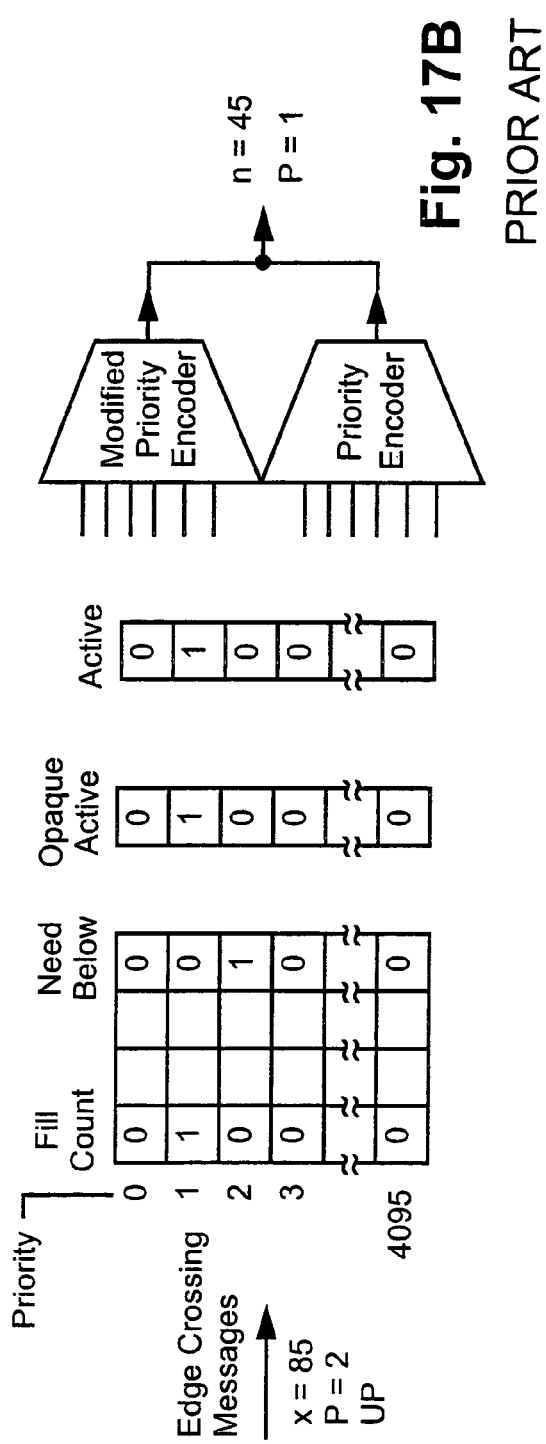
Fig. 17A PRIOR ART
Fig. 17B PRIOR ART

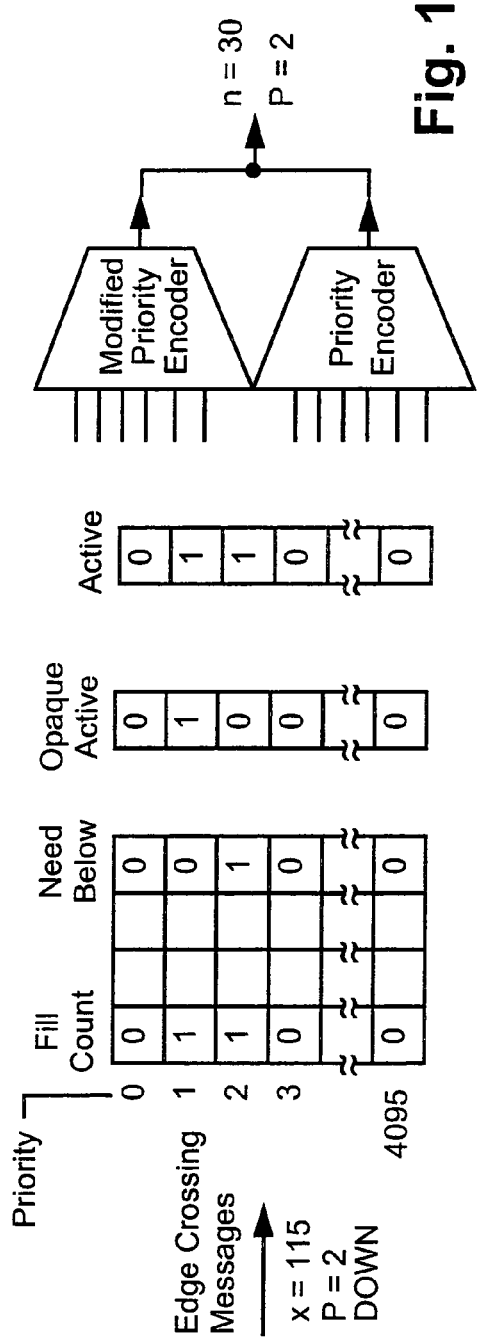
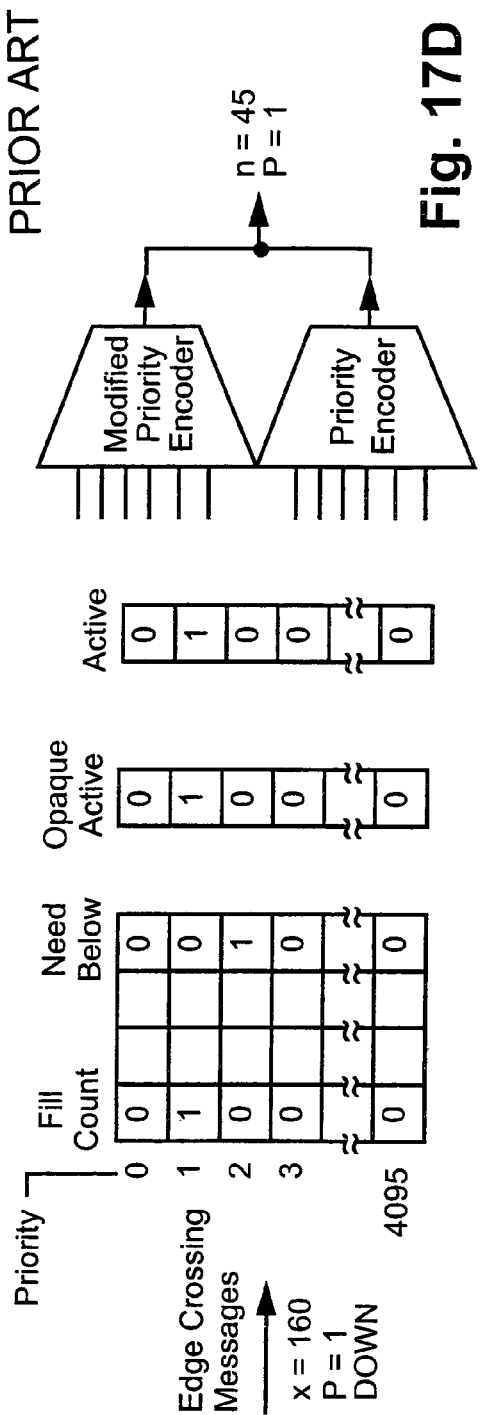

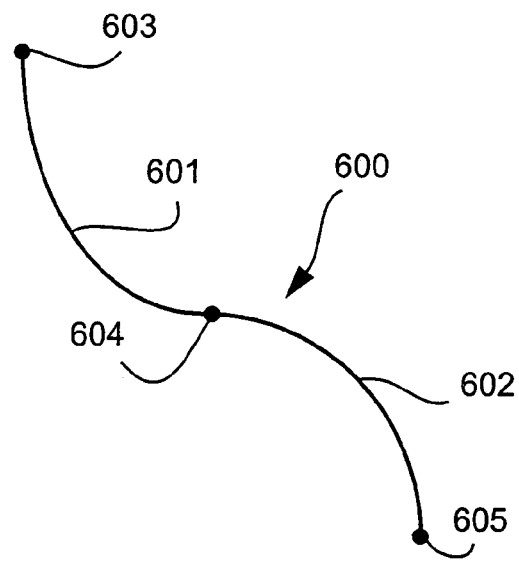
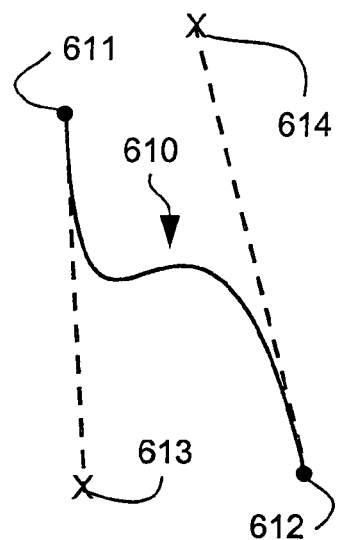
**Fig. 18A
(Prior Art)**
**Fig. 18B
(Prior Art)**
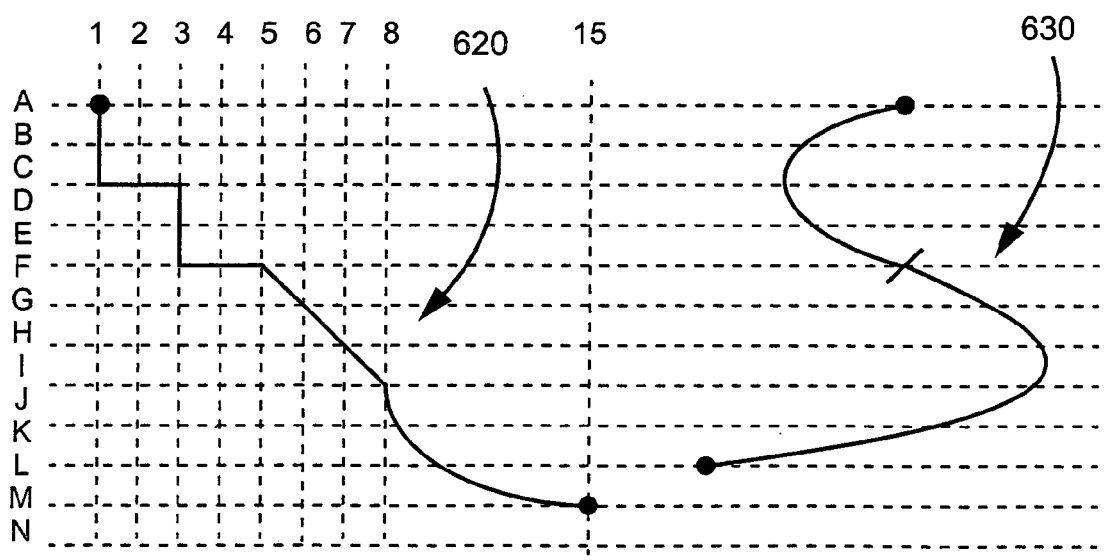
Fig. 18C
PRIOR ART
Fig. 18D
PRIOR ART

| | Fill Count | Clip Count | Fill Rule | Src_Active (S) | Dest_Active (D) | S∩D̄ op | S∩D op | S̄∩D op | data_in_S∩D̄ | data_in_S∩D | data_in_S̄∩D | Next Level | Data_is_Src (Data is Dest) | Node active |
|---|---|---|---|---|---|---|---|---|---|---|---|---|---|---|
| ... | | | | | | ... | ... | ... | | | | | | |
| over | | | | 1 | 1 | NOP | over | NOP | 1 | 1 | 1 | | ? | 1 |
| Op1 | | | | 1 | 0 | Op1a | Op1b | Op1c | 1 | 1 | 1 | over* | 1 | 1 |
| AOp2 | | | | 1 | 0 | AOp2aB | AOp2bB | PopB | 1 | 1 | 0 | Op1* | 1 | 1 |
| B | | | | | 0 | Push B | Push B | NOP | 0 | 0 | 0 | AOp2* | 0 | 0 |
| C | | | | | 0 | Push C | Push C | NOP | 0 | 0 | 0 | Op1* | 0 | 0 |

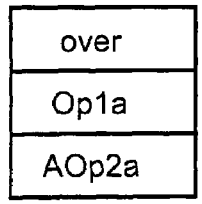
Fig. 22B
PRIOR ART
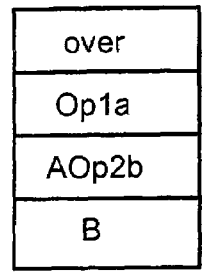
Fig. 22D
PRIOR ART
| | Fill Counter | Clip Counter | Fill Rule | Src_Active (S) | Dest_Active (D) | S∩D̄ op | S∩D op | S̄∩D op | data_in_S∩D̄ | data_in_S∩D | data_in_S̄∩D | Next Level | Data_is_Src (Data is Dest) | Node active |
|---|---|---|---|---|---|---|---|---|---|---|---|---|---|---|
| ... | | | | | | ... | ... | ... | | | | | | |
| over | | | | 1 | 1 | NOP | over | NOP | 1 | 1 | 1 | | ? | 1 |
| Op1 | | | | 1 | 0 | Op1a | Op1b | Op1c | 1 | 1 | 1 | over* | 1 | 1 |
| AOp2 | | | | 1 | 1 | AOp2aB | AOp2bB | PopB | 1 | 1 | 0 | Op1* | 1 | 1 |
| B | | | | | 1 | Push B | Push B | NOP | 1 | 1 | 0 | AOp2* | 0 | 1 |
| C | | | | | 0 | Push C | Push C | NOP | 0 | 0 | 0 | Op1* | 0 | 0 |
Fig. 22C
PRIOR ART

| | Fill Counter | Clip Counter | Fill Rule | Src_Active (S) | Dest_Active (D) | S∩D̄ op | S∩D op | S̄∩D op | data_in S∩D̄ | data_in S∩D | data_in S̄∩D | Next Level | Data_is_Src (Data is Dest) | Node active |
|---|---|---|---|---|---|---|---|---|---|---|---|---|---|---|
| ... | | | | | | ... | ... | ... | | | | | | |
| over | | | | 1 | 1 | NOP | over | NOP | 1 | 1 | 1 | | ? | 1 |
| Op1 | | | | 1 | 1 | Op1a | Op1b | Op1c | 1 | 1 | 1 | over* | 1 | 1 |
| AOp2 | | | | 1 | 1 | AOp2aB | AOp2bB | PopB | 1 | 1 | 0 | Op1* | 1 | 1 |
| B | | | | | 1 | Push B | Push B | NOP | 1 | 1 | 0 | AOp2* | 0 | 1 |
| C | | | | | 1 | Push C | Push C | NOP | 1 | 1 | 0 | Op1* | 0 | 1 |

| Override Counter | Fill Counter | Clip Counter | Fill Rule |
|---|---|---|---|
| 0 | f | x | 0 |
| 0 | f | x | 0 |
| 0 | f | x | 0 |
| 0 | f | x | 0 |

▨ Fill count non-zero

▧ override count non-zero

ACTIVATING A FILLING OF A GRAPHICAL OBJECT

FIELD OF THE INVENTION

The present invention relates to printing and/or display and in particular to activating a filling of a graphical object.

BACKGROUND

When rendering a page for printing and/or display, an intermediate description of the page is often given in a page description language, such as PostScript™ and PCL; or equivalently, as a set of descriptions of graphics objects provided in function calls to a graphics interface, such as the Windows GDI or X-11. The rules for rasterizing an object, whose description has been provided in terms of an edge on the page, are an inherent feature of the interface or page description language and vary according to the type of interface or page description language being used. The page is typically rendered for printing and/or display via said graphics interface by an object based graphics system.

Most of these object based graphics systems utilize a frame store or page buffer to hold a pixel-based image of the page or screen for subsequent printing and/or display. Typically, the outlines of the graphic objects are calculated, filled and written into the frame store. For two-dimensional graphics, objects which appear in front of other objects are simply written into the frame store after the background objects, thereby replacing the background on a pixel-by-pixel basis. This is commonly known in the art as the "Painter's algorithm". Objects are considered in priority order, from the rearmost object to the foremost object, and, typically, each object is rasterized in scan line order and pixels are written to the frame store in sequential runs along each scan line.

There are essentially two problems with this technique. The first is that it requires fast random access to all the pixels in the frame store. This is because each new object considered could affect any pixel in the frame-store. For this reason, the frame store is normally kept in semiconductor random access memory (RAM). For high resolution color printers the amount of RAM required is very large, typically in excess of 100 MBytes, which is costly and difficult to operate at high speed. The second problem is that many pixels, which are painted (rendered), are over-painted (re-rendered) by later objects. Painting the pixels with the earlier objects was a waste of time.

One method for overcoming the large frame-store problem is the use of "banding". When banding is used, only part of the frame-store exists in memory at any one time. All of the objects to be drawn are retained in a "display list". The whole image is rendered as above, but pixel painting (rendering) operations that try to paint (render) outside the fraction of the frame-store which exists are "clipped" out. After all the objects have been drawn, the fractional part of the frame-store is sent to the printer (or some other location) and another fraction of the frame-store is selected and the process repeated. There are penalties with this technique. For example, the objects being drawn must be considered and re-considered many times—once for each band. As the number of bands increases, so too does the repetitious examination of objects requiring rendering. The technique of banding does not solve the problem of the cost of over-painting.

Some other graphic systems consider the image in scan line order. Again, all the objects to be drawn are retained in a display list. On each scan line the objects which intersect that scan line are then considered in priority order and for each object, spans of pixels between object edge intersection points are set in a line store. This technique also overcomes the large frame store problem, but still suffers from the over-paint problem.

Other graphic systems utilize pixel sequential rendering which overcomes both the large frame store problem and over-paint problem. In these systems, each scan line is produced in turn. Again, all the objects to be drawn are retained in a display list. On each scan line, the edges of objects which intersect that scan line are held in increasing order of their intersection with the scan line. These points of intersection, or edge crossings, are considered in turn and used to toggle an array of active fields. There is one active field for each object priority that is of interest on the scan line. Between each pair of edges considered, the color data for each pixel which lies between the first edge and the next edge is generated by using a priority encoder on the active flags to determine which priority is topmost, and using the color associated with that priority for the pixels of the span between the two edges. In preparation for the next scan line, the coordinate of intersection of each edge is updated in accordance with the nature of each edge. Adjacent edges, which become mis-sorted as a result of this update are swapped. New edges are also merged into the list of edges.

These graphic systems which use pixel sequential rendering have significant advantages in that there is no frame store or line store, there is no over painting, and the object priorities are dealt with in constant order time, rather than order N time (where N is the number of priorities). In these pixel sequential rendering graphic systems, the edges of objects are tracked independently of each other. These systems will render a reliable representation of the page provided that the rasterization rule, inherent in the graphics interface or page description language, for rounding the edge positions is the same for activation and deactivation of an object.

Turning now to FIG. 2A, there is illustrated one scanline 200a of an image comprising a plurality of pixels (represented as boxes) and two edges 202a, 203a of an exemplary object for explaining a typical prior art rasterization rule of a page description language. In this rasterization rule, the location of the edge crossing points (e.g., 204a, 205a) of the edges (e.g., 202a, 203a) are always mathematically rounded up to the location of the top left hand corner of the next pixel for both the activation and de-activation of an object. In this particular example, the active pixels of the object, that is all those pixels filled by the object are shown as boxes with cross-hatched filling. A typical pixel sequential rendering graphic system is able to implement such a rasterization rule as it can be applied to each edge independently irrespective of whether the object is to be activated or de-activated. However, there are page description languages and interfaces where the rasterization rule for rounding of edge position is dependent on whether an object is being activated or deactivated. A particular case in point is the prior art rasterization rule of the page description language PostScript™, that specifies that all pixels, which are touched by the edges of an object, are filled by that object.

Turning now to FIG. 1, there is illustrated a plurality of scanlines 100a of an image each comprising a plurality of pixels (represented as boxes) and a number of edges 102a, 104a, 106a, 108a of an exemplary object for explaining such a rasterization rule. Again, the active pixels of the object, that is all those pixels filled by the object are shown as boxes with cross-hatched filling. As can be seen all those pixels touched by the edges 102a, 104a, 106a, 108a of the exemplary object are active. Thus, the position of the edge must be rounded down for activation, and rounded up for de-activation. Turning now to FIG. 2B, there is illustrated one scanline 210b of an image comprising a plurality of pixels (represented as boxes) and two edges 212b, 213b of an exemplary object for explaining the prior art rasterization rule of the page description language PostScript™ in more detail. The two edges 212b, 213b of the exemplary object intersect the scanline 210b at entry points 218b, 214b and exits points 220b, 216b respectively. Again, the active pixels of the object are shown as boxes with cross-hatched filling. As can be seen all those pixels touched by the edges 212b, 213b of the exemplary object are active. Thus, the minimum position of the entry or exit positions 218b, 220b of the edge 212b must be mathematically rounded down for activation, and the maximum position of the entry or exit positions 214b, 216b of the edge 213b must be mathematically rounded up for de-activation. Also, because an edge may track across several pixels in the course of traversing a scanline, the extent of any such excursion must be activated, regardless of the entry and exit points of the edge. However typical pixel sequential rendering graphic systems apply the same rasterization rule for rounding of each edge irrespective whether the object is to be activated or de-activated. Consequently this results in the pixel sequential rendering graphic systems rendering an unreliable representation of the object in the cases where the rasterization rule for rounding of edge position inherent in the page description language and graphic interface is dependent on whether the object is being activated or de-activated.

SUMMARY

It is an object of the present invention to substantially overcome, or at least ameliorate, one or more disadvantages of existing arrangements.

According to one aspect of the invention, there is provided a method of activating a filling of a graphical object, the method comprising the steps of: generating, for a current scanline, a plurality of edge records associated with an edge of the object from a previously generated said edge record for a previous scanline, wherein one of said edge records for the current scanline comprise fractional data which defines a minimum position of the edge within the current scanline or on a border thereto with respect to a direction along said current scanline, one of said edge records for the current scanline comprise fractional data which defines a maximum position of the edge within the current scanline or on a border thereto with respect to a direction along said current scanline, and one of said edge records for the current scanline comprise fractional data which defines an exit position of the edge from the current scanline, and wherein said previously generated edge record comprises fractional data defining a exit point of the edge from the previous scanline; and activating, for the current scanline, the filling of the graphical object over a run of pixels or pixel from a minimum pixel position to a maximum pixel position, wherein said minimum pixel position is derived from rounding down a value equal to said fractional data of said edge record defining said minimum position, and said maximum pixel position is derived from rounding up a value equal to said fractional data of said edge record defining said maximum position.

According to another aspect of the invention, there is provided apparatus for activating a filling of a graphical object, the apparatus comprising: a module for generating, for a current scanline, a plurality of edge records associated with an edge of the object from a previously generated said edge record for a previous scanline, wherein one of said edge records for the current scanline comprise fractional data which defines a minimum position of the edge within the current scanline or on a border thereto with respect to a direction along said current scanline, one of said edge records for the current scanline comprise fractional data which defines a maximum position of the edge within the current scanline or on a border thereto with respect to a direction along said current scanline, and one of said edge records for the current scanline comprise fractional data which defines an exit position of the edge from the current scanline, and wherein said previously generated edge record comprises fractional data defining a exit point of the edge from the previous scanline; and a module for activating, for the current scanline, the filling of the graphical object over a run of pixels or pixel from a minimum pixel position to a maximum pixel position, wherein said minimum pixel position is derived from rounding down a value equal to said fractional data of said edge record defining said minimum position, and said maximum pixel position is derived from rounding up a value equal to said fractional data of said edge record defining said maximum position.

According to another aspect of the invention, there is provided a computer program for activating a filling of a graphical object, the computer program comprising: code for generating, for a current scanline, a plurality of edge records associated with an edge of the object from a previously generated said edge record for a previous scanline, wherein one of said edge records for the current scanline comprise fractional data which defines a minimum position of the edge within the current scanline or on a border thereto with respect to a direction along said current scanline, one of said edge records for the current scanline comprise fractional data which defines a maximum position of the edge within the current scanline or on a border thereto with respect to a direction along said current scanline, and one of said edge records for the current scanline comprise fractional data which defines an exit position of the edge from the current scanline, and wherein said previously generated edge record comprises fractional data defining a exit point of the edge from the previous scanline; and code for activating, for the current scanline, the filling of the graphical object over a run of pixels or pixel from a minimum pixel position to a maximum pixel position, wherein said minimum pixel position is derived from rounding down a value equal to said fractional data of said edge record defining said minimum position, and said maximum pixel position is derived from rounding up a value equal to said fractional data of said edge record defining said maximum position.

According to still another aspect of the invention, there is provided a method of activating a filling of a graphical object, the method comprising the steps of: generating, for a current scanline, two edge records associated with an edge of the object from a previously generated said edge record for a previous scanline, wherein one of said edge records for the current scanline comprise data which defines a rounded down value of a minimum position of the edge within the current scanline or on a border thereto with respect to a direction along said current scanline, one of said edge records for the current scanline comprise data which defines a rounded up value of a maximum position of the edge within the current scanline or on a border thereto with respect to a direction along said current scanline, and one of said edge records for the current scanline comprise fractional data which defines an exit position of the edge from the current scanline, and wherein said previously generated edge record comprises fractional data defining a exit point of the edge from the previous scanline; and activating, for the current scanline, the filling of the graphical object over a run of pixels or pixel from the rounded down value to the rounded up value.

According to still another aspect of the invention, there is provided apparatus for activating a filling of a graphical object, the apparatus comprising: means for generating, for a current scanline, two edge records associated with an edge of the object from a previously generated said edge record for a previous scanline, wherein one of said edge records for the current scanline comprise data which defines a rounded down value of a minimum position of the edge within the current scanline or on a border thereto with respect to a direction along said current scanline, one of said edge records for the current scanline comprise data which defines a rounded up value of a maximum position of the edge within the current scanline or on a border thereto with respect to a direction along said current scanline, and one of said edge records for the current scanline comprise fractional data which defines an exit position of the edge from the current scanline, and wherein said previously generated edge record comprises fractional data defining a exit point of the edge from the previous scanline; and means for activating, for the current scanline, the filling of the graphical object over a run of pixels or pixel from the rounded down value to the rounded up value.

According to another aspect of the invention, there is provided a computer program for activating a filling of a graphical object, the computer program comprising: code for generating, for a current scanline, two edge records associated with an edge of the object from a previously generated said edge record for a previous scanline, wherein one of said edge records for the current scanline comprise data which defines a rounded down value of a minimum position of the edge within the current scanline or on a border thereto with respect to a direction along said current scanline, one of said edge records for the current scanline comprise data which defines a rounded up value of a maximum position of the edge within the current scanline or on a border thereto with respect to a direction along said current scanline, and one of said edge records for the current scanline comprise fractional data which defines an exit position of the edge from the current scanline, and wherein said previously generated edge record comprises fractional data defining a exit point of the edge from the previous scanline; and code for activating, for the current scanline, the filling of the graphical object over a run of pixels or pixel from the rounded down value to the rounded up value.

Other aspects of the invention are also disclosed.

BRIEF DESCRIPTION OF THE DRAWINGS

One or more embodiments of the present invention will now be described with reference to the drawings, in which:

FIGS. 14A to 14J illustrate the edge update routine implemented by the arrangement of FIG. 4 for the example of FIG. 10;

FIGS. 15A and 15B illustrate the odd-even and non-zero winding fill rules;

FIGS. 16A to 16E illustrate how large changes in X coordinates contribute to spill conditions and how they are handled;

FIGS. 17A to 17E illustrates the priority filling routine implemented by the arrangement of FIG. 7;

FIGS. 18A to 18D provide a comparison between two prior art edge description formats and that used in the preferred apparatus;

FIG. 21 is an example expression tree;

FIGS. 22A to 22F depict an activity table evaluation of the expression of FIG. 21 and the corresponding compositing stacks during such evaluation;

DETAILED DESCRIPTION INCLUDING BEST MODE

Figure 1:
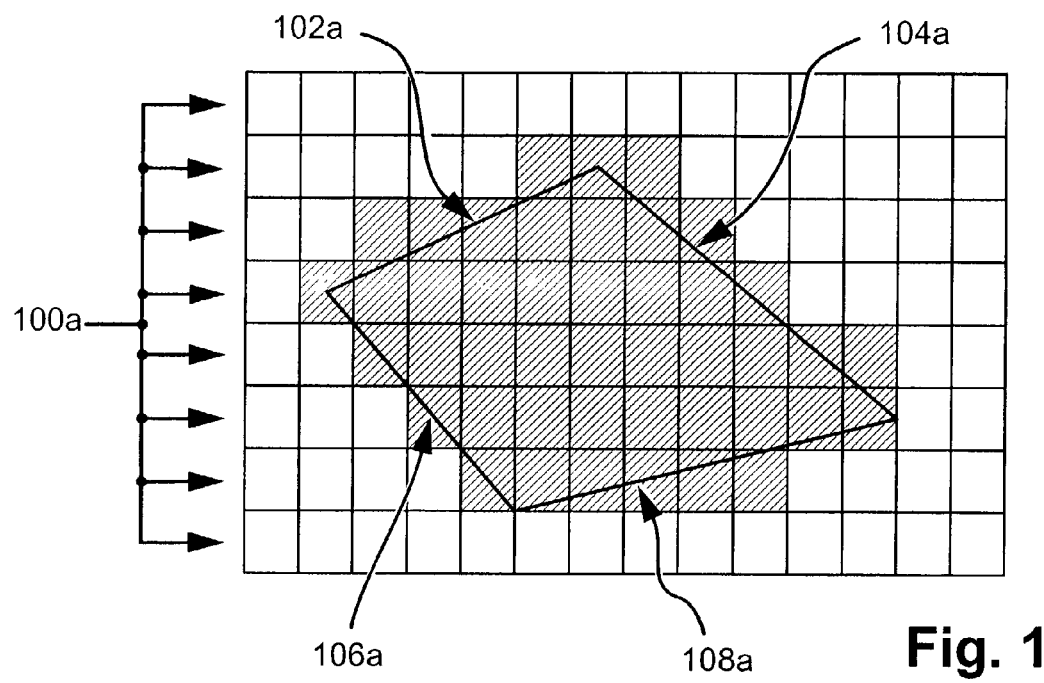
FIG. 1 illustrates a plurality of scanlines of an image each comprising a plurality of pixels and a number of edges of an exemplary object for explaining the rasterization rule of the page description language PostScript™.

Where reference is made in any one or more of the accompanying drawings to steps and/or features, which have the same reference numerals, those steps and/or features have for the purposes of this description the same function(s) or operation(s), unless the contrary intention appears.

1.0 System for Rendering and Presentation of Computer Graphic Object Images

Figure 3:
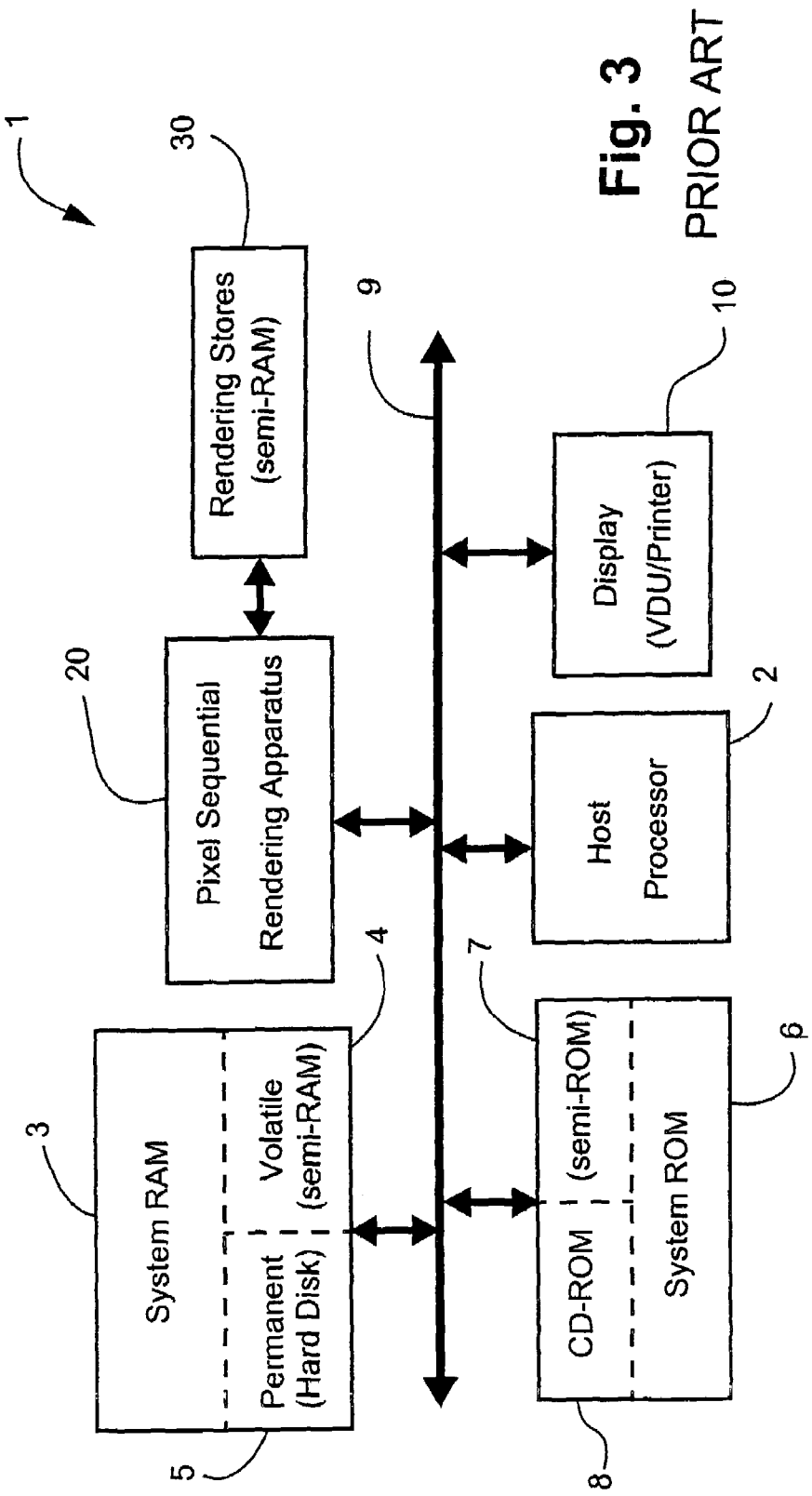
FIG. 3 is a schematic block diagram representation of a computer system incorporating the preferred embodiment.

FIG. 3 illustrates schematically a computer system 1 configured for rendering and presentation of computer graphic object images. The system includes a host processor 2 associated with system random access memory (RAM) 3, which may include a non-volatile hard disk drive or similar device 5 and volatile, semiconductor RAM 4. The system 1 also includes a system read-only memory (ROM) 6 typically founded upon semiconductor ROM 7 and which in many cases may be supplemented by compact disk devices (CD ROM) 8. The system 1 may also incorporate some means 10 for displaying images, such as a video display unit (VDU) or a printer, both which operate in raster fashion.

The above-described components of the system 1 are interconnected via a bus system 9 and are operable in a normal operating mode of computer systems well known in the art, such as IBM PC/AT type personal computers and arrangements evolved therefrom, Sun Sparcstations and the like.

Also seen in FIG. 3, a pixel sequential rendering apparatus 20 connects to the bus 9, and in the preferred embodiment is configured for the sequential rendering of pixel-based images derived from graphic object-based descriptions supplied with instructions and data from the system 1 via the bus 9. The apparatus 20 may utilize the system RAM 3 for the rendering of object descriptions although preferably the rendering apparatus 20 may have associated therewith a dedicated rendering store arrangement 30, typically formed of semiconductor RAM.

1.1 Operation of Computer System 1 in Accordance with a First Mode

Figure 2A:
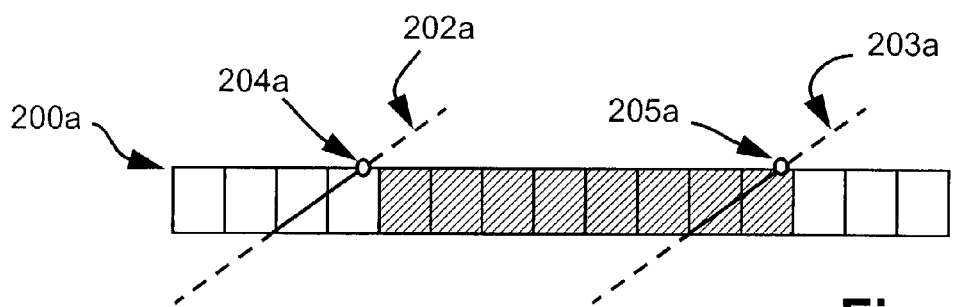
FIG. 2A illustrates one scanline of an image comprising a plurality of pixels and two edges of an exemplary object for explaining a typical prior art rasterization rule of a page description language.
Figure 2B:
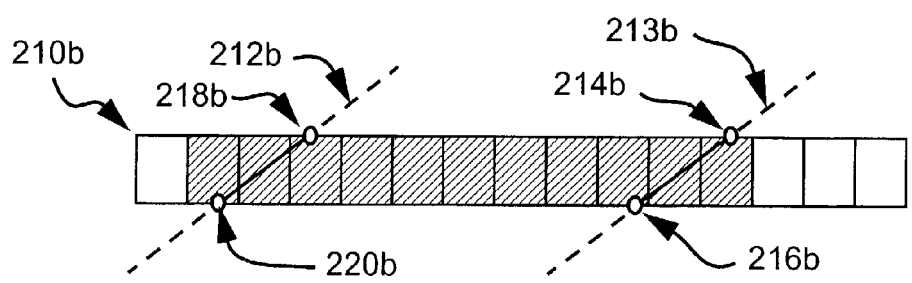
FIG. 2B illustrates one scanline of an image comprising a plurality of pixels and two edges of an exemplary object for explaining the rasterization rule of the page description language PostScript™ in more detail.

The computer system 1 is able to operate in two or more operating modes depending upon the graphic interface or page description language being used. The computer system 1 operates in a first mode when the graphic interface or page description language requires that the system implement a rasterization rule for the systematic rounding up of edges to the nearest integer value. This rasterization rule is implemented in a known manner in the computer system 1 by mathematically rounding up all those edge positions having fractional values (see FIG. 2A). The computer system 1 operates in a second mode when the graphic interface or page description language requires that the system implement a rasterization rule for filling all pixels touched by the edges of the object. For example, the computer system will operate in the second mode when the page description language is Postscript™ (see FIG. 2B). The latter rasterization rule is implemented in the computer system 1 in accordance with the present invention. In a still further variation, the computer system 1 operates in a single mode, equivalent to the second mode. There are many other variations of rounding that may be implemented in other modes. For example, the computer system 1 may operate in a still further mode. In this further mode the computer system 1 implements a rasterization rule for rounding of edges to the nearest integer value (e.g., when the page description language is PCL).

In this fashion, when the page description language to be processed is of a particular type, such as Postscript™, the process of the present invention is performed, and when the page description language is of another type, such as PCL, a different process is performed.

For a better understanding of the computer system 1, a detailed discussion of the computer system 1 in the context of the first operating mode is first undertaken in the current Section 1.1. Then there is provided a detailed discussion of the computer system 1 in the context of the second operating mode in the next Section 1.2.

Figure 4:
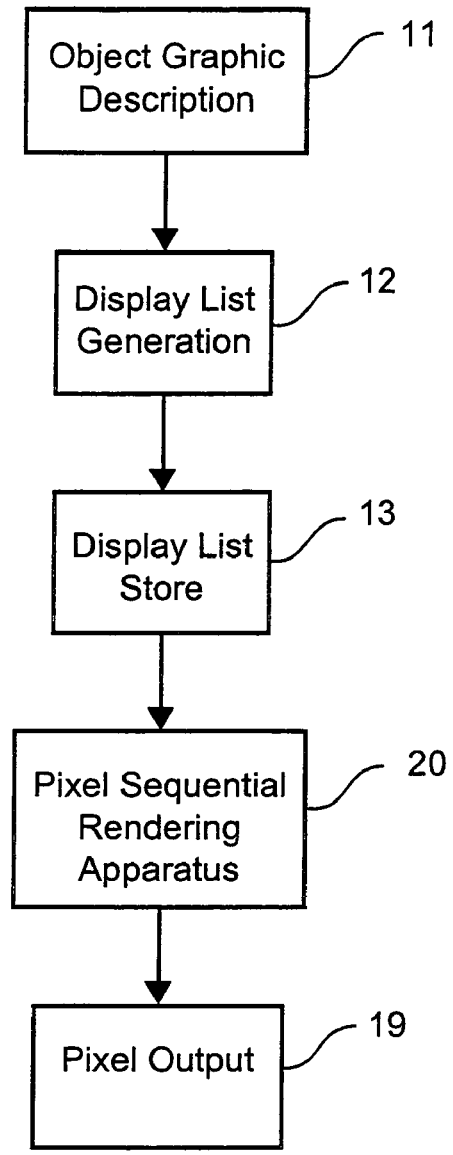
FIG. 4 is a block diagram showing the functional data flow of the preferred embodiment.

Referring now to FIG. 4, a functional data flow diagram of the preferred embodiment is shown. The functional flow diagram of FIG. 4 commences with an object graphic description 11 which is used to describe those parameters of graphic objects in a fashion appropriate to be generated by the host processor 2 and/or, where appropriate, stored within the system RAM 3 or derived from the system ROM 6, and which may be interpreted by the pixel sequential rendering apparatus 20 to render therefrom pixel-based images. For example, the object graphic description 11 may incorporate objects with edges in a number of formats including straight edges (simple vectors) that traverse from one point on the display to another, or an orthogonal edge format where a two-dimensional object is defined by a plurality of edges including orthogonal lines. Further formats, where objects are defined by continuous curves are also appropriate and these can include quadratic polynomial fragments where a single curve may be described by a number of parameters which enable a quadratic based curve to be rendered in a single output space without the need to perform multiplications. Further data formats such as cubic splines and the like may also be used. An object may contain a mixture of many different edge types. Typically, common to all formats are identifiers for the start and end of each line (whether straight or curved) and typically, these are identified by a scan line number thus defining a specific output space in which the curve may be rendered.

For example, FIG. 18A shows a prior art edge description of an edge 600 that is required to be divided into two segments 601 and 602 in order for the segments to be adequately described and rendered. This arises because the prior art edge description, whilst being simply calculated through a quadratic expression, could not accommodate an inflexion point 604. Thus the edge 600 was dealt with as two separate edges having end points 603 and 604, and 604 and 605 respectively. FIG. 18B shows a cubic spline 610 which is described by end points 611 and 612, and control points 613 and 614. This format requires calculation of a cubic polynomial for render purposes and thus is expensive of computational time.

FIGS. 18C and 18D show examples of edges applicable to the preferred embodiment. In the preferred embodiment, an edge is considered as a single entity and if necessary, is partitioned to delineate sections of the edge that may be described in different formats, a specific goal of which is to ensure a minimum level of complexity for the description of each section.

In FIG. 18C, a single edge 620 is illustrated spanning between scanlines A and M. An edge is described by a number of parameters including start_x, start_y, one or more segment descriptions which include an address that points to the next segment in the edge, and a finish segment used to terminate the edge. According to the preferred embodiment, the edge 620 may be described as having three step segments, a vector segment, and a quadratic segment. A step segment is simply defined as having an x-step value and a y-step value. For the three step segments illustrated, the segment descriptions are [0,2], [+2,2], and [+2,0]. Note that the x-step value is signed thereby indicating the direction of the step, whilst the y-step value is unsigned as such is always in a raster scan direction of increasing scanline value. The next segment is a vector segment which typically requires parameters start_x (X), start_y (Y), num_of_scanlines (NY) and slope (DX). In this example, because the vector segment is an intermediate segment of the edge 620, the start_x and start_y may be omitted because such arise from the preceding segment(s). The parameter num_of_scanlines (NY) indicates the number of scanlines the vector segment lasts. The slope value (DX) is signed and is added to the x-value of a preceding scanline to give the x-value of the current scanline, and in the illustrated case, DX=+1. The next segment is a quadratic segment which has a structure corresponding to that of the vector segment, but also a second order value (DDX) which is also signed and is added to DX to alter the slope of the segment.

FIG. 18D shows an example of a cubic curve according the preferred embodiment which includes a description corresponding to the quadratic segment save for the addition of a signed third-order value (DDDX), which is added to DDX to vary the rate of change of slope of the segment. Many other orders may also be implemented.

It will be apparent from the above that the ability to handle plural data formats describing edge segments allows for simplification of edge descriptions and evaluation, without reliance on complex and computationally expensive mathematical operations. In contrast, in the prior art system of FIG. 18A, all edges, whether, orthogonal, vector or quadratic, were required to be described by the quadratic form.

The operation of the preferred embodiment will be described with reference to the simple example of rendering an image 78 shown in FIG. 10 which is seen to include two graphical objects, in particular, a partly transparent blue-colored triangle 80 rendered on top of and thereby partly obscuring an opaque red colored rectangle 90. As seen, the rectangle 90 includes side edges 92, 94, 96 and 98 defined between various pixel positions (X) and scan line positions (Y). Because the edges 96 and 98 are formed upon the scan lines (and thus parallel therewith), the actual object description of the rectangle 90 can be based solely upon the side edges 92 and 94, such as seen in FIG. 11A. In this connection, edge 92 commences at pixel location (40,35) and extends in a raster direction down the screen to terminate at pixel position (40,105). Similarly, the edge 94 extends from pixel position (160,35) to position (160,105). The horizontal portions of the rectangular graphic object 90 may be obtained merely by scanning from the edge 92 to the edge 94 in a rasterized fashion.

The blue triangular object 80 however is defined by three object edges 82, 84 and 86, each seen as vectors that define the vertices of the triangle. Edges 82 and 84 are seen to commence at pixel location (100,20) and extend respectively to pixel locations (170,90) and (30,90). Edge 86 extends between those two pixel locations in a traditional rasterized direction of left to right. In this specific example because the edge 86 is horizontal like the edges 96 and 98 mentioned above, it is not essential that the edge 86 be defined. In addition to the starting and ending pixel locations used to describe the edges 82 and 84, each of these edges will have associated therewith the slope value in this case +1 and −1 respectively.

Returning to FIG. 4, having identified the data necessary to describe the graphic objects to the rendered, the graphic systems 1 then performs a display list generation step 12.

Figure 5:
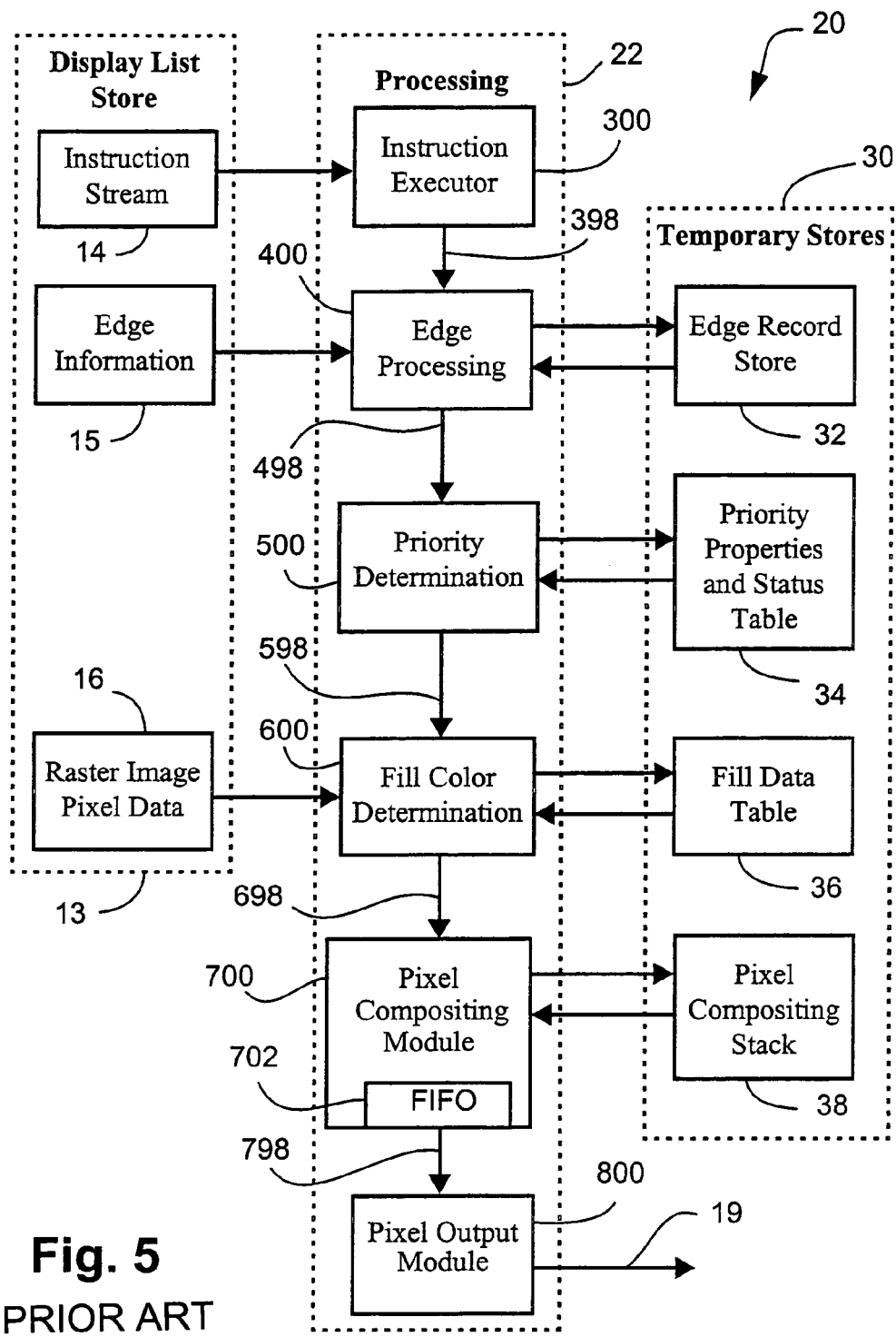
FIG. 5 is a schematic block diagram representation of the pixel sequential rendering apparatus and associated display list and temporary stores of the preferred embodiment.

The display list generation 12 is preferably implemented as a software module executing on the host processor 2 with attached ROM 6 and RAM 3. The display list generation 12 converts an object graphics description, expressed in any one or more of the well known graphic description languages, graphic library calls, or any other application specific format, into a display list. The display list is typically written into a display list store 13, generally formed within the RAM 4 but which may alternatively be formed within the rendering stores 30. As seen in FIG. 5, the display list store 13 can include a number of components, one being an instruction stream 14, another being edge information 15 and where appropriate, raster image pixel data 16.

The instruction stream 14 includes code interpretable as instructions to be read by the pixel sequential rendering apparatus 20 to render the specific graphic objects desired in any specific image. For the example of the image shown in FIG. 10, the instruction stream 14 could be of the form of:
 (1) render (nothing) to scan line 20;
 (2) at scan line 20 add two blue edges 82 and 84;
 (3) render to scan line 35;
 (4) at scan line 35 add two red edges 92 and 94; and
 (5) render to completion.

Figure 10:
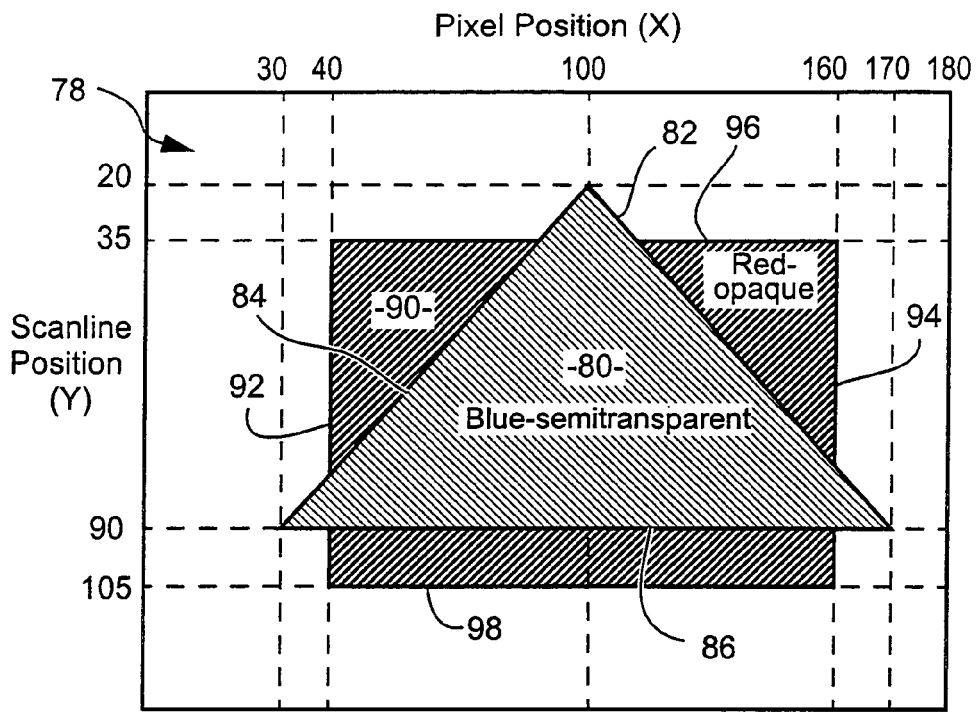
FIG. 10 illustrates a two-object image used as an example for explaining the operation of preferred embodiment.
Figure 11A:
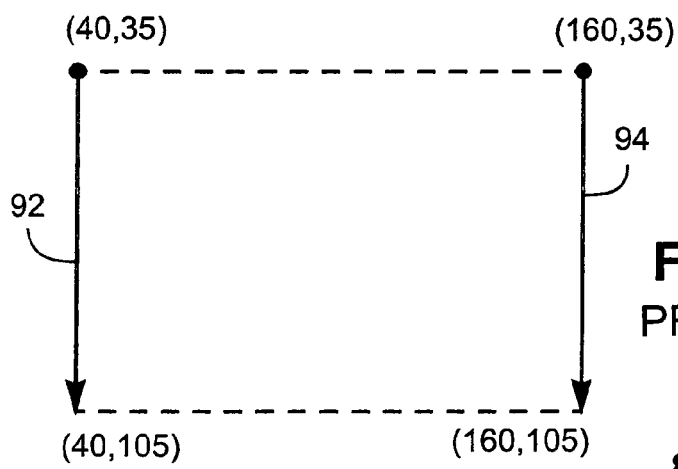
FIGS. 11A and 11B illustrate the vector edges of the objects of FIG. 10.

Similarly, the edge information 15 for the example of FIG. 10 may include the following:
 (i) edge 84 commences at pixel position 100, edge 82 commences at pixel position 100;
 (ii) edge 92 commences at pixel position 40, edge 94 commences at pixel position 160;
 (iii) edge 84 runs for 70 scan lines; edge 82 runs for 70 scanlines;
 (iv) edge 84 has slope=−1, edge 84 has slope=+1;
 (v) edge 92 has slope=0 edge 94 has slope=0.
 (vi) edges 92 and 94 each run for 70 scanlines.

It will be appreciated from the above example of the instruction stream 14 and edge information 15 and the manner in which each are expressed, that in the image 78 of FIG. 10, the pixel position (X) and the scanline value (Y) define a single output space in which the image 78 is rendered. Other output space configurations however can be realized using the principles of the present disclosure.

FIG. 10 includes no raster image pixel data and hence none need be stored in the store portion 16 of the display list 13, although this feature will be described later.

The display list store 13 is read by a pixel sequential rendering apparatus 20, which is typically implemented as an integrated circuit. The pixel sequential rendering apparatus 20 converts the display list into a stream of raster pixels 19 which can be forwarded to another device, for example, a printer, a display, or a memory store.

Although the preferred embodiment describes the pixel sequential rendering apparatus 20 as an integrated circuit, it may be implemented as an equivalent software module executing on a general purpose processing unit, such as the host processor 2.

FIG. 5 shows the configuration of the pixel sequential rendering apparatus 20, the display list store 13 and the temporary rendering stores 30. The processing stages 22 of the pixel-sequential render apparatus 20 include an instruction executor 300, an edge processing module 400, a priority determination module 500, a fill color determination module 600, a pixel compositing module 700, and a pixel output module 800. The processing operations use the temporary stores 30 which as noted above, may share the same device (e.g., magnetic disk or semiconductor RAM) as the display list store 13, or may be implemented as individual stores for reasons of speed optimization. The edge processing module 400 uses an edge record store 32 to hold edge information which is carried forward from scan-line to scan-line. The priority determination module 500 uses a priority properties and status table 34 to hold information about each priority, and the current state of each priority with respect to edge crossings while a scan-line is being rendered. The fill color determination module 600 uses a fill data table 36 to hold information required to determine the fill color of a particular priority at a particular position. The pixel compositing module 700 uses a pixel compositing stack 38 to hold intermediate results during the determination of an output pixel that requires the colors from multiple priorities to determine its value.

The display list store 13 and the other stores 32–38 detailed above may be implemented in RAM or any other data storage technology.

The processing steps shown in the embodiment of FIG. 5 take the form of a processing pipeline 22. In this case, the modules of the pipeline may execute simultaneously on different portions of image data in parallel, with messages passed between them as described below. In another embodiment, each message described below may take the form of a synchronous transfer of control to a downstream module, with upstream processing suspended until the downstream module completes the processing of the message.

The instruction executor 300 reads and processes instructions from the instruction stream 14 and formats the instructions into messages that transferred via an output 398 to the other modules 400, 500, 600 and 700 within the pipeline 22. In the preferred embodiment, the instruction stream 14 may include the instructions:

LOAD_PRIORITY_PROPERTIES: This instruction is associated with data to be loaded into the priority properties and status table 34, and an address in that table to which the data is to be loaded. When this instruction is encountered by the instruction executor 300, the instruction executor 300 issues a message for the storage of the data in the specified location of the priority properties and status table 34. This may be accomplished by formatting a message containing this data and passing it down the processing pipeline 22 to the priority determination module 500 which performs the store operation.

LOAD_FILL_DATA: This instruction is associated with data to be loaded into the fill data table 36, and an address in that table to which the data is to be loaded. When this instruction is encountered by the instruction executor 300, the instruction executor 300 issues a message for the storage of the data at the specified address of the fill data table 36. This may be accomplished by formatting a message containing this data and passing it down the processing pipeline 22 to the fill data determination module which performs the store operation.

LOAD_NEW_EDGES_AND_RENDER: This instruction is associated with an address in the display list store 13 of new edges 15 which are to be introduced into the rendering process when a next scanline is rendered. When this instruction is encountered by the instruction executor, the instruction executor 300 formats a message containing this data and passes it to the edge processing module 400. The edge processing module 400 stores the address of the new edges in the edge record store 32. The edges at the specified address are sorted on their initial scanline intersection coordinate before the next scanline is rendered. In one embodiment, they are sorted by the display list generation process 12. In another embodiment, they are sorted by the pixel-sequential rendering apparatus 20.

SET_SCANLINE_LENGTH: This instruction is associated with a number of pixels which are to be produced in each rendered scanline. When this instruction is encountered by the instruction executor 300, the instruction executor 300 passes the value to the edge processing module 400 and the pixel compositing module 700.

SET_OPACITY_MODE: This instruction is associated with a flag which indicates whether pixel compositing operations will use an opacity channel (also known in the art as an alpha channel). When this instruction is encountered by the instruction executor 300, the instruction executor 300 passes the flag value in the pixel compositing module 700.

Figure 6:
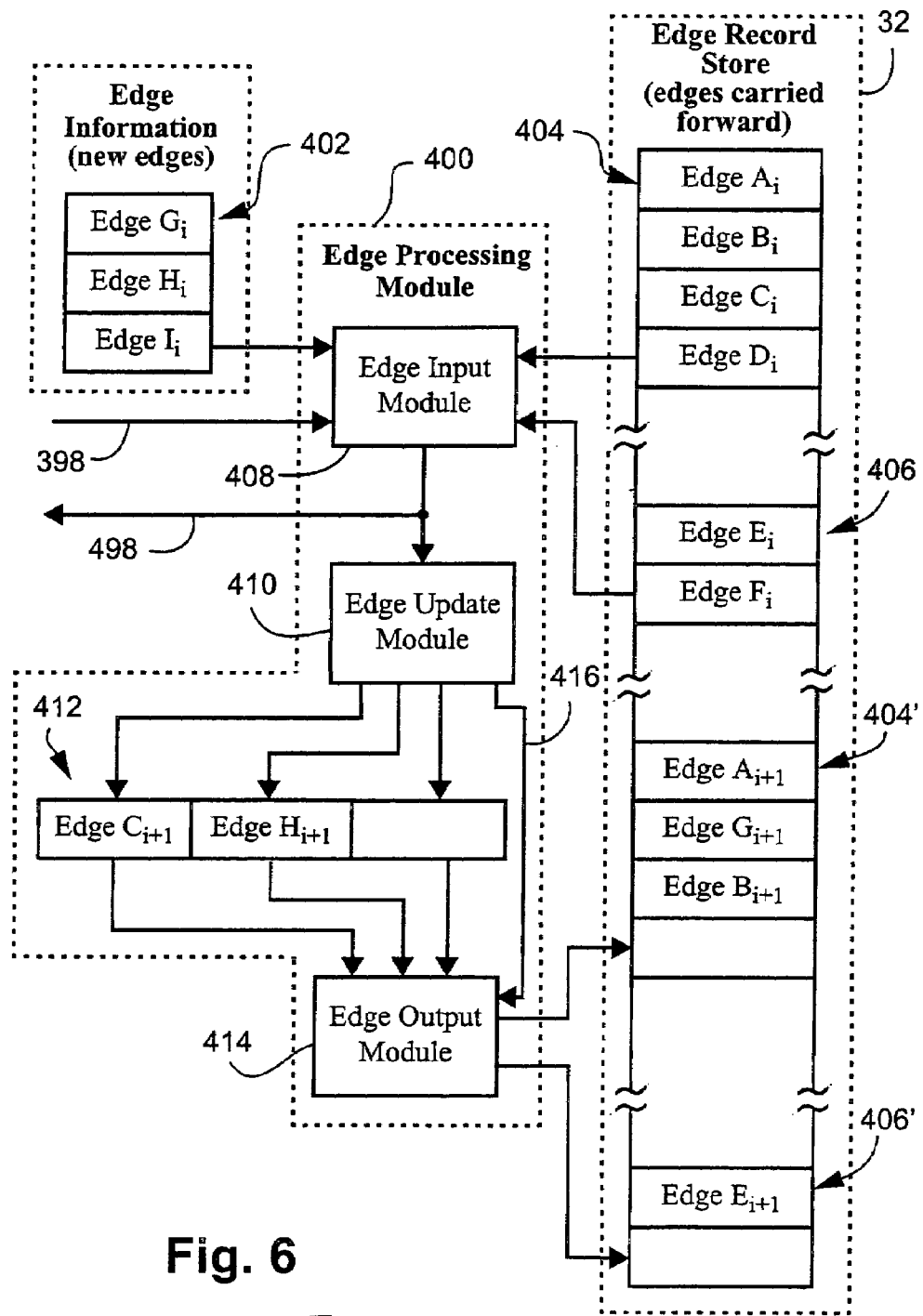
FIG. 6 is a schematic functional representation of the edge processing module of FIG. 5.

The instruction executor 300 is typically formed by a microcode state machine which maps instructions and decodes them into pipeline operations for passing to the various modules. A corresponding software process may alternatively be used. The operation of the edge processing module 400 during a scanline render operation will now be described with reference to FIG. 6. The initial conditions for the rendering of a scanline is the availability of three lists of edge records. Any or all of these lists may be empty. These lists are a new edge list 402, obtained from the edge information 15 and which contains new edges as set by the LOAD_NEW_EDGES_AND_RENDER instruction, a main edge list 404 which contains edge records carried forward from the previous scanline, and a spill edge list 406 which also contains edge records carried forward from the previous scanline.

Figure 14A:
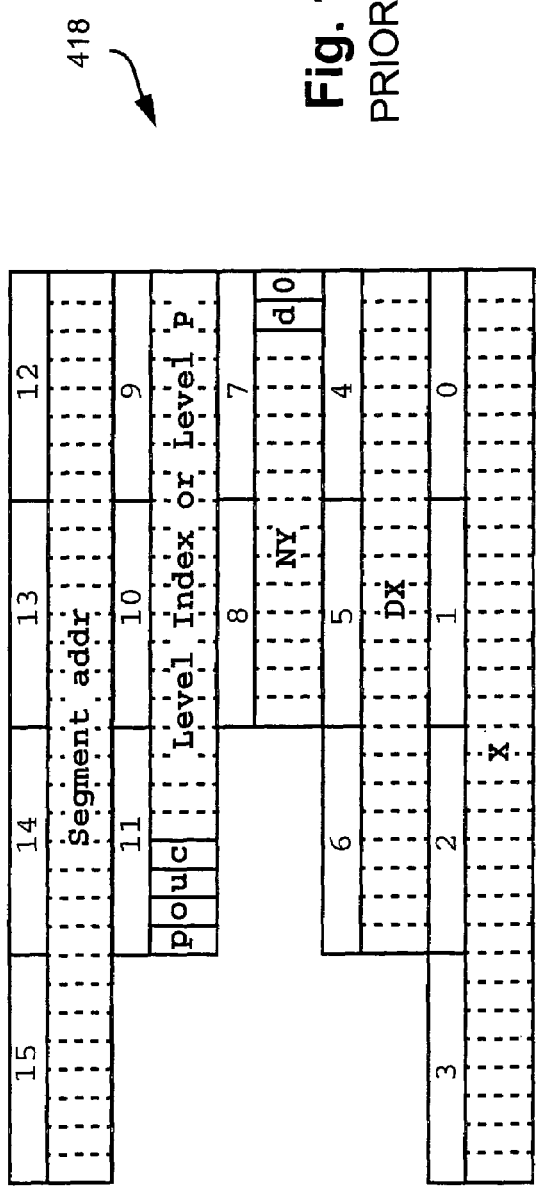

Turning now to FIG. 14A, there is shown the format of such an edge record, which may include:

(i) a current scanline intersection coordinate (referred to here as the X coordinate), (ii) a count (referred to herein as NY) of how many scanlines a current segment of this edge will last for (in some embodiments this may be represented as a Y limit), (iii) a value to be added to the X coordinate of this edge record after each scanline (referred to here as the DX), (iv) a priority number (P) or an index (P) to a list of priority numbers, (v) an address (addr) of a next edge segment in the list; and (vi) a set of flags, marked d, c, u, o, and p, which will be described below in more detail.

Such a format may accommodate vectors, and orthogonally arranged edges. The format may also include a further parameter herein called DDX, which is a value to be added to the DX of this edge record after each scanline. The latter enables the rendering of edges comprising quadratic curves. The addition of further parameters, DDDX for example, may allow such an arrangement to accommodate cubic curves. In some applications, such as cubic Bezier spline, a 6-order polynomial (i.e., up to DDDDDX) may be required. The flag (u) indicates whether a winding count is to be incremented or decremented by an edge. The winding count is stored in a fill counter and is used to determine whether a currently scanned pixel is inside or outside the object in question.

In the example of the edges 84 and 92 of FIG. 10, the corresponding edge records at scanline 20 could read as follows in Table 1:

TABLE 1

| Edge 84 | Edge 92 |
| --- | --- |
| X = 100 | X = 40 |
| NY = 70 | NY = 70 |
| DX = 1 | DX = 0 |
| DDX = 0 | DDX = 0 |
| P = 1 | P = 0 |
| u = (−1) | u = (+1) |
| Addr = Irrelevant in this example | addr = Irrelevant in this example |

In this description, coordinates which step from pixel to pixel along a scanline being generated by the rendering process will be referred to as X coordinates, and coordinates which step from scanline to scanline will be referred to as Y coordinates. Preferably, each edge list contains zero or more records placed contiguously in memory. Other storage arrangements, including the use of pointer chains, are also possible. The records in each of the three lists 402, 404 and 406 are arranged in order of scanline intersection (X) coordinate. This is typically obtained by a sorting process, initially managed by an edge input module 408 which receives messages, including edge information, from the instruction executor 300. It is possible to relax the sort to only regard the integral portion of each scanline intersection coordinate as significant. It is also possible to relax the sort further by only regarding each scanline intersection coordinate, clamped to the minimum and maximum X coordinates which are being produced by the current rendering process. Where appropriate, the edge input module 408 relays messages to modules 500, 600 and 700 downstream in the pipeline 22 via an output 498.

The edge input module 408 maintains references into and receives edge data from each of the three lists 402, 404, and 406. Each of these references is initialized to refer to the first edge in each list at the start of processing of a scanline. Thereafter, the edge input module 408 selects an edge record from one of the three referenced edge records such that the record selected is the one with the least X coordinate out of the three referenced records. If two or more of the X-records are equal, each are processed in any order and the corresponding edge crossings output in the following fashion. The reference which was used to select that record is then advanced to the next record in that list. The edge just selected is formatted into a message and sent to an edge update module 410. Also, certain fields of the edge, in particular the current X, the priority numbers, and the direction flag, are formatted into a message which is forwarded to the priority determination module 500 as an output 498 of the edge processing module 400. Embodiments which use more or fewer lists than those described here are also possible.

Upon receipt of an edge, the edge update module 410 decrements the count of how many scanlines for which a current segment will last. If that count has reached zero, a new segment is read from the address indicated by the next segment address. A segment preferably specifies:

(i) a value to add to the current X coordinate immediately the segment is read, (ii) a new DX value for the edge, (iii) a new DDX value for the edge, and (iv) a new count of how many scanlines for which the new segment will last.

If there is no next segment available at the indicated address, no further processing is performed on that edge.

Otherwise, the edge update module 410 calculates the X coordinate for the next scanline for the edge. This typically would involve taking the current X coordinate and adding to it the DX value. The DX may have the DDX value added to it, as appropriate for the type of edge being handled. The edge is then written into any available free slot in an edge pool 412, which is an array of two or more edge records. If there is no free slot, the edge update module 410 waits for a slot to become available. Once the edge record is written into the edge pool 412, the edge update module 410 signals via a line 416 to an edge output module 414 that a new edge has been added to the edge pool 412.

As an initial condition for the rendering of a scanline, the edge output module 414 has references to each of a next main edge list 404' and a next spill edge list 406'. Each of these references is initialized to the location where the, initially empty, lists 404' and 406' may be built up. Upon receipt of the signal 416 indicating that an edge has been added to the edge pool 412, the edge output module 414 determines whether or not the edge just added has a lesser X coordinate than the edge last written to the next main edge list 404' (if any). If this is true, a "spill" is said to have occurred because the edge cannot be appended to the main edge list 404 without violating its ordering criteria. When a spill occurs, the edge is inserted into the next spill edge list 406', preferably in a manner that maintains a sorted next spill edge list 406'. For example this may be achieved using a software sorting routine. In some embodiments spills may be triggered by other conditions, such as excessively large X coordinates.

If the edge added to the edge pool 412 has an X coordinate greater than or equal to the edge last written to the next main edge list 404' (if any), and there are no free slots available in the edge pool 412, the edge output module 414 selects the edge from the edge pool 412 which has the least X coordinate, and appends that edge to the next main edge list 404', extending it in the process. The slot in the edge pool 412 which was occupied by that edge is then marked as free.

Once the edge input module 408 has read and forwarded all edges from all three of its input lists 402, 404 and 406, it formats a message which indicates that the end of scanline has been reached and sends the message to both the priority determination module 500 and the edge update module 410. Upon receipt of that message, the edge update module 410 waits for any processing it is currently performing to complete, then forwards the message to the edge output module 414. Upon receipt of the message, the edge output module 414 writes all remaining edge records from the edge pool 412 to the next main edge list 404' in X order. Then, the reference to the next main edge list 404' and the main edge list 404 are exchanged between the edge input module 408 and the edge output module 414, and a similar exchange is performed for the next spill edge list 406' and the spill edge list 406. In this way the initial conditions for the following scanline are established.

Rather than sorting the next spill edge list 406' upon insertion of edge records thereto, such edge records may be merely appended to the list 406', and the list 406' sorted at the end of the scanline and before the exchange to the current spill list 406 becomes active in edge rasterization of the next scanline.

It can be deduced from the above that edge crossing messages are sent to the priority determination module 500 in scanline and pixel order (that is, they are ordered firstly on Y and then on X) and that each edge crossing message is labelled with the priority to which it applies.

FIG. 14A depicts a specific structure of an active edge record 418 that may be created by the edge processing module 400 when a segment of an edge is received. If the first segment of the edge is a step (orthogonal) segment, the X-value of the edge is added to a variable called "X-step" for the first segment to obtain the X position of the activated edge. Otherwise, the X-value of the edge is used. The Xstep value is obtained from the segment data of the edge and is added once to the Xedge value of the next segment to obtain the X position of the edge record for that next segment. This means that the edges in the new edge record will be sorted by Xedge+Xstep. The Xstep of the first segment should, therefore, be zero, in order to simplify sorting the edges. The Y-value of the first segment is loaded into the NY field of the active edge record 418. The DX field of the active edges copied from the DX field identifier of vector or quadratic segments, and is set to zero for a step segment. A u-flag as seen in FIG. 14A is set if the segment is upwards heading (see the description relating to FIG. 15A). A d-flag is set when the edge is used as a direct clipping object, without an associated clipping level, and is applicable to closed curves. The actual priority level of the segment, or a level address is copied from the corresponding field of the new edge record into a level field in the active edge record 418. The address of the next segment in the segment list is copied from the corresponding field of the new edge record into a segment address field (segment addr) of the active edge record 418. The segment address may also be used to indicate the termination of an edge record. The remaining fields of the edge record shown in FIG. 14A will be described below with reference to the second operating mode.

It will be appreciated from FIG. 14A that other data structures are also possible, and necessary for example where polynomial implementations are used. In one alternative data structure, the 'segment addr' field is either the address of the next segment in the segment list or copied from the segments DDX value, if the segment is quadratic. In the latter case, the data structure has a q-flag which is set if the segment is a quadratic segment, and cleared otherwise. In a further variation, the segment address and the DDX field may be separated into different fields, and additional flags provided to meet alternate implementations.

Figure 14B:
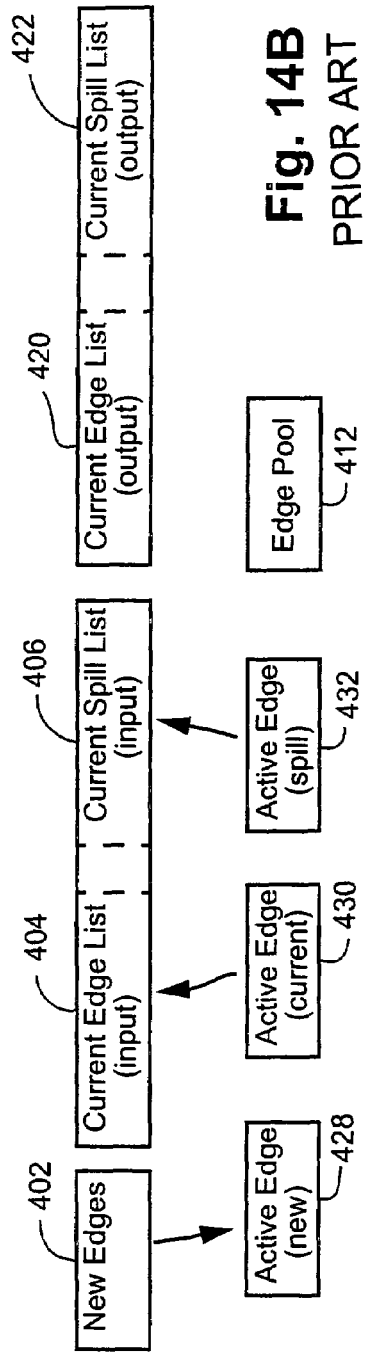

FIG. 14B depicts the arrangement of the edge records described above in the preferred embodiment and used in the edge processing module 400. The edge pool 412 is supplemented by a new active edge record 428, a current active edge record 430 and a spill active edge record 432. As seen in FIG. 14B, the records 402, 404, 406, 404' and 406' are dynamically variable in size depending upon the number of edges being rendered at any one time. Each record includes a limit value which, for the case of the new edge list 402, is determined by a SIZE value incorporated with the LOAD_EDGES_AND_RENDER instruction. When such an instruction is encountered, SIZE is checked and if non-zero, the address of the new edge record is loaded and a limit value is calculated which determines a limiting size for each of the lists 402, 404, 406, 404' and 406'.

Although the preferred embodiments utilizes arrays and associated pointers for the handling of edge records, other implementations, such as linked lists for example may be used. These other implementations may be hardware or software-based, or combinations thereof.

Figure 12:
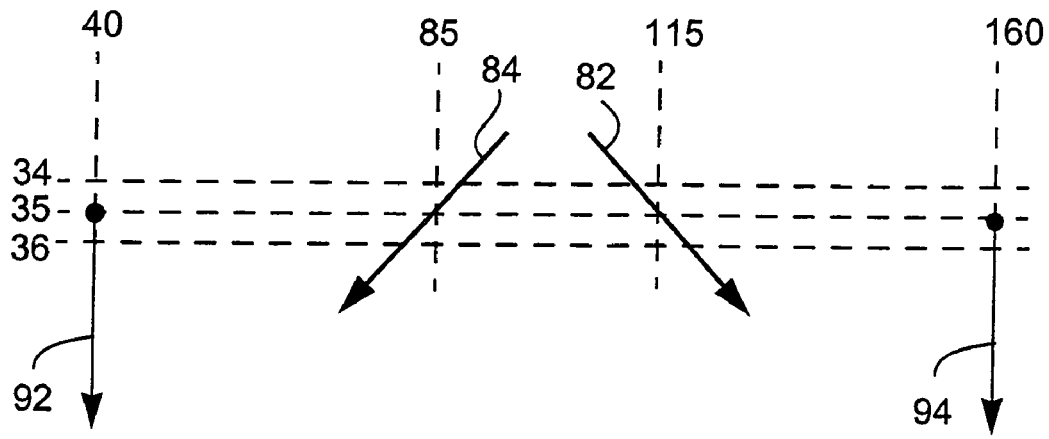
FIG. 12 illustrates the rendering of a number of scan lines of the image of FIG. 10.
Figure 13:
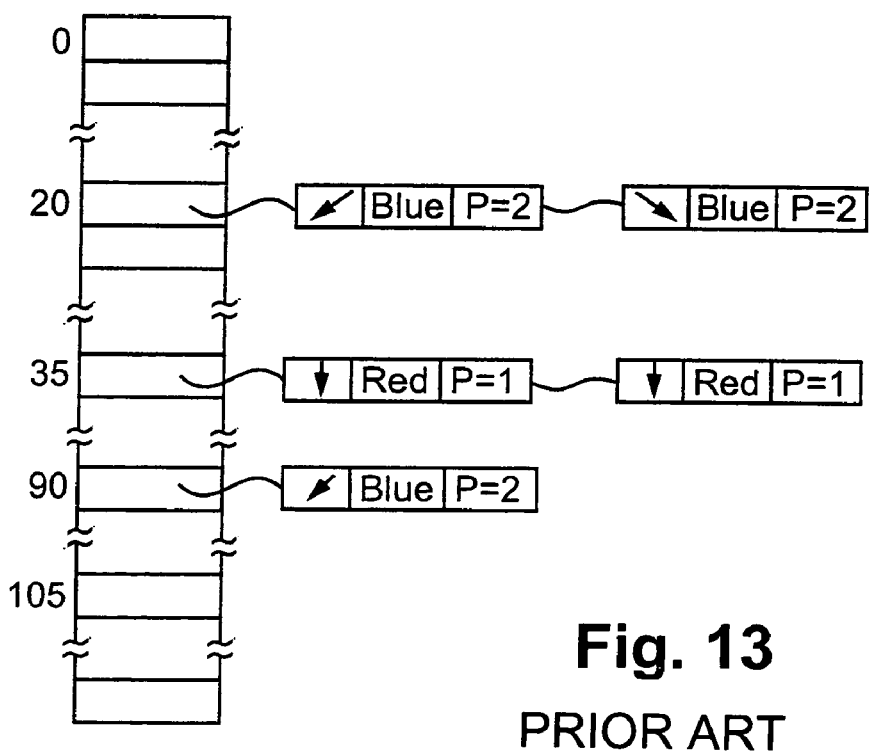
FIG. 13 depicts the arrangement of an edge record for the image of FIG. 10.

The specific rendering of the image 78 shown in FIG. 10 will now be described with reference to scanlines 34, 35 and 36 shown in FIG. 12. In this example, the calculation of the new X coordinate for the next scanline is omitted for the purposes of clarity, with FIGS. 14C to 14I illustrating the output edge crossing being derived from one of the registers 428, 430 and 432 of the edge poll 412.

FIG. 14C illustrates the state of the lists noted above at the end of rendering scanline 34 (the top portion of the semi-transparent blue triangle 80). Note that in scanline 34 there are no new edges and hence the list 402 is empty. Each of the main edge lists 404 and next main edge list 404' include only the edges 82 and 84. Each of the lists includes a corresponding pointer 434, 436, and 440 which, on completion of scanline 34, point to the next vacant record in the corresponding list. Each list also includes a limit pointer 450, denoted by an asterisk (*) which is required to point to the end of the corresponding list. If linked lists were used, such would not be required as linked lists include null pointer terminators that perform a corresponding function.

As noted above, at the commencement of each scanline, the next main edge list 404' and the main edge list 404 are swapped and new edges are received into the new edge list 402. The remaining lists are cleared and each of the pointers set to the first member of each list. For the commencement of scanline 35, the arrangement then appears as seen in FIG. 14D. As is apparent from FIG. 14D, the records include four active edges which, from FIG. 12, are seen to correspond to the edges 92, 94, 84 and 82.

Referring now to FIG. 14E, when rendering starts, the first segment of the new edge record 402 is loaded into an active edge record 428 and the first active edge records of the main edge list 404 and spill edge list 406 are copied to records 430 and 432 respectively. In this example, the spill edge list 406 is empty and hence no loading takes place. The X-positions of the edges within the records 428, 430 and 432 are then compared and an edge crossing is emitted for the edge with the smallest X-position. In this case, the emitted edge is that corresponding to the edge 92 which is output together with its priority value. The pointers 434, 436 and 438 are then updated to point to the next record in the list.

The edge for which the edge crossing was emitted is then updated (in this case by adding DX=0 to its position), and buffered to the edge pool 412 which, in this example, is sized to retain three edge records. The next entry in the list from which the emitted edge arose (in this case list 402) is loaded into the corresponding record (in this case record 428). This is seen in FIG. 14F.

Further, as is apparent from FIG. 14F, a comparison between the registers 428, 430 and 432 again selects the edge with the least X-value which is output as the appropriate next edge crossing (X=85, P=2). Again, the selected output edge is updated and added to the edge pool 412 and all the appropriate pointers incremented. In this case, the updated value is given by X←X+DX, which is evaluated as 84=85-1. Also, as seen, the new edge pointer 434 is moved, in this case, to the end of the new edge list 402.

In FIG. 14G, the next edge identified with the lowest current X-value is again that obtained from the register 430 which is output as an edge crossing (X=115, P=2). Updating of the edge again occurs with the value be added to the edge pool 412 as shown. At this time, it is seen that the edge pool 412 is now full and from which the edge with the smallest X-value is selected and emitted to the output list 404', and the corresponding limited pointer moved accordingly.

As seen in FIG. 14H, the next lowest edge crossing is that from the register 428 which is output (X=160 P=1). The edge pool 412 is again updated and the next small X-value emitted to the output list 404'.

At the end of scanline 35, and as seen in FIG. 14I, the contents of the edge pool 412 are flushed to the output list 404' in order of smallest X-value. As seen in FIG. 14J, the next main edge list 404' and the main edge list 404 are swapped by exchanging their pointers in anticipation of rendering the next scanline 36. After the swapping, it is seen from FIG. 14J that the contents of the main edge list 404 include all edge current on scanline 36 arranged in order of X-position thereby permitting their convenient access which facilitates fast rendering.

Ordinarily, new edges are received by the edge processing module 400 in order of increasing X-position. When a new edge arrives, its position is updated (calculated for the next scanline to be rendered) and this determines further action as follows:

(a) if the updated position is less than the last X-position output on the line 498, the new edge is insertion sorted into the main spill list 406 and the corresponding limit register updated;

(b) otherwise, if there is space, it is retained in the edge pool 412.

As is apparent from the foregoing, the edge pool 412 aids in the updating of the lists in an ordered manner in anticipation of rendering the next scanline in the rasterised image. Further, the size of the edge pool 412 may be varied to accommodate larger numbers of non-ordered edges. However, it will be appreciated that in practice the edge pool 412 will have a practical limit, generally dependent upon processing speed and available memory with the graphic processing system. In a limiting sense, the edge pool 412 may be omitted which would ordinarily require the updated edges to be insertion sorted into the next output edge list 404'. However, in the preferred embodiment this situation is avoided, as a normal occurrence through the use of the spill lists mentioned above. The provision of the spill lists allows the preferred embodiment to be implemented with an edge pool of practical size and yet handle relatively complex edge intersections without having to resort to software intensive sorting procedures. In those small number of cases where the edge pool and spill list are together insufficient to accommodate the edge intersection complexity, sorting methods may be used.

As is apparent from the foregoing, the edge pool 412 aids in the updating of the lists in an ordered manner in anticipation of rendering the next scanline in the rasterized image. Further, the size of the edge pool 412 may be varied to accommodate larger numbers of non-ordered edges. However, it will be appreciated that in practice the edge pool 412 will have a practical limit, generally dependent upon processing speed and available memory with the graphic processing system. In a limiting sense, the edge pool 412 may be omitted which would ordinarily require the updated edges to be insertion sorted into the next output edge list 404'. However, in the preferred embodiment this situation is avoided, as a normal occurrence through the use of the spill lists mentioned above. The provision of the spill lists allows the preferred embodiment to be implemented with an edge pool of practical size and yet handle relatively complex edge intersections without having to resort to software intensive sorting procedures. In those small number of cases where the edge pool and spill list are together insufficient to accommodate the edge intersection complexity, sorting methods may be used.

An example of where the spill list procedure is utilized is seen in FIG. 16A where three arbitrary edges 60, 61 and 63 intersect an arbitrary edge 62 at a relative position between scanlines A and B. Further, the actual displayed pixel locations 64 for each of scanlines A, B, are shown which span pixel locations C to J. In the above described example where the edge pool 412 is size to retain three edge records, it will be apparent that such an arrangement alone will not be sufficient to accommodate three edge intersections occurring between adjacent scanlines as illustrated in FIG. 16A.

FIG. 16B shows the state of the edge records after rendering the edges 60, 61 and 63 on scanline. The edge crossing H is that most recently emitted and the edge pool 412 is full with the updated X-values E, G and I for the edges 60, 61 and 63 respectively for the next scanline, scanline B. The edge 62 is loaded into the current active edge record 430 and because the edge pool 412 is full, the lowest X-value, corresponding to the edge 60 is output to the output edge list 404'.

In FIG. 16C, the next edge crossing is emitted (X=J for edge 62) and the corresponding updated value determined, in this case X=C for scanline B. Because the new updated value X=C is less than the most recent value X=E copied to the output list 404', the current edge record and its corresponding new updated value is transferred directly to the output spill list 406'.

FIG. 16D shows the state of the edge records at the start of scanline B where it is seen that the main and output lists, and their corresponding spill components have been swapped. To determine the first emitted edge, the edge 60 is loaded into the current active edge register 430 and the edge 62 is loaded into the spill active edge register 432. The X-values are compared and the edge 62 with the least X-value (X=C) is emitted, updated and loaded to the edge pool 412.

Edge emission and updating continues for the remaining edges in the main edge list 404 and at the end of the scanline, the edge pool 412 is flushed to reveal the situation shown in FIG. 16E, where it is seen that each of the edges 60 to 63 are appropriately ordered for rendering on the next scanline, having been correctly emitted and rendered on scanline B.

As will be apparent from the foregoing, the spill lists provide for maintaining edge rasterization order in the presence of complex edge crossing situations. Further, by virtue of the lists being dynamically variable in size, large changes in edge intersection numbers and complexity may be handled without the need to resort to sorting procedures in all but exceptionally complex edge intersections.

In the preferred embodiment the edge pool 412 is sized to retain eight edge records and the lists 404, 404' together with their associated spill lists 406, 406' have a base (minimum) size of 512 bytes which is dynamically variable thereby providing sufficient scope for handling large images with complex edge crossing requirements.

Figure 7:
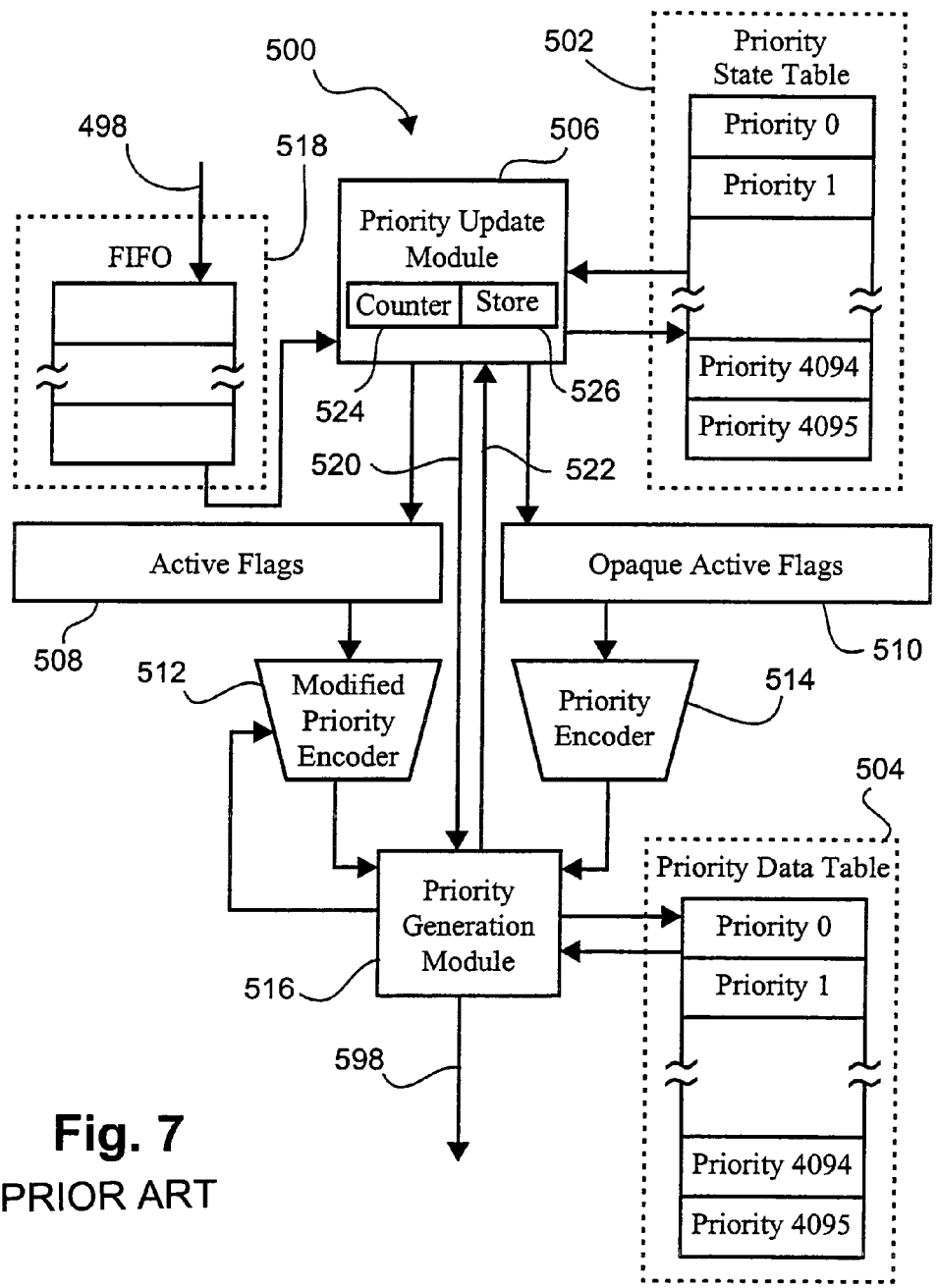
FIG. 7 is a schematic functional representation of the priority determination module of FIG. 5.

The operation of the priority determination module 50 will now be described with reference to FIG. 7. Incoming messages 498 from the edge processing module 400, which may include set priority data messages, set fill data messages, edge crossing messages, and end of scanline messages, first pass through a first-in first-out (FIFO) buffer 518 before being read by a priority update module 506. The FIFO 518 acts to de-couple the operation of the edge processing module 400 and the priority determination module 500. A priority state table 502, comprising part of the tables 34 mentioned above, is used to hold information about each object priority. Preferably the FIFO 518 is sized to enable the receipt from the edge processing module 400 and transfer to the priority state table 502 of a full scanline of edge-crossings in a single action. Such permits the priority determination module 500 to correctly handle multiple edge-crossings at the same pixel (X) location. Each record in the priority state table 502 preferably records:

(i) a fill-rule flag which indicates whether this priority is to have its inside versus outside state determined by the application of the odd-even fill rule or the non-zero winding fill rule;

(ii) a fill counter for storing a current fill count which is modified in a manner indicated by the fill rule each time an edge effecting this priority is crossed;

(iii) a clipper flag which indicates whether this priority is to be used for clipping or filling;

(iv) a clip type flag which, for edges which have the clipper flag set, records whether the clipping type is a "clip-in" or a "clip-out";

(v) a clip counter for storing a current clip count which is decremented and incremented when a clip-in type clip region effecting this priority is entered and exited respectively, and incremented and decremented when a clip-out type clip region effecting this priority is entered and exited respectively; and (vi) a flag which records whether this priority requires levels beneath it to be calculated first, referred to as the "need-below" flag.

Clipping objects are known in the art and act not to display a particular new object, but rather to modify the shape of an another object in the image. Clipping objects can also be turned-on and turned-off to achieve a variety of visual effects. For example, the object 80 of FIG. 10 could be configured as a clipping object acting upon the object 90 to remove that portion of the object 90 that lies beneath the clipping object 80. This may have the effect of revealing any object or image beneath the object 90 and within the clipping boundaries that would otherwise be obscured by the opacity of the object 90.

FIGS. 15A and 15B demonstrate the application of the odd-even and non-zero winding rules for activating objects. For the purposes of the non-zero winding rule, FIG. 15A illustrates how the edges 71 and 72 of an object 70 are allocated a notional direction, according to whether the edges are downwards-heading or upwards-heading respectively. In order to form a closed boundary, edges link nose-to-tail around the boundary. The direction given to an edge for the purposes of the fill-rule (applied and described later) is independent of the order in which the segments are defined. Edge segments are defined in the order in which they are tracked, corresponding to the rendering direction.

FIG. 15B shows a single object (a pentagram) having two downwards-heading edges 73 and 76, and three upwards-heading edges 74, 75 and 77. The odd-even rule operates by simply toggling a Boolean value as each edge is crossed by the scanline in question, thus effectively turning-on (activating) or turning-off (de-activating) an object's color. The non-zero winding rule increments and decrements a value stored in a fill counter dependent upon the direction of an edge being crossed. In FIG. 15B, the first two edges 73 and 76 encountered at the scanline are downwards-heading and thus traversal of those edges increments the fill counter, to +1 and +2 respectively. The next two edges 74 and 77 encountered by the scanline are upwards-heading and accordingly decrement the fill counter, to +1 and 0 respectively. The non-zero winding rule operates by turning-on (activating) an object's color when the fill counter is non-zero, and turning-off (de-activating) the object's color when the fill counter is zero.

In some embodiments some of this information is associated with edges in the display list 13 and various edge lists described above, and forwarded as part of the edge crossing message to the priority determination module 500. In particular, the fill-rule flag, the clipper flag, the clip type flag, and the need-below flag may be handled in this manner.

Returning to FIG. 7, the priority update module 506 maintains a counter 524 which records the scanline intersection coordinate up to which it has completed processing. This will be referred to as the current X of the priority update module 506. The initial value at the start of a scanline is zero.

Upon examining an edge crossing message received at the head of the FIFO 518, the priority update module 506 compares the X intersection value in the edge crossing message with its current X. If the X intersection value in the edge crossing message is less than or equal to the current X of the priority update module 506 processes the edge crossing message. Edge crossing message processing comes in two forms, "normal edge processing" (described below) is used when the record in the priority state table 502 indicated by the first priority in the edge crossing message has a clipper flag which indicates that this is not a clip priority, otherwise "clip edge processing" (described below) is performed.

A priority is active at a pixel if the pixel is inside the boundary edges which apply to the priority, according to the fill-rule for that priority, and the clip count for the priority is zero. A priority is exposed if it is the uppermost active priority, or if all the active priorities above it have their corresponding need-below flags set. In this fashion, pixel values may be generated using only the fill data of the exposed priorities. It is important to note that an object's priority designates the location (viz level) of the object in the order of the objects from the rearmost object to the foremost object. Preferably, a number of non-overlapping objects that have the same fill and compositing operation, and that form a contiguous sequence, may be designated as having the same priority. This effectively saves memory space in the fill table. Furthermore, the corresponding edge records of objects need only reference the corresponding priority in order to reference the corresponding fill and compositing operation. In addition, throughout the specification references are made to the terms "priority", "level", and "priority level", each of which are to be taken to mean essentially the same thing unless the contrary intention appears.

The need-below flag for a priority is established in the information of the display list and is used to inform the pixel generating system that any active priorities beneath the priority in question do not contribute to the pixel value being rendered, unless the flag is set. The flag is cleared where appropriate to prevent extra compositing operations which would otherwise contribute nothing to the final pixel value.

"Normal edge processing" includes, for each priority in the edge crossing message and with reference to fields of the priority state table record indicated by that priority, the steps of:

(i) noting the current fill count of the current priority;

(ii) either:

(a) if the fill rule of the current priority is odd-even, setting the fill count to zero if it is currently non-zero, else setting it to any non-zero value, or (b) if the fill rule of the current priority is non-zero winding, incrementing or decrementing (depending on the edge direction flag) the fill count; and iii) comparing the new fill count with the noted fill count and if one is zero and the other is non-zero performing an "active flag update" (described below) operation on the current priority.

Some embodiments may use a separate edge crossing message for each priority rather than placing a plurality of priorities in each edge crossing message.

An active flag update operation includes first establishing a new active flag for the current priority. The active flag is non-zero if the fill count for the priority in the priority state table 502 is non-zero and the clip count for the priority is zero, else the active flag is zero. The second step in the active flag update operation is to store the determined active flag in an active flags array 508 at the position indicated by the current priority, then if the need-below flag in the priority state table for the current priority is zero, also storing the active flag in an opaque active flags array 510 at the position indicated by the current priority.

"Clip edge processing" includes, with reference to fields of the priority state table record indicated by the first priority in the edge crossing message, the steps of:
  (i) noting the current fill count of the current priority;
  (ii) either:
    (a) if the fill rule of the current priority is odd-even, setting the fill count to zero if it is currently non-zero else setting it to any non-zero value, or
    (b) if the fill rule of the current priority is non-zero winding, incrementing or decrementing (depending on the edge direction flag) the fill count; and
  (iii) comparing the new fill count with the noted fill count and determining a clip delta value of:
    (a) zero, if both the new fill count is zero and the noted fill count is zero, or both the new fill count is non-zero and the noted fill count is non-zero,
    (b) plus one, if the clip type flag of the current priority is clip-out and the noted fill count is zero and the new fill count is non-zero, or the clip type flag of the current priority is clip-in and the noted fill count is non-zero and the new fill count is zero, or otherwise,
    (c) minus one; and
  (iv) for every subsequent priority after the first in the edge crossing message, add the determined clip delta value to the clip count in the record in the priority state stable indicated by that subsequent priority, and if the clip count either moved from non-zero to zero, or from zero to non-zero in that process, performing an active flag update operation as described above on that subsequent priority. It should be noted that the initial value of each clip count is set by the LOAD_PRIORITY_PROPERTIES instruction described previously. The clip count is typically initialized to the number of clip-in priorities which affect each priority.

Some embodiments do not associate a priority with a clip, but instead directly increment and decrement the clip count of all priorities given in the edge crossing message. This technique can be used, for example, when clip shapes are simple and do not require the application of a complex fill rule. In this specific application, the clip count of the level controlled by an edge is incremented for an upwards heading edge or decremented for a downwards heading edge. A simple closed curve, described anticlockwise, acts a clip-in, whereas a simple closed curve, described clockwise, acts as a clip-out.

When the X intersection value in the edge crossing message is greater than the current X of the priority update module 506, the priority update module 506 forms a count of how many pixels to generate, being the difference between the X intersection value in the edge crossing message and the current X, this count is formatted into a priority generation message, which is sent via a connection 520 to a priority generation module 516. The priority update module 506 then waits for a signal 522 from the priority generation module 516 indicating that processing for the given number of pixels has completed. Upon receipt of the signal 522, the priority update module 506 sets its current X to the X intersection value in the edge crossing message and continues processing as described above.

The priority generation module 516 operates with reference to a priority data table 504, also formed within the tables 34, which is used to hold information about each priority. Each record in the priority data table 504 may include:
  (i) a fill table address,
  (ii) a fill type,
  (iii) a raster operation code,
  (iv) an alpha channel operation code,
  (v) a "source pop" flag,
  (vi) a "destination pop" flag, and
  (vii) a flag which records whether the color of this priority is constant for a given Y, referred to here as the "x-independent" flag.

Upon receipt of a priority generation message 520, the priority generation module 516 performs a "pixel priority generation operation" (described below) a number of times indicated by the count it has been supplied, thereupon it signals 522 the priority update module 506 that it has completed the operation.

Each pixel priority generation operation includes firstly using a priority encoder 514 (e.g., a 4096 to 12 bit priority encoder) on the opaque active flags array 510 to determine the priority number of the highest opaque active flag. This priority (if any) is used to index the priority data table 504 and the contents of the record so referenced is formed into a fill priority message output 598 from the priority generation module 516 and sent to the fill color determination module 600. Further, if a priority was determined by the previous step (i.e., there was at least one opaque active flag set), the determined priority is held, and is referred to as the "current priority". If no priority was determined the current priority is set to zero. The priority generation module 516 then repeatedly uses a modified priority encoder 512 on the active flag array 508 to determine the lowest active flag which is greater than the current priority. The priority so determined (if any) is used to index the priority data table 504 and the contents of the record so referenced is formed into a fill priority message and is sent 598 to the fill color determination module 500, then the determined priority is used to update the current priority. This step is used repeatedly until there is no priority determined (that is, there is no priority flagged in the active flags which is greater than the current priority). Then the priority generation module 516 forms an end of pixel message and sends it to the fill color determination module 600.

As a preferred feature to the basic operation described above, the priority generation module 516 notes the value of the x-independent flag of each message which it forwards to the fill color determination module 600 while it processes the first pixel of a sequence. If all the forwarded messages have the x-independent flag specified, all subsequent messages in the span of pixels between adjacent edge intersections can be replaced by a single repeat specification of count minus one. This is done by producing a repeat message and sending it to the fill color determination module 600 in place of all further processing in this sequence.

As another preferred feature to the basic operation described above, the priority generation module 516 sends the highest opaque priority via the connection 522 to the priority update module 506 after each level generation message. The priority update module 506 holds this in a store 526. The priority determination module 506 then, instead of a simple test that the X intersection in the message is greater than the current X, performs a test that the X intersection in the message is greater than the current X and that at least one of the levels in the message is greater than or equal to the highest opaque priority, before producing a pixel priority generation message. By doing this, fewer pixel priority determination operations may be done and longer repeat sequences may be generated.

Figure 11B:
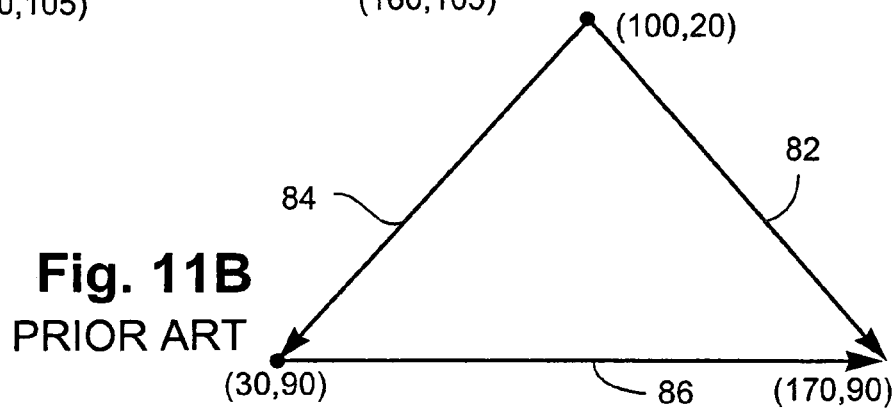

Using the example of the graphic objects shown in FIGS. 10 and 11, the priority update process described above can be illustrated, for scanline 35 using the edge crossings seen from FIGS. 14C to 14J, as seen in FIGS. 17A to 17E.

Figure 17E:
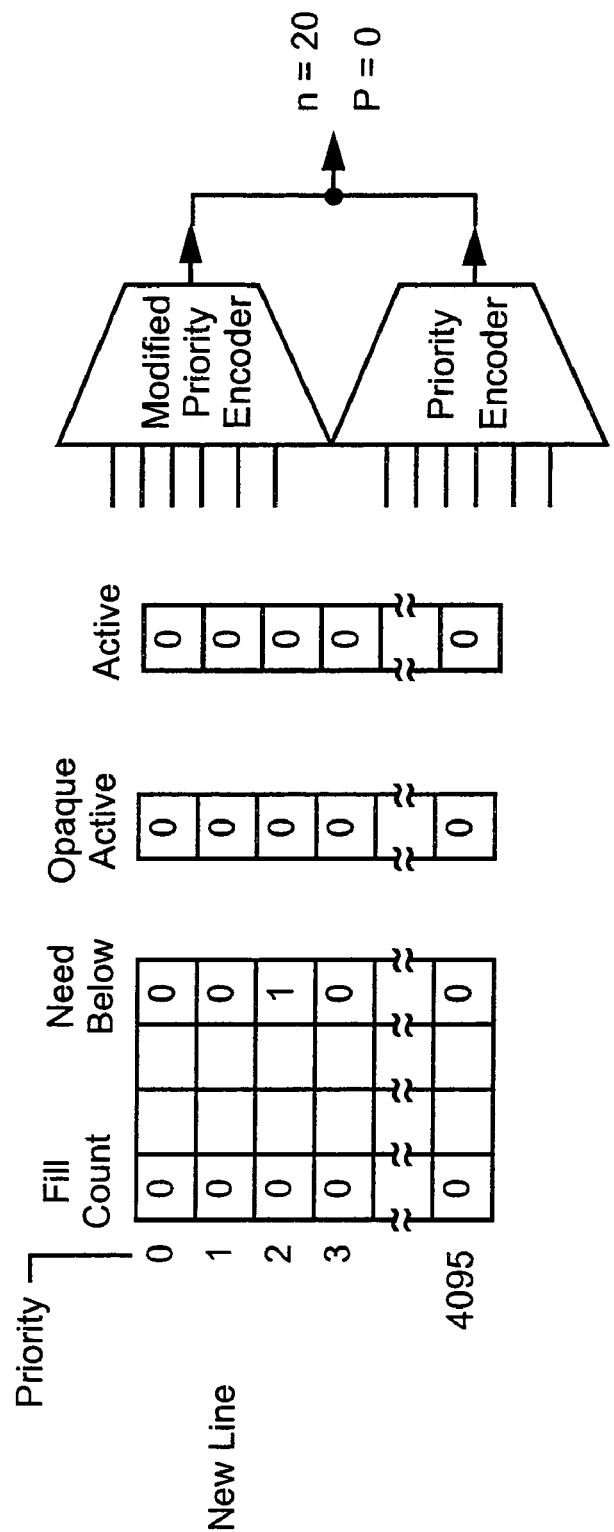

FIGS. 17A to 17E illustrate operation of the priority tables 502 and 504, which in the preferred embodiment are merged into a single table, called a level activation table 530 together with arrays 508, 510 and encoders 512 and 514. As seen in FIG. 17A, edge crossing messages are received in order for a scanline from the edge processing module 400 and are loaded into the table 530, which is arranged in priority order. The edge crossing messages include, in this example, an incrementing direction according to the non-zero winding rule of the edge traversal. It is possible for no entries in the priority table 530 to be set.

The level activation table as illustrated 530 includes column entries for fill count, which are determined from the edge according to the non-zero winding rule or, where appropriate, the odd-even rule. The need-below flag is a property of a priority and is set as part of the LOAD_PRIORITIES_PROPERTIES instruction. The need-below is set for all priority levels when the table 530 is loaded. Other columns such as "clip count" and "fill index table" may be used, but for this example are omitted for simplicity of explanation. Where no level is active the corresponding entries are set to zero. Further, the values of the arrays 510 and 508 are updated from the table 530 after receiving a subsequent edge crossing.

From FIG. 17A, it will be apparent that, for convenience, a number of records have been omitted for clarity. Typically, the level activation table 530 would include, arranged in priority order, the following records:

--- fill count
clip count
fill type
activation condition and flags, including
    (i) need - below flag (ii) clip type (iii) clipper flag
compositing graphics operations and flags, including
    (i) the raster operation code (ii) the alpha channel operation code
    (iii) the "source pop" flag (iv) the "destination pop" flag
    (v) the x - independent flag
fill rule
attributes and
fill table index.

---

The contents of the table 530, where not used in the priority determination module 500 are passed as messages to each of the fill color determination module 600 for pixel generation, and to the pixel compositing module 700 for compositing operations.

The first edge crossing for scanline 35 (FIG. 14E) is seen in FIG. 17A where for P=1, the fill count is updated to the value of the edge according to the non-zero winding rule. The "need-below" flag for this level has been set to zero by the driver software as the object in question is opaque.

Because a previous state of the table 530 was not set, the arrays 510 and 508 remain not set and the priority encoder 514 is disabled from outputting a priority. This is interpreted by priority generation module 516 which outputs a count n=40 (pixels) for a "no object" priority (e.g., P=0), being the first, blank, portion of the scanline 35.

FIG. 17B shows the arrangement when the edge crossing of FIG. 14F is received. The fill count is updated. The arrays 510 and 508 are then set with the previous highest level from the table 530. At this time, the module 516 outputs a count n=45, P=1 representing the edge 92 of the opaque red object 90 before intersection with the semitransparent triangle 80.

FIG. 17C shows the arrangement when the edge crossing of FIG. 14G is received. Note that the fill count has been adjusted downwardly because of the non-zero winding rule. Because the object that is valid prior to receiving the current edge crossing is not opaque, the modified priority encoder 512 is used to select the priority P=2 as the highest active level which is output as is current for n=(115−85)=30 pixels.

FIG. 17D shows the arrangement when the edge crossing of FIG. 14H is received. Note that previously changed "need-below" for P=2 has been transferred to the active array 508, thus permitting the priority encoder to output a value P=1 current for n=(160−115)=45 pixels.

FIG. 17E shows the result when the edge crossing of FIG. 14I is received, providing for an output of P=0 for n=(180−160)=20 pixels.

As such, the priority module 500 outputs counts of pixels and corresponding priority display values for all pixels of a scanline.

Figure 8:
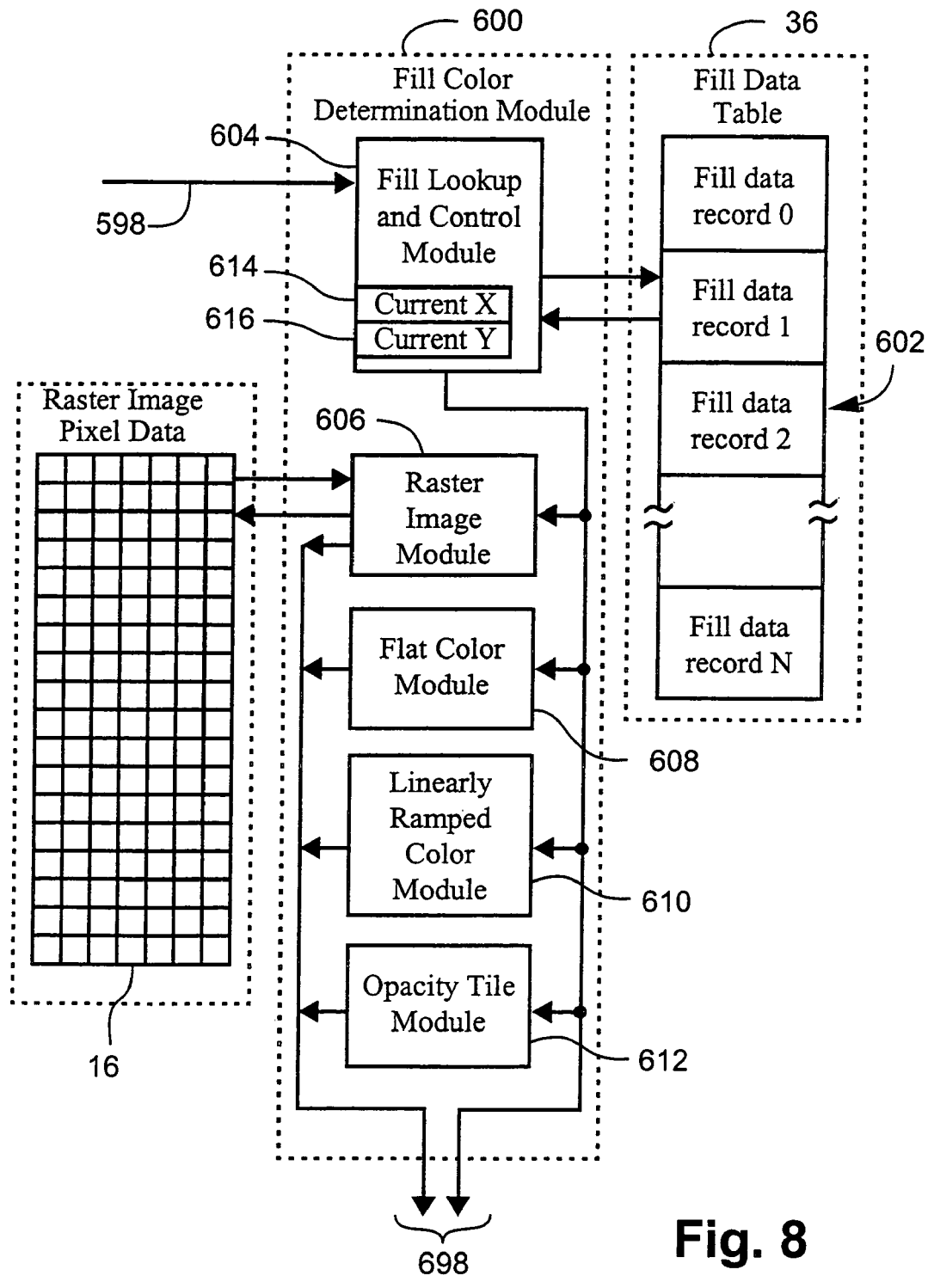
FIG. 8 is a schematic functional representation of the fill data determination module of FIG. 5.

The operation of the fill color determination module 600 will now be described with reference to FIG. 8. Incoming messages 598 from the priority determination module 500, which include set fill data messages, repeat messages, fill priority messages, end of pixel messages, and end of scanline messages, first pass to a fill lookup and control module 604. The fill lookup and control module 604 maintains a current X position counter 614 and a current Y position counter 616 for use by various components of the fill color determination module 600.

Upon receipt of an end of scanline message, the fill lookup and control module 604 resets the current X counter 614 to zero and increments the current Y counter 616. The end of scanline message is then passed to the pixel compositing module 700.

Upon receipt of a set fill data message, the fill lookup and control module 604 stores the data in the specified location 602 of the fill data table 36.

Upon receipt of a repeat message, the fill lookup and control module 604 increments the current X counter 614 by the count from the repeat message. The repeat message is then passed to the pixel compositing module 700.

Upon receipt of an end of pixel message, the fill lookup and control module 604 again increments the current X counter 614, and the end of pixel message is then passed to the pixel compositing module 700.

Upon receipt of a fill priority message, the fill lookup and control module 604 performs operations which include:

(i) the fill type from the fill priority message is used to select a record size in the table 36;

(ii) the fill table address from the fill priority message, and the record size as determined above, is used to select a record from the fill data table 36;

(iii) the fill type from the fill priority message is used to determine and select a sub-module to perform generation of the fill color. The sub-modules may include a raster image module 606, a flat color module 608, a linearly ramped color module 610, and an opacity tile module 612;

(iv) the determined record is supplied to the selected sub-module 606–612;

(v) the selected sub-module 606–612 uses the supplied data to determine a color and opacity value;

(vi) the determined color and opacity is combined with remaining information from the fill priority message, namely the raster operation code, the alpha channel operation code, the source pop flag, and the destination pop flag, to form a color composite message, which is sent to the pixel compositing module 700 via the connection 698.

In the preferred embodiment the determined color and opacity is a red, green, blue and opacity quadruple with 8-bit precision in the usual manner giving 32 bits per pixel. However, a cyan, magenta, yellow and black quadruple with an implied opacity, or one of many other known color representations may alternatively be used. The red, green, blue and opacity case is used in the description below, but the description may also be applied to other cases.

The operation of the raster image module 606, the flat color module 608, the linearly ramped color module 610, and the opacity tile module 612 will now be described.

The flat color module 608 interprets the supplied record as a fixed format record containing three 8-bit color components (typically interpreted as red, green and blue components) and an 8-bit opacity value (typically interpreted as a measure of the fraction of a pixel which is covered by the specified color, where 0 means no coverage, that is complete transparency, and 255 means complete coverage, that is, completely opaque). This color and opacity value is output directly via the connection 698 and forms the determined color and opacity without further processing.

The linearly ramped color module 610 interprets the supplied record as a fixed format record containing four sets of three constants, cx, cy, and d, being associated with the three color and one opacity components. For each of these four sets, a result value r is computed by combining the three constants with the current X count, x, and the current Y count, y, using the formula:

$$r = \text{clamp}\ (cx^*x + cy^*y + d)$$

Where the function clamp is defined as:

$$\text{clamp}\ (x) = \begin{cases} 255 & 255 < x \\ \lfloor x \rfloor & 0 <= x <= 255 \\ 0 & x < 0 \end{cases}$$

The four results so produced are formed into a color and opacity value. This color and opacity value is output directly via the connection 698 and forms the determined color and opacity without further processing.

The opacity tile module 612 interprets the supplied record as a fixed format record containing three 8-bit color components, an 8-bit opacity value, an integer X phase, (px), a Y phase, (py), an X scale, (sx), a Y scale, (sy), and a 64 bit mask. These values originate in the display list generation and contained typically in the original page description. A bit address, a, in the bit mask, is determined by the formula:

$$a = ((x/2^{sx} + px) \bmod 8) + ((y/2^{sy} + py) \bmod 8) \times 8$$

The bit at the address "a" in the bit mask is examined. If the examined bit is one, the color and opacity from the record is copied directly to the output of the module 612 and forms the determined color and opacity. If the examined bit is zero, a color having three zero component values and a zero opacity value is formed and output as the determined color and opacity.

The raster image module 606 interprets the supplied record as a fixed format record containing six constants, a, b, c, d, tx, and ty; an integer count of the number of bits (bpl) in each raster line of the raster image pixel data 16 to be sampled; and a pixel type. The pixel type indicates whether the pixel data 16 in the raster image pixel data is to be interpreted as one of:

(i) one bit per pixel black and white opaque pixels;

(ii) one bit per pixel opaque black or transparent pixels;

(iii) 8 bits per pixel grey scale opaque pixels;

(iv) 8 bits per pixel black opacity scale pixels;

(v) 24 bits per pixel opaque three color component pixels; or (vi) 32 bits per pixel three color component plus opacity pixels.

Many other formats are possible.

The raster image module 606 uses the pixel type indicator to determine a pixel size (bpp) in bits. Then a bit address, a, in the raster image pixel data 16 is calculated having the formula:

$$a = bpp^* \lfloor a^*x + c^*y + tx \rfloor + bpl^* \lfloor b^*x + d^*y + ty \rfloor$$

A pixel interpreted according to the pixel type from the record 602 is fetched from the calculated address "a" in the raster image pixel data 16. The pixel is expanded as necessary to have three eight bit color components and an eight bit opacity component. By "expanded", it is meant for example, that a pixel from an eight bit per pixel grey scale opaque raster image would have the sampled eight bit value applied to each of the red, green and blue component, and the opacity component set to fully opaque. This then forms the determined color and opacity output 698 to the pixel compositing module 700.

As a consequence, the raster pixel data valid within a displayable object is obtained through the determination of a mapping to the pixel image data within the memory 16. This effectively implements an affine transform of the raster pixel data into the object-based image and is more efficient than prior art methods which transfer pixel data from an image source to a frame store where compositing with graphic object may occur.

As a preferred feature to the above, interpolation between pixels in the raster image pixel data 16 may optionally be performed by first calculating intermediate results p, and q according to the formulae:

$$p = a^*x + c^*y + tx$$

$$q = b^*x + d^*y + ty$$

Next the bit addresses, a00, a01, a10, and a11, of four pixels in the raster image pixel data 16 are determined according to the formulae:

$$a00 = bpp^* \lfloor p \rfloor + bpl^* \lfloor q \rfloor$$

$$a01 = a00 + bpp$$

$$a10 = a00 + bpl$$

$$a11 = a00 + bpl + bpp$$

Next, a result pixel component value, r, is determined for each color and opacity component according to the formula:

$$r = \text{interp}(\text{interp}(\text{get}(a00), \text{get}(a01), p), \text{interp}(\text{get}(a10), \text{get}(a11), p), q)$$

where the function interp is defined as:

interp(a, b, c)=a+(b−a)*(c−⌊c⌋)

In the above equations, the representation ⌊value⌋=floor (value), where a floor operation involves discarding the fractional part of the value.

The get function returns the value of the current pixel component sampled from the raster image pixel data 16 at the given bit address. Note that for some components of some image types this can be an implied value.

As a preferred feature to the above, image tiling may optionally be performed by using x and y values in the above equations which are derived from the current X and Y counters 614,616 by a modulus operation with a tile size read from the supplied record.

Many more such fill color generation sub-modules are possible.

The operation of the pixel compositing module 700 will now be described. Incoming messages from the fill color determination module 600, which include repeat messages, color composite messages, end of pixel messages, and end of scanline messages are processed in sequence.

Upon receipt of a repeat message or an end of scanline message, the pixel compositing module 700 forwards the message to a pixel output FIFO 702 without further processing.

Upon receipt of a color composite message the pixel compositing module 700 typically, and in general terms combines the color and opacity from the color composite message with a color and opacity popped from the pixel compositing stack 38 according to the raster operation and alpha channel operation from the color composite message. It then pushes the result back onto the pixel compositing stack 38. A description of the processing performed upon of receipt of a color composite message is given below.

Upon receipt of an end of pixel message, the pixel compositing module 700 pops a color and opacity from the pixel compositing stack 38, with the exception that if the stack 38 is empty an opaque white value is used. The resultant color and opacity is formed into an pixel output message which is forwarded to the pixel output FIFO.

Figure 23:
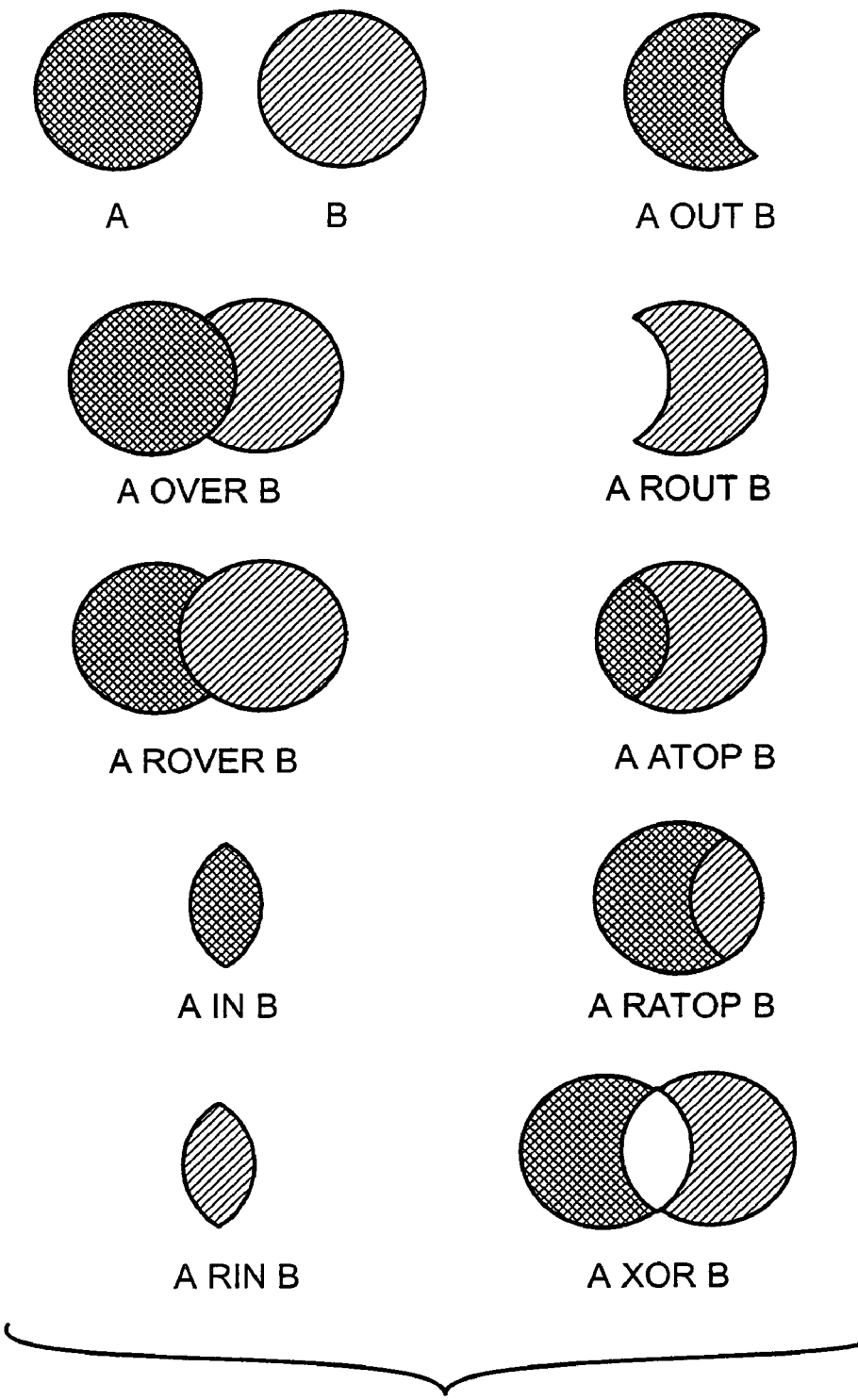
FIG. 23 depicts the result of a number of compositing operations.

A known compositing approach is that described in "Compositing Digital Images", Porter, T; Duff, T; Computer Graphics, Vol. 18 No. 3 (1984) pp. 253–259. Examples of Porter and Duff compositing operations are shown in FIG. 23. However, such an approach is deficient in that it only permits handling source and destination color in the intersecting region formed by the composite and as a consequence is unable to accommodate the influence of transparency in the intersecting region. This results in the raster operations defined by Porter and Duff as being essentially inoperative in the presence of transparency.

The processing performed by the pixel compositing module 700 upon receipt of a color composite message will now be described.

Upon receipt of a color composite message, the pixel compositing module 700 first forms a source color and opacity. This is taken from the color and opacity provided in the color composite message unless the pop source flag is set in the color composite message, in which case the color is popped from the pixel compositing stack 38 instead. If at this time, or during any pop of the pixel compositing stack, the pixel compositing stack 38 is found to be empty, an opaque white color value is used without any error indication. Next, a destination color and opacity is popped from the pixel compositing stack 38, except that if the destination pop flag is not set in the color composite message, the stack pointer is not disturbed during the "pop" operation, in effect making this a read from top of stack 38 instead.

Figure 9A:
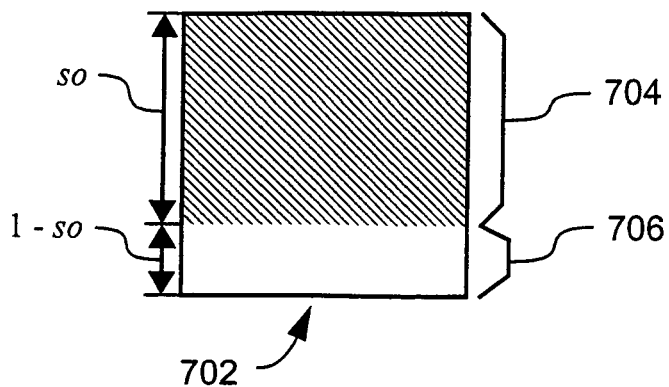
FIGS. 9A to 9C illustrate pixel combinations between source and destination.
Figure 9B:
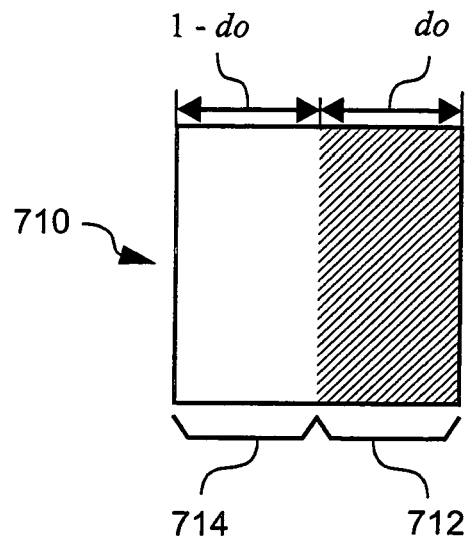
Figure 9C:
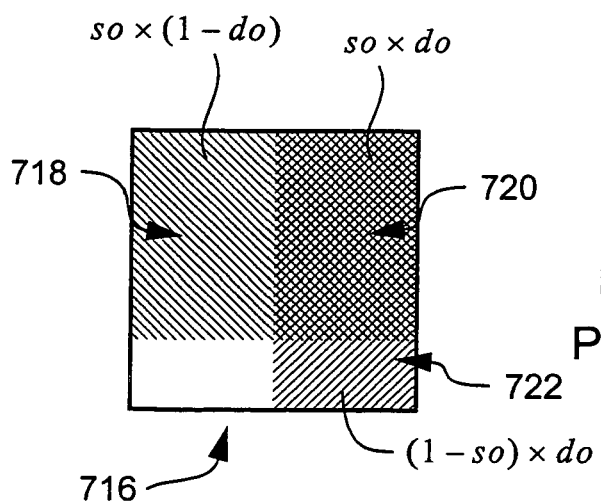

The method of combining the source color and opacity with the destination color and opacity will now be described with reference to FIGS. 9A to 9C. For the purposes of this description, color and opacity values are considered to range from 0 to 1, (i.e., normalized) although they are typically stored as 8-bit values in the range 0 to 255. For the purposes of compositing together two pixels, each pixel is regarded as being divided into two regions, one region being fully opaque and the other fully transparent, with the opacity value being an indication of the proportion of these two regions. FIG. 9A shows a source pixel 702 which has some three component color value not shown in the figure and an opacity value, (so). The shaded region of the source pixel 702 represents the fully opaque portion 704 of the pixel 702. Similarly, the non-shaded region in FIG. 9A represents that proportion 706 of the source pixel 702 considered to be fully transparent. FIG. 9B shows a destination pixel 710 with some opacity value, (do). The shaded region of the destination pixel 710 represents the fully opaque portion 712 of the pixel 710. Similarly, the pixel 710 has a fully transparent portion 714. The opaque regions of the source pixel 702 and destination pixel 710 are, for the purposes of the combination, considered to be orthogonal to each other. The overlay 716 of these two pixels is shown in FIG. 9C. Three regions of interest exist, which include a source outside destination 718 which has an area of so*(1−do), a source intersect destination 720 which has an area of so*do, and a destination outside source 722 which has an area of (1−so)*do. The color value of each of these three regions is calculated conceptually independently. The source outside destination region 718 takes its color directly from the source color. The destination outside source region 722 takes its color directly from the destination color. The source intersect destination region 720 takes its color from a combination of the source and destination color. The process of combining source and destination color, as distinct from the other operations discussed above is termed a raster operation and is one of a set of functions as specified by the raster operation code from the pixel composite message.

Some of the raster operations included in the preferred embodiment are shown in Table 2 annexed to this specification at page 101.

Each function is applied to each pair of corresponding color components of the source and destination color to obtain a like component in the resultant color. Many other functions are possible.

The alpha channel operation from the composite pixel message is also considered. The alpha channel operation is performed using three flags, each of which corresponds to one of the regions of interest in the overlay 716 of the source pixel 702 and the destination pixel 710. For each of the regions, a region opacity value is formed which is zero if the corresponding flag in the alpha channel operation is not set, else it is the area of the region.

The resultant opacity is formed from the sum of the region opacities. Each component of the result color is then formed by the sum of the products of each pair of region color and region opacity, divided by the resultant opacity.

The resultant color and opacity is pushed onto the pixel compositing stack 38.

Expression trees are often used to describe the compositing operations required to form an image, and typically comprise a plurality of nodes including leaf nodes, unary nodes and binary nodes. A leaf node is the outermost node of an expression tree, has no descendent nodes and represents a primitive constituent of an image. Unary nodes represent an operation which modifies the pixel data coming out of the part of the tree below the unary operator. A binary node typically branches to left and right subtrees, wherein each subtree is itself is an expression tree comprising at least one leaf node.

When compositing with arbitrary shaped objects, there arises a problem that the various stack operations mentioned above are different for different areas of the image, these depending upon those objects that are active at particular locations.

Figure 19A:
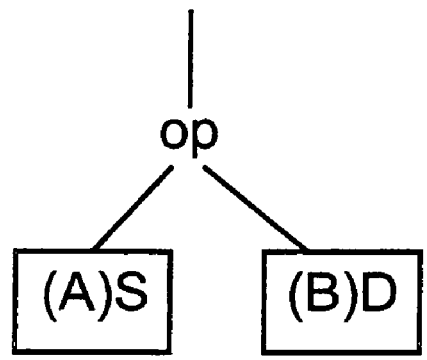
FIGS. 19A and 19B show a simple compositing expression illustrated as an expression tree and a corresponding depiction.
Figure 19B:
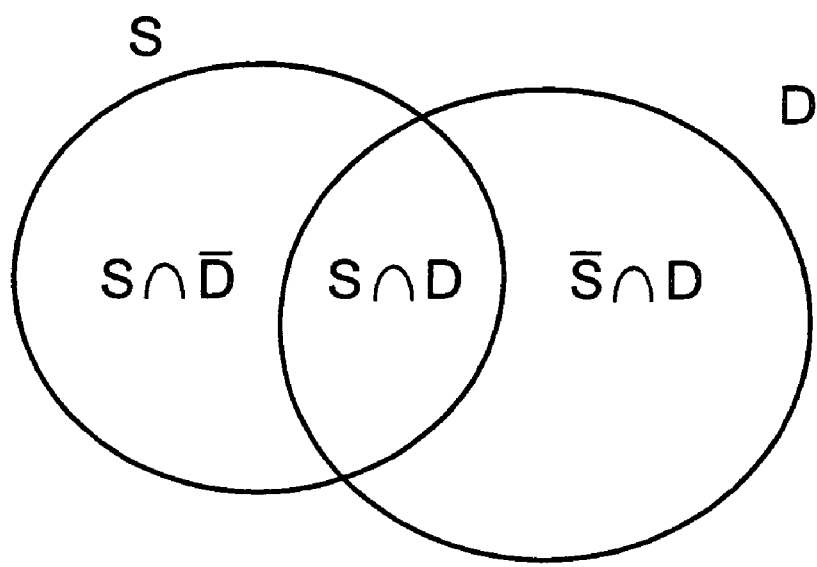

FIGS. 19A and 19B show a typical binary operation (illustrated as an expression tree) between source (S) and destination (D). Regardless of the actual operation being performed, the binary operation of FIG. 19A resolves into four cases or regions of activity as indicated below:

1. (A)S active, (B)D inactive;
2. (A)S active, (B)D active;
3. (A)S inactive, (B)D active; and
4. (A)S inactive, (B)D inactive.

Case 4 always results in no operation (NOP) being required to be performed and as a consequence, there exists three different combinations of active levels for a binary tree. Extensions of this concept to tertiary, quaternary and higher order trees will be apparent to those skilled in the art.

As a consequence, when building the compositing stack 38 (for the binary example), one of the three above identified operations is required to be implemented by the stack. Further, the different operations associated with each object in the stack depend upon what is below the object in the level activation table. For rendering of objects using simple OVER operations, as occurs in the Painter's Algorithm, this poses no problem. However for other compositing operations, the stack operations need to be changed depending on the activity of the operands of the compositing operation. While this can be done by clipping the levels providing the stack operations, the number of clips applying to each level can rapidly rise, creating difficulties in handling the stack operations. Examples of problematic operations are the Porter and Duff operations OUT and ROUT as seen in FIG. 23 where an object (operand) clips (alters the boundary of) the other object and has variable transparency in the intersection region.

In order to address this problem, a further table, noted herein as an "activity" table is provided which acts as an adjunct to the level activation table to provide for a logical determination of the alternative actions mentioned above.

Figure 20A:
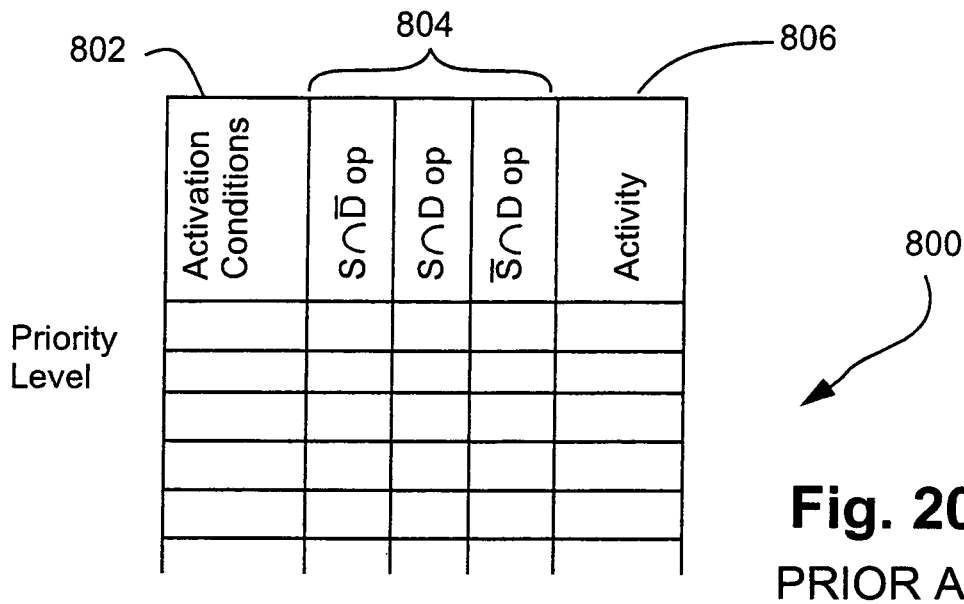
FIG. 20A depicts a table configured for ensuring accurate stack operations.

FIG. 20A illustrates a generic activity table 800 which includes essentially three sections. A first section 802 provides activation conditions for a specific fill level being processed. The second section 804 includes each of the different actions referred to above as appropriate for the respective levels (specifically for the binary example). The third section 806 indicates whether the source or destination object is active at the particular level. It is noted that the entries contained in the action section 804 may be the specific operations themselves or alternatively pointers to the level activation table where appropriate.

It is also noted that the various operations can provide data to other operations in some cases, but not in others. As a consequence, the activity table 800 can be modified to incorporate flags indicating various conditions for which the operation provides data.

Figure 20B:
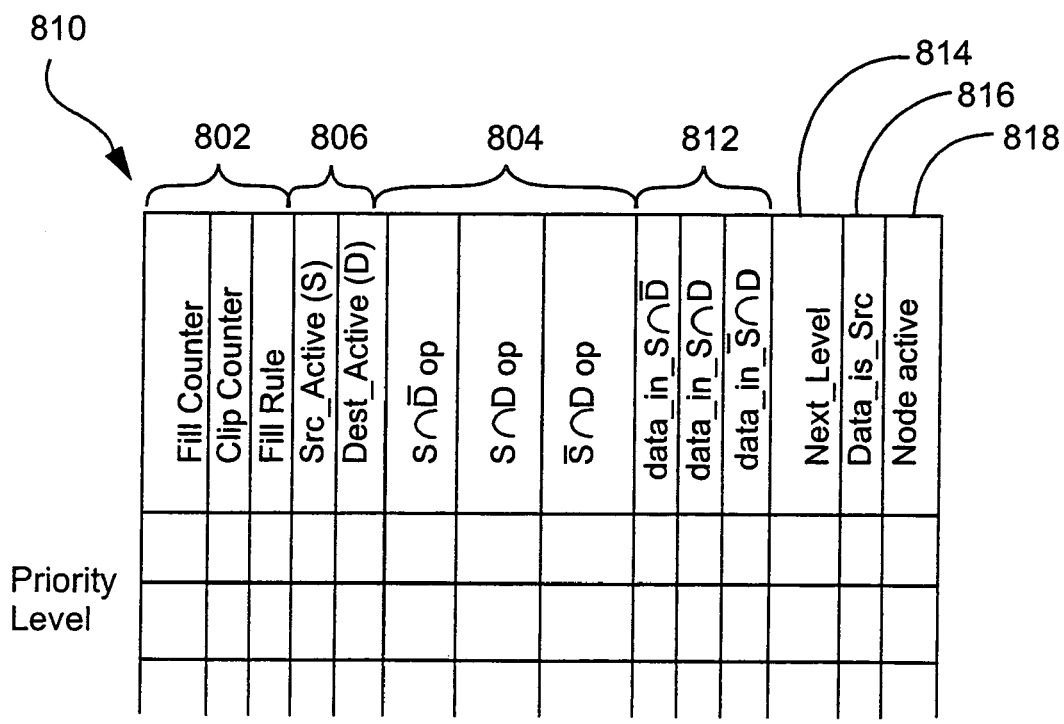
FIG. 20B is a preferred form of the table of FIG. 20A.

A data structure for a preferred form of the activity table is seen in FIG. 20B as the table 810. The table 810 includes a pointer 814 (Next Level) to an entry for the next operation which uses the data, and a flag 806 (or a set of flags where tertiary and higher order trees are being used) that indicates the branch of the expression tree for which the operation is providing data (Src_Active/Dest_active). The table 810 also includes a flag 816 that indicates whether the operation is providing data in the source or destination branch. If so, the Src_active or Dest_Active flags 806 in the next level entry are adjusted accordingly when an activity state 818 of the operation changes. Since an operation only provides data in certain combinations, further flags 812 (data_in_*) are provided to indicate this. The flags 812, in combinations with the Src/Dest_Active flags 806, determine the activity state of a level. Further, since any operation only has to alter the state of the next level if its own activity state changes, the node active flag 818 is provided to monitor such a situation.

For right leaf nodes, it is therefore necessary to activate a Push operation and the Dest_active flag in the next operation record. For left leaf nodes, it is necessary to activate the Src_active flag on an edge crossing, noting that the destination may already be active.

In FIG. 20B, the activation conditions 802 include the fill rule which determines activation of leaf nodes, and the fill count which is used in the manner as described above for the level activation table. The clip count operates also in the manner described above. Edge crossings activate (source) levels in the table 810.

When an activation state of a level changes, the change propagates to the level pointed to by the Next Level entry 814. Depending upon the state of the Data_is_Src flag 816, the Src_Active/Dest_Active flag 806 is changed in the next level. The change propagates if the state of the next level also changes. The table entries contain operations for cases 1, 2 and 3 respectively. These may be pointers to levels within the level activation table, or actual operations (e.g., Alpha operation, color operations, fill type and stack operation flags). Alternatively, they may be NULL if no operation is required.

The activation state of a node level is determined by whether there is data for the next operation in the expression tree, as determined by the data_in $S \cap \overline{D}op$, $S \cap Dop$, $\overline{S} \cap Dop$ flags 812 and the Src/Dest_active flags 806 for the node level. This is depicted in the table as a Node_Active flag 818.

Figures 21, 22A:
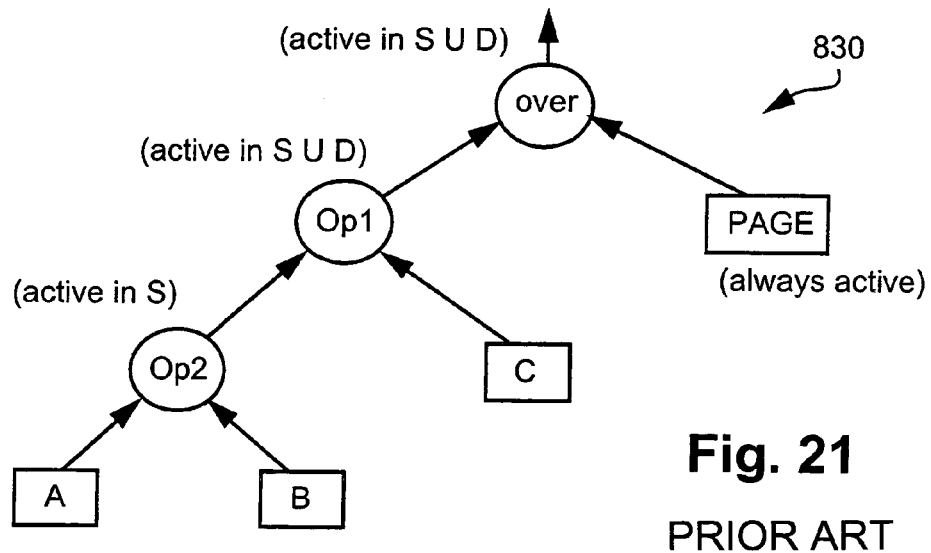

A specific example of this implementation is shown for an expression tree 830 seen in FIG. 21, and with a corresponding initial activity table 820 seen in FIG. 22A.

The expression tree 830 provides for the rendering of operands A, B and C onto a page, where the latter, for the sake of completeness is seen in the tree 830 as a right leaf node, PAGE. PAGE is always active and encompasses the entire image output space and therefore it may be omitted from the activity table 820.

Since B and C are leaf nodes, these form the lower levels of the table 820 and each result in activation operations 804 that can cause a push of the respective operator onto the compositing stack. Since each are right leaf nodes, C is pushed first, and the $\overline{S} \cap Dop$ is a NOP because nothing operates on operand C. The data_in_*op flags 812, Next Level 814 and Data_is_Src 816 flags are also updated. Operand B results in corresponding actions.

The next level in the activity table 820 is formed by the left leaf node A, and its corresponding operator Op2. Activation operations 804 for this level are updated with each of $\overline{S} \cap Dop$ and $\overline{S} \cap Dop$ being Aop2B each modified by a qualifier a or b respectively depicting the differences between the operations. The operation Op2 only provides data in S, and this is represented by an activity which pops B off the stack if D is active and S is not (ie. $\overline{S} \cap Dop$).

The next level in the table 820 relates to Op1 and produces respective qualified results a, b and c in the activation operations 804. For the final level over, since PAGE is always active, S∩D̄op and S̄∩Dop result in NOP to be pushed onto the stack. Only in the simple intersection S∩Dop, is over active.

For this example, let us consider what happens if A, B and C are initially inactive, and those operands are subsequently activated in turn.

If A is activated first, then AOp2a is activated on this level, reflected by the setting of the Scr_Active flag 806. Since the S∩D̄op flag 812 is set (since B is not yet active), the Node_Active flag 818 is then set for the level. Since the state of Node_Active has changed, the Src_Active flag 806 in the Op1 level is set. Note that Data_is_Src 816 is set for AOp2 level. The Op1 level has Src_Active and Dest_Active (since C is yet to be activated) so Op1a is activated on this level. Since S∩D is set, Node_Active 818 is then set for the Op1 level. Since the state of Node_Active 818 has changed, the Src_Active flag 806 in the over level is set. Since the over level has Src_active and Dest_Active (because PAGE is always active), then over is activated on this level. Since S∩D is set, Node_Active is set and the state of Node_Active has not changed. No further action is then required. The compositing stack 38, at this stage may be established from the table 820 to appear as seen in FIG. 22B.

Turning now to FIG. 22C, if B is activated next, Push B is activated on this level since S∩D̄ is set (and D is irrelevant, anyway). Node_Active 818 is set for this level. The state of Node_Active has changed, and therefore Dest_Active flag in the AOp2 level is set. AOp2bB is then activated, and AOp2aB is deactivated. Since S∩D is set, Node_Active remains set and the state of Node_Active is unchanged for AOp2a. No further action results. The compositing stack 38 then appears as seen in FIG. 22D.

Figures 22E, 22F:
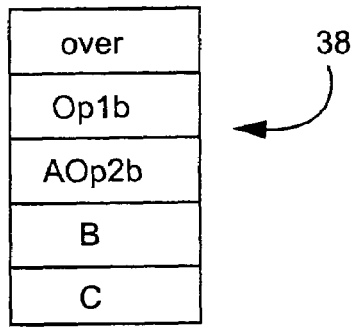

As seen in FIG. 22E, if C is activated next, Push C is activated on this level. Since S is active and D is irrelevant, Node_Active 818 is set for this level. Since Node_active has changed, the Dest_Active flag in Op1 level is then set. Op1b is activated so Op1a is deactivated. Since data in S∩D is set, Node_Active remains set. Since Node_Active is unchanged for the Op1 level, no further action is required. The compositing stack 38 then appears as seen in FIG. 22F.

This procedure continues for the evaluation of the entire expression tree of FIG. 21, thus providing for the activity table 820 to be established in such a way that various operations are established which may then be pushed onto the compositing stack as required by the various activation conditions 802 and activity indicators 804. In this fashion, regardless of the type of clipping or other operation being performed, the stack is able to be maintained with the correct operation at the correct level irrespective of the complexity of the expression tree being evaluated. Significantly, whilst the bulk of the expression tree is evaluated through the formation of the display list, generation of the display list is typically unable to account for variations in the operation of various objects such as clipping, these operations being required to implemented during the evaluation of the compositing expression.

It is further noted that further flags, one for src_is_leaf_node, which may be activated by edge crossings, and another for dest_is_PAGE (always active), can be useful. If dest_is_PAGE, it is possible to ignore the case as this never happens.

The above illustrates how the activity table 820 is built based on the structure of the expression tree 830, and has its entries completed (i.e., filled in) through the changing activation of the various operands of the tree 830. For the specific example of the table 820, 72 (=2×2×3×3×2) stack structures can arise to account for the different activations and possible outcomes. In this fashion, logical evaluation of the conditions 802, 806, 812, 814, 816 and 818 results in the correct activity 804 being identified as the appropriate stack operation for the particular level.

Figure 22G:
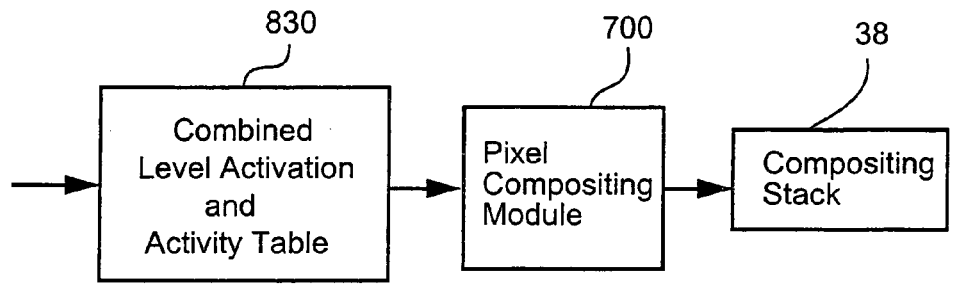
FIGS. 22G to 22I depict various configurations of the activity table and associated modules.

In an alternative implementation, rather than being constructed as an independent table, the activity table 820 may be merged into the level activation table 530 to give a combined table 830. This avoids the replication of data whilst permitting the priority encoders 512,514 to select not only the correct edge priority but also activation operation, the latter being transferred (progressively) to the pixel compositing stack 38 for evaluation by the compositing module 700 using the fill colors derived from the module 600. Such an arrangement is depicted functionally in FIG. 22G.

Figure 22H:
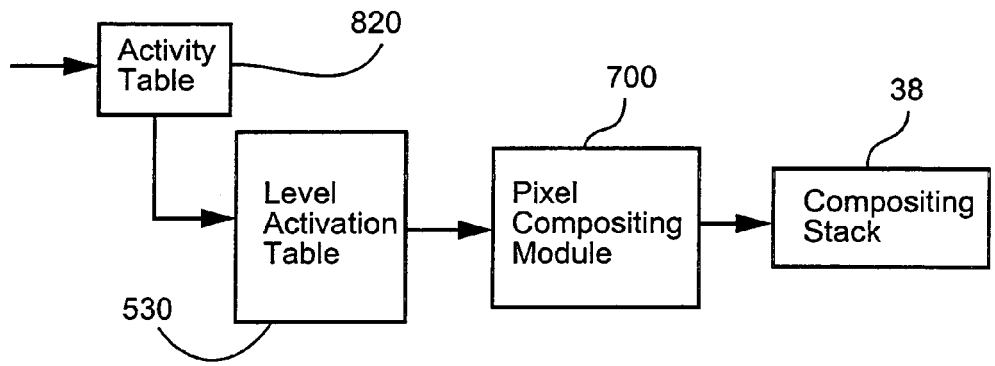
Figure 22I:
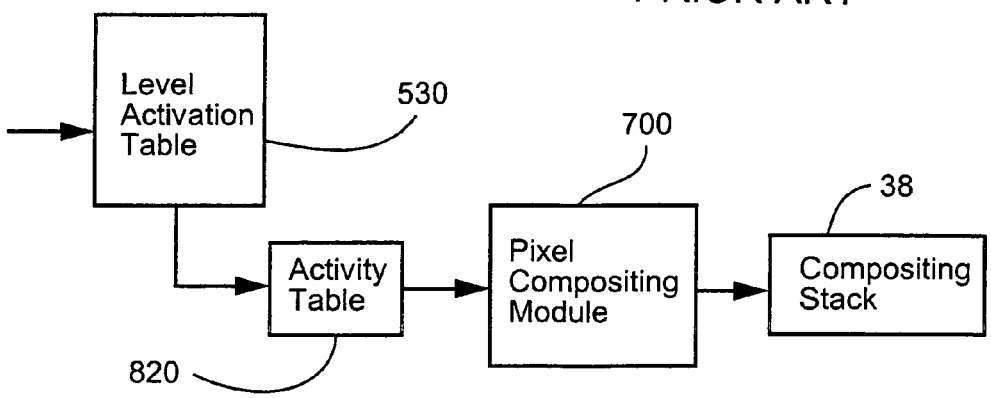

Alternatively, as seen functionally in FIG. 22H, the activity table 820 may precede the level activation table 530. In such a case, columns for fill count and clip count are included in the activity table 820 and may be omitted from the level activation table 530. In a further alternative configuration, shown functionally in FIG. 22I, the activity table 820 may follow the level activation table 530. In that case, the activity table 820 can omit fill count and clip count as these are included in the level activation table 530. In some applications, where an activity table 820 is configured as shown in FIG. 22A, the level activation table 530 may be omitted.

The operation codes described above with reference to the activity table 820 and the stack 38 derive from the display list and the instruction stream 14 in particular (see FIG. 5). The operation codes are transferred in parallel with other data (e.g., edge crossings, fill data, etc.) through the pipeline of processing stages shown in FIG. 5 and the pixel compositing module 700 places the op codes onto the stack in the order determined as a consequence of priority determination, level activation and fill determination.

The operation of the pixel output module 800 will now be described. Incoming messages are read from the pixel output FIFO, which include pixel output messages, repeat messages, and end of scanline messages are processed in sequence.

Upon receipt of a pixel output message the pixel output module 800 stores the pixel and also forwards the pixel to its output. Upon receipt of a repeat message the last stored pixel is forwarded to the output 898 as many times as specified by the count from the repeat message. Upon receipt of an end of scanline message the pixel output module 800 passes the message to its output.

The output 898 may connect as required to any device that utilizes pixel image data. Such devices include output devices such as video display units or printers, or memory storage devices such as hard disk, semiconductor RAM including line, band or frame stores, or a computer network. However, as will be apparent from the foregoing, a method and apparatus are described that provide for the rendering of graphic objects with full functionality demanded by sophisticated graphic description languages without a need for intermediate storage of pixel image data during the rendering process.

1.2 Operating in Accordance with a Second Mode

The computer system 1 comprises a mechanism which tracks each edge as the system traverses a scanline of the rendered page, and for each edge, determines the minimum and maximum extent of the traversal in the scanning direction, and places additional records in the list of records 32 which define the edge positions for the next scanline. These records 32 are then sorted into ascending order for the next scanline. Each of these records, when read in on the next scanline, generates a message to the priority determination module 500. Each message tells the priority determination module 500 to increment or decrement the various counters associated with the levels to which the edge applies, as is discussed in the next paragraphs.

In the pixel-sequential rendering apparatus 20, a priority determination module 500 receives messages from the edge processing module 400. The priority determination module 500 comprises a table of levels, where each priority level includes a fill counter, and records containing the conditions under which the object represented in part or in whole by the level is activated. Each level also contains a compositing operation, which is to be performed when constructing pixels for which the object represented by the level is active. If several instructions are required to be performed when an object is active, a level is required for each instruction. A fill rule, defining the topology of an object, is included in each table entry. Preferably, the fill rule is defined using a flag bit in each level to indicate whether the object uses the non-zero winding or the odd even fill rule. In the non-zero winding fill rule, if the fill counter value is non-zero, an object is active, and is inactive otherwise. On the other hand, in the odd-even fill rule, an object is active if the fill counter value is odd (or equivalently, if the least significant bit of the fill counter is asserted), and is inactive otherwise. The pixel run between two successive edges with different X position values is filled, using the active instructions. Obviously, if successive edge messages have the same X position, no pixel run is generated. Thus, the full image is built up in pixel sequence.

Preferably, the priority determination module 500 comprises the addition of an extra counter, the override counter. The apparatus 20 in the second operating mode overrides the fill rule when the override counter is non-zero. Furthermore, the edge crossing messages between the edge processing module 400 and the priority determination module 500 are constructed such that the override counter is set to non-zero for those pixels touched by the edges of the object, and zero otherwise. For the remaining pixels, the fill rule and the fill counter determine whether an object is active.

In the pixel sequential rendering apparatus 20 the scanlines are processed one at a time from top to bottom. For each scanline currently being processed, the position of each edge intersecting the current scanline is obtained from a sorted list of active edge records, as the first step in the rendering sequence. As previously described, each edge controls one or more levels in the priority determination module 500, activating or deactivating the levels it controls, such that only the instructions from active levels in the display list actually contribute to the final pixel value.

The mechanism of calculating edge positions and activating levels in the priority determination module in the first operating mode, discussed in the previous section, is insufficient for the case where every pixel touched by an edge must be activated. In the first operating mode, the edge is calculated to pixel accuracy in the Y direction, and sub-pixel accuracy in the X direction, in order to determine the locus of the edge. The Y-extent of segments is therefore stored using integer representation, whereas the X-extent of the segments is stored using a fixed point representation. On the other hand, in the second operating mode, the edge is calculated to sub-pixel accuracy in the Y direction, as well as the X direction, in order to determine the locus of the edge. The Y-extent of segments is therefore stored using a fixed point representation, both in the segment data formats provided with new edges, and in the active edge itself. A floating-point representation may also be used for this purpose.

In the second operating mode, two classes of edge records are used. The first class of edge records are equivalent to those edge records of the type used in the first operating mode, as described in the previous section, from which edge positions on subsequent scanlines are calculated. The first class of edge record is also provided to mark one end of the X-extent of the intersection of the edge with the next scanline. The second class of edge record is provided to mark the one or more other ends of the X-extent of the intersection of the edge with the next scanline. These second class of edge records exist for one scanline before being discarded. Because the record is to be discarded immediately, the information for calculating the position of the edge on subsequent scanlines is not required, and may be left out of the edge record. An edge record in this second class of edge record will hereafter be referred to as a terminating record, whereas an edge record of the first class will hereafter be referred to as a continuing edge record. Also in the second operating mode, the priority state table (502) based on a fill counter on each level for the fill rule is extended by adding an extra counter, hereafter referred to as the override counter. As it will be seen, the override counter is non-zero for pixels touched by an edge, and is used to ensure that these pixels are activated, regardless of the state of the fill counter.

Figures 25, 26:
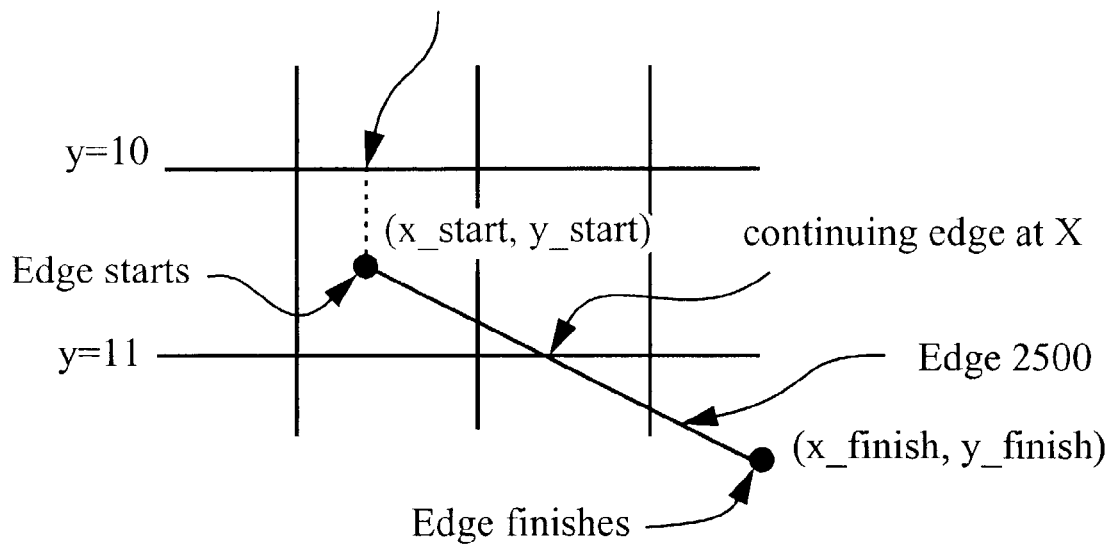
FIG. 25 shows an example of the generation by the driver software of a continuing edge record and a terminating edge record of a new edge.
FIG. 26 shows a subsection of the level activation mechanism in the preferred embodiment, comprising several levels.

Turning now to FIG. 26, there is shown the preferred format of such a priority state table. There are three counters on each level for the level activation mechanism of the priority determination module 500: the two of relevance to the second operating mode are the fill counter and the override counter. The clip counter is provided for a separate clipping mechanism, discussed in the previous section. As described in the previous section, in addition to the counters there are a number of fields governing the operation to be performed by the level when it is active. On any scanline, the fill counter on each level is used to count the number of edges, referring to that level, which have been crossed since the beginning of a scanline. This is used in conjunction with the fill rule, indicated by the state of the fill rule flag, to determine whether a level is active for a pixel, or run of pixels. The override counter is used to override the fill counter, over the section of a scanline covered by the locus of the edge before it crosses to the next scanline. Thus the level is active when any of the following conditions occur:

(i) the fill rule flag is de-asserted indicating a non-zero winding fill rule and the fill counter is non-zero; or (ii) the fill rule flag is asserted indicating an odd-even fill rule and the fill counter is odd; or (iii) the override counter is non-zero.

An extra bit is added to the activation information that is stored in the edge record to control the override counter in each level of the level activation mechanism of the priority determination module. The extra bit will be referred to as the override flag.

Returning now to FIG. 14A there is shown the format of an active edge record. AS mentioned previously, there are fields for:

(i) the current X position, (ii) a DX value to be added to the X position to obtain the edge position on the next scanline or part thereof, (iii) a record, NY, of how much further the edge has to proceed in the Y direction before another segment has to be read in, (iv) a segment address, being that of the next segment in the edge, (v) a value P containing either a single priority index for the priority which the edge affects or the address of the list of priorities which the edge affects, the latter case may be required where several graphical operations are required to render an object or where a clipping object affects a number of other objects, and (vi) a set of flags, marked d, c, u, o, and p.

In terminating records, the DX, NY, segment address fields, and any other fields for updating the edges (e.g., DDX and higher orders) are not required, and thus may be left out.

As described in the previous section, extra fields may be used for DDX and higher order terms, if edge tracking is to be performed to higher orders.

In the first operating mode, the NY value is stored and maintained as an integer value; however in the second operating mode, NY is stored to sub-pixel accuracy, which requires storage as a fixed point or a floating point number. In a hardware implementation, fixed point storage is usually more convenient.

Flag d (DIRECT_CLIP) determines whether the edge affects the clipping counter or the fill counter; and is used for the clipping mechanism, mentioned earlier, not under discussion here.

Flag c (CONTINUING) determines whether the edge is a continuing edge (flag c asserted) or a terminating record (flag c de-asserted).

Flag u (UP) determines whether the fill counter is incremented or decremented by a continuing edge. Flag u is ignored for terminating records, which only affect the override count.

Flag o (OVERRIDE) determines whether the override count is incremented or decremented by the edge.

Flag p (POSTSCRIPT) is an enable bit, enabling the override mechanism when asserted. When flag p is asserted, flags c and o have the meanings indicated above. When flag p is de-asserted, flags c and o may either be ignored, or be used for other purposes.

In the second operating mode, when the position of the edge is calculated for the next scanline, continuing edges are tracked with sub-pixel precision down the page (in the Y direction) as well as across it (in the X direction). A memory or register herein called dNY is provided to store the current Y position within a scanline. The dNY register is initialized to 0 for each edge when tracking commences. Two memories or registers herein called MinX and MaxX are also provided to store the minimum and maximum X position of the edge respectively during the edge's excursion across the scanline. The entry position of an edge into the scanline is loaded into these two registers when the edge record is read in from memory. The position of the edge is tracked within a scanline, with the minimum and maximum excursion in the X-direction also being tracked.

Figure 24A:
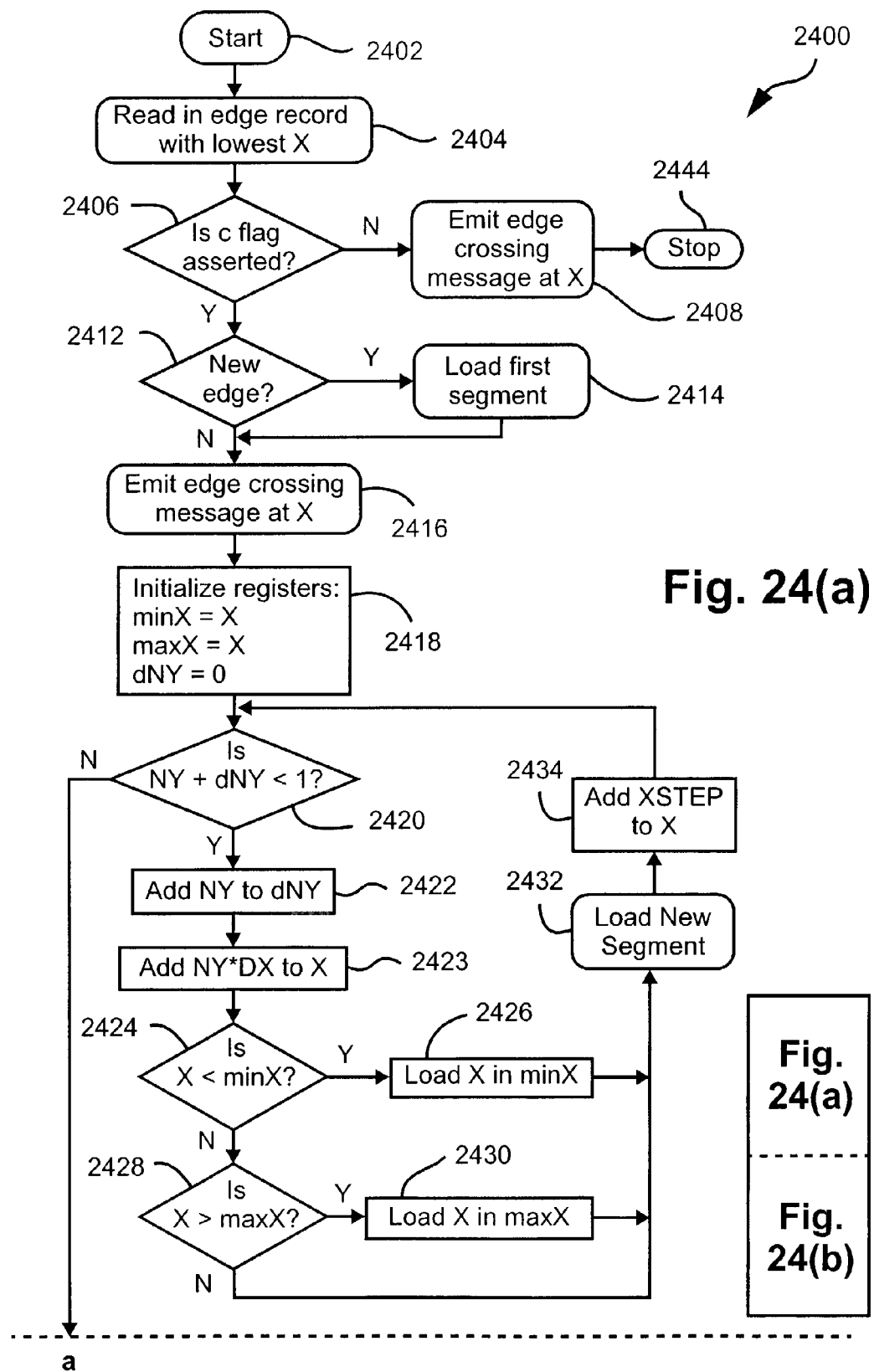
FIG. 24, which consists of FIGS. 24(a) and 24(b), shows the flowchart of the edge tracking mechanism, which generates the extra records that ensure that pixels touched by and edge are filled.
Figure 24B:
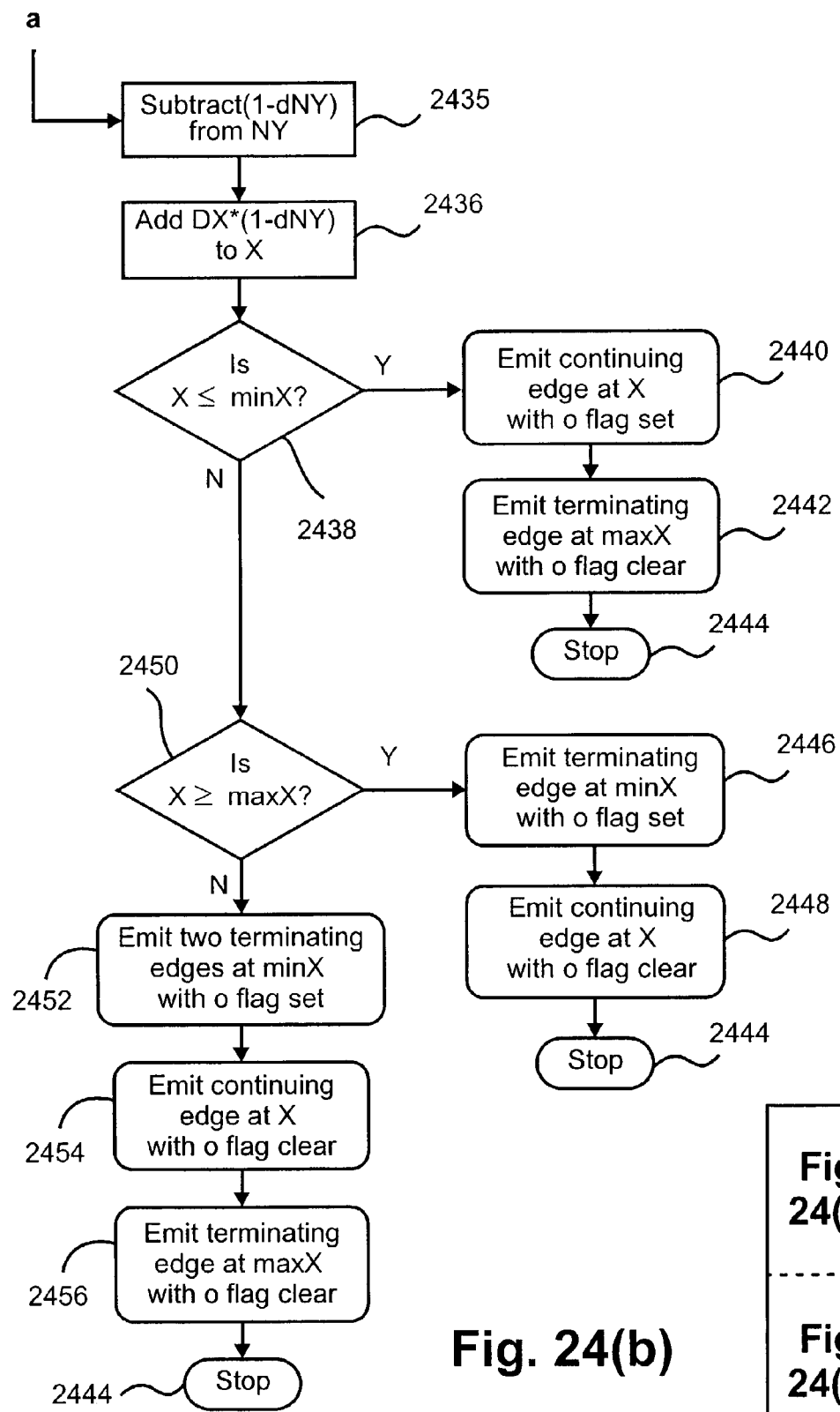

Turning now to FIG. 24, there is shown a method 2400 of tracking edges in the pixel sequential render apparatus 20 during the second operating mode. The method 2400 commences at step 2402 and proceeds to step 2404 where the edge record with the currently lowest X value is read in. This method 2400 is implemented when the edge records contain a flag p indicating that all pixels, which are touched by edges of an object, are to be filled by that object. Otherwise, the pixel sequential rendering apparatus 20 proceeds to operate in the first operating mode, which will be described in more detail below. The method 2400 is implemented in and called by the edge processing module 400 for each edge record in raster order. For ease of explanation, the method is described with reference to an arbitrary scanline, herein called the current scanline.

During step 2404, an edge record is selected and read in step 2404 by the edge input module 408 from one of the three lists, (the new edge list 402, the active edge 404) and spill edge lists 406) in the edge record store 32. The edge input module 408 maintains references to records in each of the three lists, 402, 404, and 406. Preferably, the edge records in each list 402, 404, 406 are ordered by the value in their X fields (current scanline intersection X co-ordinate). Each of these references is initialized to refer to the first edge in each list at the start of processing of a scanline. Thereafter, the edge input module 408 selects an edge record from one of the three referenced edge records such that the record selected is the one with the lowest X value in their X field out of the three referenced records. The reference that was used to select that record is then advanced to the next record in that list. In this way, the edge processing module processes the edge records of the current scanline in raster order. After the edge record is read in step 2404, the edge input module checks at step 2406 the c (CONTINUING) flag of the current edge record. If the check reveals the c (CONTINUING) flag is de-asserted, a terminating edge crossing message is generated and passed at step 2408 down the pipeline 498 to the priority determination module 500. The generated terminating edge crossing message preferably comprises the following data, but is not limited thereto: an integral X position value; flags p, o, u, c, d; and the level number of the edge. The flags p, o, u, c, d of the terminating edge crossing message are copied from the current (terminating) edge record. The integral X position value is obtained from rounding the X value in the X field of the current (terminating) edge record. If the override o flag is asserted, then the X value from the X field is rounded down to the nearest integer X value to obtain the integral X position value. Whereas if the override o flag is de-asserted then the X value from the X field is rounded up to the nearest X value to obtain the integral X position value. Preferably, during the second operating mode the computer system 1 implements the PostScriPt™ rasterization rule, and the roundup and round down operations are specifically implemented as floor(X) +1 and floor(X) operations respectively. However, other variations are possible. For example, these round up and round down operations may instead be implemented as ceil(X) and floor(X) operations respectively. If the current (terminating) edge record contains a level index, then there is one terminating edge crossing message produced for each level in the list pointed to by the index. After the terminating edge crossing message is then passed to the priority determination module 500, the method is terminated at step 2444.

After termination at step 2444, the edge processing module 400 then calls the method 2400 again for processing the next edge record in the current scanline, that is for processing the edge record with the next lowest X position at step 2404. In this way, the edge processing module processes the edge records of the current scanline in raster order. If the edge record is the last edge record in the current scanline, the edge processing module 400 emits an end of scanline message and updates the edge lists for the next scanline. During this updating process, the buffers storing the edge records are swapped so that the updated edge lists (404', 406') becomes the current edge list and the old lists (404, 406) are invalidated, and the updated new edge list is loaded (402). The method is then called again for processing the first edge record in the next scanline at the lowest X position. The edge processing module 400 continues in this fashion until all edge records have been processed.

If on the other hand, the check of step 2406 reveals that the c (CONTINUING) flag of the edge record is asserted, the edge input module 408 then checks at step 2412 whether the current edge record is a new edge, namely whether the current edge record is from the new edge list 402. If the current edge record is a new edge record, the edge input module 408 then loads at step 2414 the first segment of the segments of the new edge record into an active edge record for the edge. The active edge record is also loaded at step 2414 with the updating information, NY and DX, for the first segment of the edge, and the address of the next segment of the edge. The edge input module 408 then proceeds to step 2416. Otherwise, if the check at step 2412 reveals the edge record is not a new edge record, the edge input module 408 proceeds directly to step 2416.

The edge input module 408 then generates at step 2416 a continuing edge crossing message for position X of the current scanline and passes at step 2416 this down the pipeline 498 to the priority determination module 500. The generated continuing edge crossing message preferably comprises the following data, but is not limited thereto: an integral X position value; flags p, o, u, c, d; and the level number of the edge. The flags p, o, u, c, d of the terminating edge crossing message are copied from the current (continuing) edge record. The integral X position value is obtained from rounding the X value in the X field of the current (terminating) edge record. If the override o flag is asserted, then the X value from the X field is rounded down to the nearest integer X value to obtain the integral X position value. Whereas if the override o flag is de-asserted then the X value from the X field is rounded up to the nearest X value to obtain the integral X position value. It is important to note that the X value in the X field of the current continuing edge record is not rounded as the floating point sub-pixel X value is required for sorting and processing by the edge processing module 400 for the next scanline. If the current (continuing) edge record contains a level index, then there is one continuing edge crossing message produced for each level in the list pointed to by the index. As the current edge record is a continuing edge record, this edge record is also passed at step 2416 to the edge update module 410 for determining the corresponding edge record(s) intersecting the next scanline after the current scanline.

The edge update module 410 upon receipt of this continuing edge record initializes at step 2418 registers minX=X, maxX=X and dNY=0, where X is the position of continuing edge record. The edge update module 410 then checks at step 2420 whether NY+dNY<1. In the event the check 2420 reveals that NY+dNY>=1, the edge update module 410 then decrements at step 2435 the NY value in the NY field by (1−dNY), and adds, at step 2436, DX(1−dNY) to X value in the X field of the continuing edge record, thus obtaining a new continuing edge for the next scanline having new X and NY values. After step 2436, the edge update module 410 then at step 2438 compares the value of the new X position stored in the continuing edge record with the value stored in the register minX.

Figure 27A:
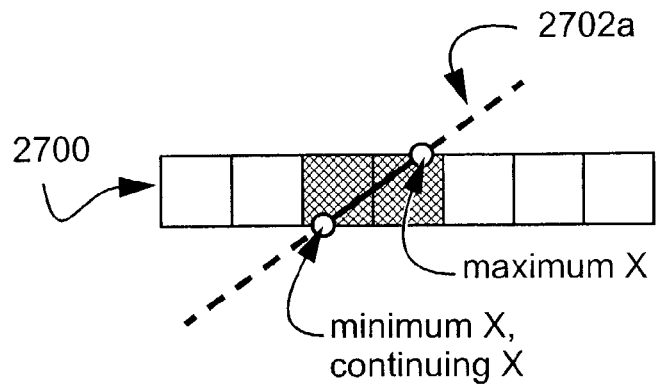
FIGS. 27(a) to 27(c) show the positions in the maximum, minimum, and continuing X position registers for an edge traversing a scanline, comparing he results for the three possible arrangements of these values.

In the event the comparison 2438 reveals that the new X position is less than or equal to the value stored in the register minX, the edge update module 410 proceeds to step 2440. In step 2440, The edge update module 410 asserts the override o flag of the new continuing edge record and emits at step 2440 the new continuing edge record to the edge pool 412 for processing during the next scanline. After step 2440, the edge update module 410 generates at step 2442 a terminating edge record having the override o flag de-asserted (cleared) and having the X field set to the value stored in the register maxX. The edge update module 410 then emits at step 2442 the terminating record to the edge pool 412 for processing during the next scanline. In the branch formed by steps 2440 and 2442, the two edge records define the extent of the edge within the next scanline. Namely, the new continuing edge record defines the minimum extent and the terminating edge record defines the maximum extent of the current edge within the next scanline as will be described in more detail with reference to FIG. 27A.

After step 2442, the method terminates at step 2444 and the edge processing module 400 calls the method again in the manner described above. On the other hand, in the event the comparison of step 2438 reveals that the new X position is greater than the value stored in the register minX, the edge update module 410 then compares at step 2450 the value of the new X position stored in the new continuing edge record with the value stored in the register maxX.

In the event, the comparison of step 2450 reveals that the new X position is greater or equal to than the value stored in the register maxX, the edge update module 410 then proceeds to step 2446. In step 2446, the edge update module 410 generates a terminating edge record having the override o flag asserted and having the X field set to the value stored in the register minX. The edge update module 410 then emits in step 2446 the terminating record to the edge pool 412 for processing during the next scanline.

Figure 27B:
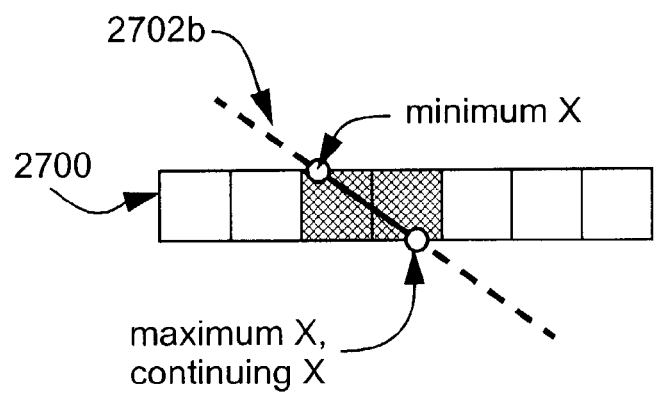

After step 2446, the edge update module 410 de-asserts (clears) the override o flag of the new continuing edge record and emits at step 2448 the new continuing edge record to the edge pool 412 for processing during the next scanline. In the branch formed by steps 2446 and 2448, the two edge records define the extent of the edge within the next scanline. Namely, the new continuing edge record defines the maximum extent and the terminating edge record defines the minimum extent of the edge within the next scanline as will be described below in more detail with reference to FIG. 27B.

Figure 27C:
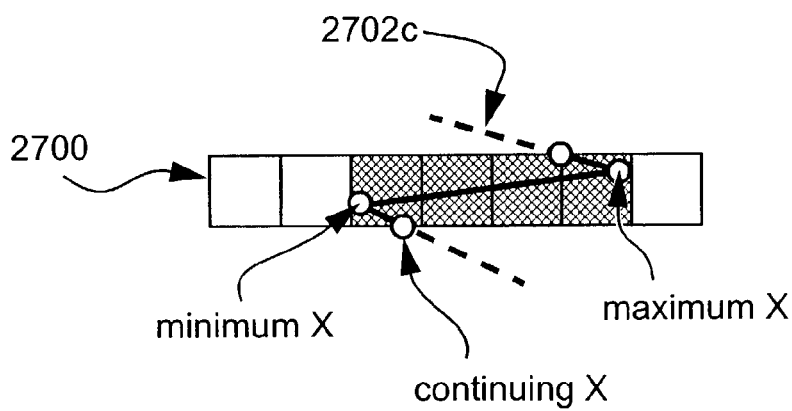

After step 2448, the method terminates at step 2444 and the edge processing module 400 calls the method again in the manner described above. If on the other hand, if the comparison of step 2450, reveals that the new X position is less than the value stored in the register maxX, the edge update module 410 then proceeds to step 2452. In step 2452, the edge update module 410 generates two terminating edge records both having the override o flag asserted and having the X field set to the value stored in the register minX. The edge update module 410 then emits at step 2452 both terminating records to the edge pool 412 for processing during the next scanline. After step 2452, the edge update module 410 then emits at step 2454 the new continuing edge record with the override o flag de-asserted to the edge pool 412 for processing during the next scanline. After completion of step 2454, the edge update module 410 generates at step 2456 a terminating edge record having the override o flag de-asserted and having the X field set to the value stored in the register maxX. In the branch formed by steps 2452, 2454 and 2456, two edge terminating edge records define the extent of the edge within the next scanline. Namely, the terminating edge record having an X value of maxX defines the maximum extent and the terminating edge record having an X value of minX defines the minimum extent of the edge within the next scanline as will be described in more detail with reference to FIG. 27C.

After step 2456, the method terminates 2444 and the edge processing module 400 calls the method again in the manner described above.

In the event the check at step 2420 reveals that NY+dNY<1, the edge update module 410 proceeds to step 2422. In this branch, the edge update module 410 deals with the transition from one segment of the edge to the next segment of the edge. The edge update module 410 increments at step 2422 the dNY value in the dNY register by the NY value in the NY field of the current edge record. The edge update module 410 further increments at step 2423 the X position value in the X field of the current edge record by NY*DX.

After step 2423, the edge update module 410 compares at step 2424 the new X position value of the continuing edge record with the current value stored in the register minx. In the event the comparison at step 2424 reveals that X<minX, the edge update module 410 at 2426 loads the new X position value of the continuing edge record into the register minX and then proceeds to step 2432. On the other hand, if the comparison at step 2424 reveals that X>=minX, the edge update module then compares at step 2428 the new X position value of the continuing edge record with the current value stored in the register maxX. In the event the comparison of step 2428 reveals that X>maxX, the edge update module 410 then loads at step 2430 the new X position value of the continuing edge record into the register maxX and then proceeds to step 2432. Otherwise, if the comparison of step 2428 reveals X<=maxX, the edge update module 410 proceeds directly to step 2432.

During step 2432, the edge update module 410 loads the continuing edge record associated with the next segment in the edge. This is achieved by replacing the values stored in the NY and DX fields in the current continuing edge record with the NY and DX values of the next segment in the edge. It should be noted that the X position of the finishing point of the last segment and the starting point of the next segment is the same, and thus the X position value stored in the X field in the current continuing edge record is in most instances not replaced. However, in the event the next segment contains an XSTEP value, the edge update module 410 adds at step 2434 the XSTEP value to the X position and DX is set to 0. Otherwise, if there is no XSTEP value, the edge update module bypasses this step 2434 and proceeds directly to the comparison 2420 for further processing of the current continuing edge. If the current value of NY+dNY is still less than one, the branch formed by steps 2422–2434 is repeated.

If an edge reached the end of its segment list within the scanline, thus terminating the process before the edge left the scanline, the minimum and maximum extents of its excursion are still required, because the edge has been active within the scanline. The edge is therefore vertically extended to exit the scanline, generating a zero length continuing edge to activate the fill counter. When read in on the next scanline, the edge crossing is generated, but no further tracking is performed. Namely, when the edge update module 410 at step 2432 tries to load the next segment and there is no next segment (end of edge), the edge update module 410 sets the value of NY in the continuing edge record to zero (0) and proceeds directly (not shown) to comparison step 2438. The edge update module 410 then emits the appropriate continuing and terminating edge records (2440, 2442, or 2446, 2448) to the edge pool 412 and then terminates 2444. The edge input module 408 during the processing of the next scanline emits at step 2416 the edge crossing message at the updated value of X and also determines that the current value of NY is NY=0. As NY=0, no further continuing edge records for this edge are required and the edge input module 408 terminates at step 2444. After termination at step 2444, the edge processing module 400 commences processing again in the manner described above.

Other procedures for edge tracking utilizing higher orders differentials in X (e.g., DDX, DDDX) may be used, provided the minimum X and maximum X positions are obtained for an edge's excursion over a scanline.

As can be seen from above, when the edge leaves the current scanline, the updated X position value determined at step 2436 for the next scanline is checked in steps 2438 and 2450 against the minX and maxX registers, and either one or three terminating records are generated in addition to the continuing edge record for the next scanline. These are used to mark the extent of the excursion of the edge within the next scanline, and to activate and deactivate the override counters in their associated levels. Terminating records do not affect the fill counter in the priority determination module 500, however the continuing edge increments or decrements the fill counter in the normal fashion as described above. Furthermore, the X-position value stored in the X field of the continuing edge for the next scanline is the X co-ordinate position at which the edge exits the next scanline.

As is apparent from the flow chart of FIG. 24, there are three alternatives of terminating and continuing edge records combinations that may be emitted to the edge pool 412 for processing during the next scanline. These combinations are described below with reference to FIGS. 27A, 27B, and 27C, which show the next scanline 2700, three different types of current edges 2702a, 2702b, 2702c, and the entry and exit points of the edge into and out of the next scanline. It is important to note that the continuing edge record is always emitted to the edge pool 412 having a updated X position at step 2436 corresponding to the exit point of the edge from the next scanline. The above mentioned possible alternatives are now as follows:

1. If the updated value from step 2436 of the X position of the continuing edge record is less than or equal to the value in the minX register, then in addition to the continuing edge at the updated X position, a terminating record is emitted at the maximum X position (value stored in maxX register) for the next scanline (see FIG. 27A). The override bit is asserted in the continuing edge record, and de-asserted in the terminating record.

2. If the updated X position determined at step 2436 of the continuing edge is greater than or equal to the value stored in the maxX register, then in addition to the continuing edge, a terminating record is emitted at the minimum X position (the value stored in the minX register) for the next scanline (see FIG. 27B). The override bit is asserted in the terminating record, and de-asserted in the continuing edge.

3. If the updated X position at step 2436 of the continuing edge is between the values stored in the minX and maxX registers, then in addition to a continuing edge record emitted at the Updated X position 2436, a terminating record is emitted at the minimum X position (value stored in the minX register), with the override bit set, and another terminating record is emitted at the maximum X position (value stored in the maxX register), with the override bit clear. Because the continuing edge will also have an override bit affecting the override counter, it is paired with a third terminating record, which affects the override count in the opposite sense to the continuing edge (see FIG. 27C).

In all above cases, the levels associated with the generated terminating records are the same as the levels associated with the continuing edge. Furthermore, the position of the extra terminating record to match the continuing edge may be anywhere between the minimum and maximum X positions, provided that the override bit is asserted for the lower X position, and de-asserted for the higher X position.

The addition of an enable bit to the edge record to enable/disable the action of the override bit may be used to eliminate the need for the third terminating record in case 3, above. In case 3, the override bit is disabled, so that the continuing edge only affects the fill counter, and no extra terminating record is then generated.

The continuing edge and the terminating records generated by the edge, as indicated above, are passed on to the edge pool 412 for subsequent sorting by the edge processing module 400, as discussed in the previous section, for subsequent processing of the next scanline. All of the edge records for the next scanline are sorted according to integer X order before being read in for the next scanline. Terminating edge records are sorted in the main list.

The edge processing module also performs the sorting of the edge records according to the X positions on rounded X position values because of the different rounding behaviors associated with the edge records at the minimum and maximum X positions. If edges were sorted on sub-pixel X positions at this stage, it would be possible for two edges, within the same pixel, to appear in the incorrect order. It should be noted however, the sub-pixel X position values in the edge records themselves are not rounded as these sub-pixel values are required for calculation of the X positions values of the next scanline. When sorting on the rounded X position values, the override bit is taken into account, to ensure that the override counter is non-zero for the full range of the pixels touched by the edge on any particular scanline. If the override bit is asserted in an edge record, then the X-position is rounded down to the nearest integer X position, whereas if the override bit is de-asserted in an edge record, then the X-position is rounded up to the nearest integer X position. The rounding operations implemented during this sorting operation are consistent with those implemented during the generation of the edge crossing messages mentioned earlier. For instance, where the second operating mode implements the PostScript™ rasterization rule, the round up and round down operations are implemented as floor(X)+1 and floor(X) operations respectively.

During the processing of a scanline, the edge processing module 400 emits the continuing and terminating edge crossing messages in integer X coordinate order to the priority determination module 500. The priority determination module 500 upon receipt of the terminating and continuing edge crossing messages, increments or decrements the override counter, according to the value of the override bit in the message. Specifically, if the override bit is asserted, the override counter is incremented, and if the override bit is de-asserted, the override counter is decremented.

As described previously, the priority determination module 500 when in the first operating mode determines those priorities that make an active contribution to a currently scanned pixel in a current scanline. A priority is active at a pixel if the pixel is inside the boundary edges that apply to those object(s) associated with that priority, according to the fill-rule for that object(s), and if the clip count for the object(s) is zero. An object at a particular priority level is exposed at a pixel if it is the uppermost active object at that pixel, or if all the active objects above it at that pixel have their corresponding need-below flags set. The priority determination module 500 determines those exposed objects at a current pixel and outputs a fill priority message for each exposed object to the fill color determination module 600. These fill priority messages comprise data related to the fill data of the exposed objects. In this fashion, pixel values may be generated using only the fill data of the exposed objects.

The fill color determination module 600, pixel compositing module 700, pixel output module 800 operate in the manner as described previously, irrespective of whether the edge processing module 400 and priority determination module 500 are operating in the first or second operating mode.

The priority determination module 500 when operating in the second operating mode operates in a somewhat similar fashion to the first operating mode of the priority determination module 500, with the following modifications. In these modifications, the priority determination module 500 determines that the object at that particular priority level is also active along the boundary of the edges of the object from the terminating and continuing edge crossing messages. Specifically, the priority determination module 500 determines the object is active when the associated override count is non-zero, if it is not otherwise clipped. Furthermore, the priority determination module 400 will increment the fill counter in this second operating mode only if the c flag of the edge crossing message is asserted.

Thus, in cases 1 and 2 referred to above, because the range of excursion of an edge is demarcated by two edge records, one of which causes the override counter to be incremented, and the other causing the override counter to be decremented, the override count is non-zero over the range of excursion. Thus the priority determination module 500 determines that the object priority is active between the range of excursion of the edge between the two edge records. Outside the range of excursion, the override count is zero, and the priority determination module 500 thus applies the fill rule according to the first operating mode.

Also, in case 3, between the terminating records at the minimum and maximum X positions, the override count is non-zero, having been incremented once by the terminating record at the minimum X position, and being incremented again between the continuing edge and its paired terminating record, before being decremented again by the terminating record at the maximum X position. Again, outside the range of excursion, the override count is zero, and the fill rule according to the first operating mode applies.

The override count is consistently incremented at the lower X end of an edge record pair, and decremented at the higher X end. Thus, if the ranges of excursion for two edges, which affect the same level, intersect, then the override count on this level in the intersection range has been incremented twice, rather than being allowed to fall back to zero. This ensures that the pixels in the range of excursion of either edge are activated. Obviously, by extension, this occurs if the two edges affect a plurality of common levels, or if there are more than two edges that intersect in this manner.

The method of operation of the edge processing module 400 as described with reference to FIG. 24, does not take into account the processing of the start of the new edges. The driver software described above undertakes this. The driver software does this by translating the page description into the display list and breaking up each object into two or more monotonic edges. In the event any of these monotonic edges is contained within one scanline, then the driver software will join this monotonic edge to an adjacent monotonic edge to form one edge. The driver software then vectorizes the monotonic edges into segments to form new edge records containing a list of the segments. Each of these new edge records contains the flag settings p, u, c, o, d for the edge, its priority level, its starting point, and the segment list for the edge.

Those new edge records that commence at a current scanline are first processed and then loaded into the new edge list 402 in response to an instruction from the edge processing module 400 when the current scanline is to be processed by the edge processing module 400. Specifically, in response to an instruction from the edge processing module 400, the driver software processes each new edge record that starts at the current scanline and generates a corresponding continuing new edge record and terminating record(s). In this regard, the driver software examines the entering and exiting y-values of each new edge at the first scanline the edge is to be loaded at. A continuing and one or more terminating edges are then emitted by the driver software, based on a decision process similar to steps 2438 to 2444 described in FIG. 24. However, in this process "X" is considered to be the exiting x-value of the edge from the first scanline (being the starting x-value of the continuing edge) and minx and maxX are both considered to be equal to x_start. The NY and X fields of the generated continuing edge record are instead calculated at steps 2435 and 2436 as follows:

$$NY = y\_finish - (1 + floor(y\text{-}start))$$

$$X = x\_start + DX^*(ceil(y\_start) - y\_start)$$

The generation of a continuing edge record and terminating edge record by the driver software is described more fully with reference to the example edge shown in FIG. 25. The driver software examines the co-ordinates of starting and finishing points of the edge 2500 that starts at the current scanline (i.e., y=10) and determines the NY and X values in accordance with the above-mentioned formulae. The driver software then compares (2438, 2450) the values minX=maxX=x_start and X to determine which is the maximum and which is the minimum. The driver software determines that X>=maxX=x_start and thus emits 2446 a terminating edge at x_start 2502 and emits 2888 a continuing edge at X 2504. The continuing new edge record and terminating edge record(s) that are generated by the driver software are emitted (at steps 2440, 2442, 2446, 2448, 2452, 2454, 2456) to the new edge list 402. The edge processing module 400 then processes these new edge records in the manner described with reference to FIG. 24.

Alternatively, it is possible to load new edges a scanline ahead of the one where they are first required without generating an edge crossing message to the level activation mechanism. In this case, an offset value provided in the new edge record is used to initialize dNY.

Preferably, the driver software generates in an asynchronous fashion the new edge records ahead of time. The driver software determines whether the edges should be generated in accordance with the first or second operating mode, and generates the new edge records accordingly.

The driver software when operating in the second operating mode calculates at step 2436 the X position value of the new edge record at the exit point of the edge within a current scanline, and also updates at steps 2435 the NY value of the new edge record. Furthermore, the driver software generates terminating edge record(s) having an X position value representing one or both of the minimum or maximum extent of the edge within the current scanline. Once all the new edge records for a current scanline have been generated, the driver software sorts these records according to appropriately rounded X position values. The sorted new edge records are then loaded into the new edge list as part of a LOAD_NEW_EDGES_AND_RENDER instruction prior to the commencement of the processing of the current scanline. The edge processing module then emits at steps 2408 and 2416 edge crossing messages corresponding to these loaded new edge records for the current scanline. The edge processing module then generates continuing edge records having updated X and NY values and terminating edge record(s) for the next scanline. The driver software performs the sorting of the edge records according to rounded values of their X position values in similar fashion to the edge processing module 400.

Preferably, the pixel sequential rendering apparatus 20 and associated driver software operates in the first or second mode of operation on an edge by edge basis. Specifically, the pixel sequential rendering apparatus 20 and driver software interrogate each edge record to determine the state of the p flag. In the event the p flag is de-asserted it operates in the first operating mode and if it is asserted it operates in the second operating mode. The driver software when constructing the edge records from the display list determines whether the image is to be rendered according to PostScript ™ and if so then it asserts the p flag of the edge records.

The driver software and edge processing module 400 when operating in the first operating mode perform substantially the same processes as the second operating mode as depicted in FIG. 24, with the exception that no terminating records are emitted to the edge pool (412). Furthermore, the edge processing module 400 when operating in the first operating mode preferably generates and emits edge crossing messages (see steps 2408, 2416) having integer X position values equal to the rounded value of the X position values of the corresponding edge records. These values are rounded to the nearest integral X position. As discussed previously, the edge processing module 400 when operating in the second operating mode will either round up or down the value of the X position value depending upon the state of the override flag in the corresponding edge record.

The priority determination module 500 when operating in the second operating mode performs substantially the same processes as the first operating mode, with the exception that an override counter is used in the second operating mode. The main significant differences in the operation of the priority determination module are the following. The priority determination module 500 when operating in the first operating mode determines that a level is active when any one of the following conditions occur: fill rule flag de-asserted and fill counter non-zero; or fill rule flag asserted and fill counter odd. On the other hand, the priority determination module 500 when operating in the second operating mode determines a level is active when any one of the following conditions occur: fill rule flag de-asserted and fill counter non-zero; or fill rule flag asserted and fill counter odd; or the override is non-zero.

Figure 28:
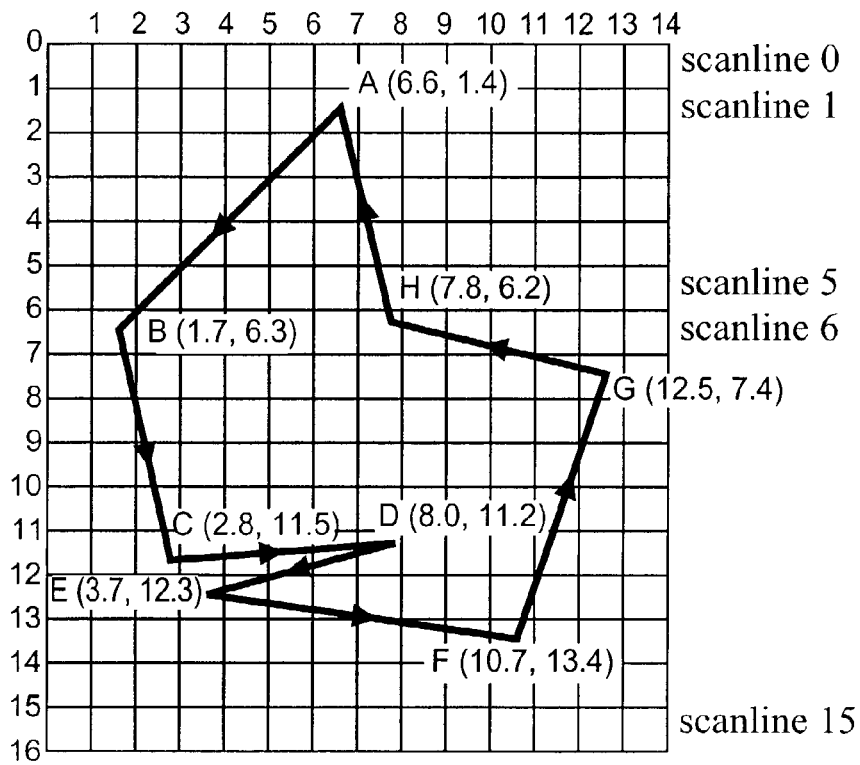
FIG. 28 shows a simple edge, used in the example to demonstrate the activation behavior of a simple object.

Turning now to FIG. 28, there is shown a simple edge, used as an example to demonstrate the activation behavior of a simple object in the second operating mode. The boundary edge ABCDEFGHA represents a graphics object to be rendered. The computer program which translates the page description into the display list (the driver software) separates this boundary into two edges, ABCDEF, heading down the page, and FGHA, which heads up the page and generates two new edge records ABCDEF and AHGF in respect of these edges. The new edge record ABCDEF has its u flag de-asserted, whereas the new edge record AHGF has its u flag asserted to indicate that the edge AHGF was originally upwards-heading as edge FGHA. Note that although the segment CD is also upwards-heading, the edge ABCDEF does not need to be broken at CD, because CD does not cross a scanline boundary.

In the case of edge ABCDEF, segment AB starts at A (6.6, 1.4), and continues to B (1.7, 6.3). The driver software generates a continuing new edge record for ABCDEF for the current scanline, viz scanline 1. The driver software updates (2436) the X position of the edge to X=6.0 [i.e., 6.6+(−1.0)*(ceil(1.4)−1.4)], and updates (2435) the NY value to 4.3 [i.e., 6.3−(1+floor(1.4))] of the continuing new edge record for ABCDEF. The driver software also generates (2442) a terminating record at the other extremum of the X extent of the edge on the first scanline. Thus on scanline 1, the continuing new edge record ABCDEF is first loaded (2440) in the new edge list (402) at X=6.0, and a terminating record (2442) at X=6.6, these two positions defining the extent of the excursion of the edge on scanline 1.

The resulting new edge records loaded in the new edge list (402) for ABCDEF look like:

Continuing edge ABCDEF:

| | |
|---|---|
| Level: | P |
| X: | 6.0 |
| Flags: | POSTSCRIPT |
| | OVERRIDE |
| | !UP |
| | CONTINUING |
| | !DIRECT_CLIP |
| Segments: | |
| | Segment AB |
| | DX = −1.0 |
| | NY = 4.3 |
| | Segment BC |
| | DX = 0.212 |
| | NY = 5.2 |
| | Segment CD |
| | XSTEP = 5.2 |
| | NY = −0.3 |
| | Segment DE |
| | DX = −3.909 |
| | NY = 1.1 |
| | Segment EF |
| | DX = 6.364 |
| | NY = 1.1 |
| | FINISH |

Terminating record A1:

| | |
|---|---|
| Level: | P |
| X: | 6.6 |
| Flags: | POSTSCRIPT |
| | !OVERRIDE |
| | !UP |
| | !CONTINUING |
| | !DIRECT_CLIP |

Note that the o flag (OVERRIDE) is asserted in the continuing edge record and de-asserted in the terminating record. Thus, when the corresponding edge crossing messages are finally emitted at steps 2406 and 2416 to the priority determination module 500, this module 500 increments the override counter at level N at X=floor(6.0)=6 and decrements the override counter at X=floor(6.6)+1=7. As previously described, this rounding is actually undertaken by the edge processing module 400 prior to the emission of the edge crossing messages to the priority determination module 500. When rounding, the override bit is taken into account, to ensure that the override counter is non-zero for the full range of the pixels touched by the edge on any particular scanline. If the override bit is asserted in the edge crossing message, then the X-position is rounded down to the nearest integer X position, whereas if the override bit is de-asserted in the edge crossing message, then the X-position is rounded up to the nearest integer X position. Because only the continuing edge affects the fill count, the priority determination module 400 increments the fill counter on level P only at X=6.0. The priority determination module 500 determines whether to increment the fill counter by determining if the c flag of the edge crossing message is asserted.

The driver software after the generation of the new continuing edge record ABCDEF and terminating edge record A1 in respect of edge ABCDEF for scanline 1, then generates new edge records in respect of edge AHGF. Specifically, the driver software generates a new continuing edge record AHGF and a terminating record A0 for scanline 1 in respect of edge AHGF and emits (2446, 2448) these to the new edge list 402. These new edge records look like:

Terminating record A0:

| | |
|---|---|
| Level: | P |
| X: | 6.6 |
| Flags: | POSTSCRIPT |
| | OVERRIDE |
| | UP |
| | !CONTINUING |
| | !DIRECT_CLIP |

Continuing edge AHFG:

| | |
|---|---|
| Level: | P |
| X: | 6.75 |
| Flags: | POSTSCRIPT |
| | !OVERRIDE |
| | UP |
| | CONTINUING |
| | !DIRECT_CLIP |
| Segments: | |
| | Segment AH |
| | DX = 0.25 |
| | NY = 4.2 |
| | Segment HG |
| | DX = 3.917 |
| | NY = 1.2 |
| | Segment GF |
| | DX = 0.3 |
| | NY = 6.0 |
| | FINISH |

The driver software sorts these edges into increasing integer X order, where rounding X is performed as specified in the edge, so that the order of the loading will be ABCDEF, A0, A1, AHFG.

Returning now to FIG. 24, the first edge record to be read in step 2404 by the edge processing module 400 is the above-mentioned resultant new edge record ABCDEF stored in the edge pool 412. This new edge record ABCDEF is tested at step 2406 to determine whether it is a continuing edge, as indicated by the flag, c (CONTINUING) and tested at step 2412 to determine whether it is a new edge record. On this scanline (i.e., scanline 1), the edge record ABCDEF is a new continuing edge record, so the flags and the X-position (X=6.0) and the first segment of the new edge record ABCDEF is loaded into an active edge record. The active edge is also loaded with the information, NY=4.3 and DX=−1, for the first segment of the edge, AB, and the address of the next segment, BC.

The edge processing module 400 then emits at step 2416 an edge crossing message corresponding to the active edge record AB to the priority determination module 500.

The edge update module 410 then updates at steps 2435 and 2436 the X position and NY values for the active edge record AB for the next scanline, i.e., scanline 2. The continuing edge record AB initially has the values X=6.0, and with DX=−1.0, NY=4.3. The edge update module 410 initializes at step 2418 the internal registers, minX and maxX to X=6.0, and initializes the register dNY at step 2418 to 0. The edge update module 410 then tests at step 2420 the current value of NY+dNY (from step 2420) which it finds to be greater than 1, so the right branch is taken. Then edge update module 410 then decrements at step 2435 the value of NY in the continuing edge record AB by 1, becoming NY=3.3, and DX is added at step 2436 to the value of X in the continuing edge record AB, which becomes X=5.0. The edge update module 410 then tests at step 2438 the updated value X=5.0 in continuing edge record AB against the value currently stored in the register minX=6.0, and is found to be less than minX. Thus the edge update module 410 emits at step 2440 and 2442 to the edge pool 412 a continuing edge having an X value of 5.0, with the o flag (OVERRIDE) asserted, a terminating record having an X value of maxX=6.0, with the o flag (OVERRIDE) de-asserted. The emitted continuing edge contains the following information:

| Active continuing edge ABCDEF: | |
| --- | --- |
| Level: | P |
| X: | 5.0 |
| DX: | −1.0 |
| NY: | 3.3 |
| Flags: | POSTSCRIPT |
|  | OVERRIDE |
|  | !UP |
|  | CONTINUING |
|  | !DIRECT_CLIP |
| Next Segment Address: | Segment BC |

The terminating record emitted to the edge pool 412 includes the following information:

| Terminating record AB2: | |
| --- | --- |
| Level: | P |
| X: | 6.0 |
| Flags: | POSTSCRIPT |
|  | !OVERRIDE |
|  | !UP |
|  | !CONTINUING |
|  | !DIRECT_CLIP |

At this point, the edge tracking process for the edge ABCDEF ceases, and the next edge in X order is read in step 2404 by the edge processing module 400. Assuming that no other objects are active, the next edge to be read in step 2404 is the terminating record A0 (see above) for the edge AHGF (see above). This record A0 marks the minimum X position=6.6 of the segment AH in scanline 1. As the c flag of this record is de-asserted, an edge crossing message for this record is emitted at step 2408 to the priority determination module 500. The edge crossing message is emitted at step 2408 having a X position value of floor(X=6.6)=6 as the override flag is asserted. The edge processing module terminates 2444, and no further action is subsequently undertaken for the record A0.

The next edge to be read in step 2404 is the terminating record A1 (see above), corresponding to the maximum X point of edge ABCDEF on this scanline (scanline 1). As the c flag of this record is de-asserted, an edge crossing message for this record is emitted at step 2408 to the priority determination module 500. The edge crossing message for this record is emitted at step 2408 to the priority determination module 500 at floor(6.6)+1=7 as the override flag is de-asserted. The edge processing module terminates processing at step 2444, and no further action is subsequently undertaken for the record A1.

The final edge record on the scanline (scanline 1) to be read in step 2404 by the edge processing module 500 is the new continuing edge record representing AHFG at X=6.75 (see above). As the c flag is asserted and the edge record is a new edge record, the first segment AH is loaded at step 2414 when the new continuing edge record AHFG is read in. The edge processing module 400 then emits to the priority determination module 500 an edge crossing message corresponding to the first segment AH of the new edge record. This edge crossing message is emitted having a X position value of floor(6.75)+1=7, as the override flag is de-asserted.

After the edge crossing message corresponding to edge record AHFG is emitted, the edge update module 410 then updates the continuing edge record AH for the next scanline (scanline 2). As mentioned previously, the continuing edge record AH has the values X=6.75, DX=0.25 and NY=4.2. Firstly, the edge update module 410 initializes at step 2420 the internal registers minx and MaxX to the X position value (X=6.75) currently in the continuing edge record AH, and initializes at step 2420 dNY to 0. The value NY+dNY is tested and found to be greater than 1, so the right branch is taken. The NY value in the continuing edge record AH is decremented at step 2435 by 1, becoming NY=3.2, and DX is added at step 2436 to the X value in the continuing edge record AH, which becomes X=7.0. Then the current X value of the continuing edge record AH is tested at step 2438 against minx (6.75), and is found to be greater than minX. It is then tested at step 2450 against maxX (6.75), and is found to be greater than maxX. Consequently, a terminating record having a X value of minX=6.75 is emitted at step 2446 to the edge pool 412, with the o flag (OVERRIDE) asserted, and the continuing edge AH having a X value X=7.0 is emitted to the edge pool (412), with the o flag (OVERRIDE) de-asserted. The active continuing edge contains the following information:

| Active continuing edge AHGF: | |
| --- | --- |
| Level: | P |
| X: | 7.0 |
| DX: | 0.25 |
| NY: | 3.2 |
| Flags: | POSTSCRIPT |
|  | !OVERRIDE |
|  | UP |
|  | CONTINUING |
|  | !DIRECT_CLIP |
| Next Segment Address: | Segment HG |

The terminating record emitted to the edge pool (412) includes the following information:

| Terminating record AH2: | |
|---|---|
| Level: | P |
| X: | 6.75 |
| Flags: | POSTSCRIPT |
| | OVERRIDE |
| | UP |
| | !CONTINUING |
| | !DIRECT_CLIP |

At this point the edge tracking process ceases for edge AHGF on scanline 2. Now let us consider the edge crossing messages that were emitted to the priority determination module on scanline 1. These messages copy the state of the flags from the edge record that generated them. The messages are

| Continuing edge ABCDEF: | |
|---|---|
| Level: | P |
| X: | 6 |
| Flags: | POSTSCRIPT |
| | OVERRIDE |
| | !UP |
| | CONTINUING |
| | !DIRECT_CLIP |
| Terminating record A0: | |
| Level: | P |
| X: | 6 |
| Flags: | POSTSCRIPT |
| | OVERRIDE |
| | UP |
| | !CONTINUING |
| | !DIRECT_CLIP |
| Terminating record A1: | |
| Level: | P |
| X: | 7 |
| Flags: | POSTSCRIPT |
| | !OVERRIDE |
| | !UP |
| | !CONTINUING |
| | !DIRECT_CLIP |
| Continuing edge AHGF: | |
| Level: | P |
| X: | 7 |
| Flags: | POSTSCRIPT |
| | OVERRIDE |
| | UP |
| | !DIRECT_CLIP |

In these edge crossing messages, the p flag (POSTSCRIPT) enables the override counter in the level activation table of the priority determination module 500. If the override counter is enabled, then the o flag (OVERRIDE) of the edge crossing messages increments the override counter when asserted and decrements the override counter when de-asserted. Also, the c flag (CONTINUING) of the edge crossing messages enables the fill counter, and if the fill counter is enabled, then the u flag (UP) increments the fill counter when asserted, and decrements the fill counter when de-asserted.

Thus, the first edge crossing message (ABCDEF) to the priority determination module 500 increments the override counter and decrements the fill counter at pixel 6, so that fill count=−1, override count=1. A run of pixels is generated with no fill activated for pixels 0 to 5.

The second edge crossing message (A0) increments the override counter again, at pixel 6, so that the fill count=−1, and the override count=2. Because this edge crossing message affects the current pixel, no pixel run is generated.

The third edge crossing message (A1) decrements the override counter at pixel 7, so that the fill count=−1, and the override count=1. A run of pixels is generated with level P active for pixel 6.

The fourth edge crossing message (AHGF) increments the fill counter and decrements the override counter at pixel 7, so that fill count=0 and override count=0. Because this edge crossing message affects the current pixel, no pixel run is generated.

When another edge crossing message is encountered, or the end of scanline message is received, a run of pixels is generated with no fill activated from pixel 7 through to the next edge, or the end of the scanline, accordingly.

Now, with respect to the edges shown in FIG. 28, consider the operations on scanline 5, and in particular to the edge tracking for scanline 6. On scanline 5, the edge records in the edge list are:

| Active continuing edge ABCDEF: | |
|---|---|
| Level: | P |
| X: | 2.0 |
| DX: | −1.0 |
| NY: | 0.3 |
| Flags: | POSTSCRIPT |
| | OVERRIDE |
| | !UP |
| | CONTINUING |
| | !DIRECT_CLIP |
| Next Segment Address: | Segment BC |
| Terminating record AB5: | |
| Level: | P |
| X: | 3.0 |
| Flags: | POSTSCRIPT |
| | !OVERRIDE |
| | !UP |
| | !CONTINUING |
| | !DIRECT_CLIP |
| Terminating record AH2: | |
| Level: | P |
| X: | 7.5 |
| Flags: | POSTSCRIPT |
| | OVERRIDE |
| | UP |
| | !CONTINUING |
| | !IRECT_CLIP |
| Active continuing edge AHGF: | |
| Level: | P |
| X: | 7.75 |
| DX: | 0.25 |
| NY: | 0.2 |
| Flags: | POSTSCRIPT |
| | !OVERRIDE |
| | UP |
| | CONTINUING |
| | !DIRECT_CLIP |
| Next Segment Address: | Segment HG |

On scanline 5, active edge ABCDEF is read in first(2404) by the edge input module 408, and emits at step 2416 an edge crossing message at pixel 2 (X=2.0), and is passed to the edge update module (410). After the minX, maxX and dNY registers have been initialized at step 2418, (NY+dNY)

is determined at step 2420 to be 0.3, which is less than one. Thus the left branch is taken.

At the next step, NY (=0.3) of the continuing edge record ABCDEF is added at step 2422 to dNY (=0), so that dNY becomes 0.3, and then NY*DX is added at step 2423 to the current X value of the continuing edge ABCDEF, which becomes 2.0+0.3*(−1.0)=1.7.

The current X value of the continuing edge ABCDEF, 1.7, is then tested at step 2424 against minX (=2.0) and found to be less than this value, so X is loaded at step 2426 into the register minX, which now has the value 1.7.

Next, the new segment, segment BC is read in step 2432. There is no initial XSTEP value for BC so after the new segment BC is read in, the active edge record ABCDEF contains the following:

| Active continuing edge ABCDEF: | |
| --- | --- |
| Level: | P |
| X: | 1.7 |
| DX: | 0.212 |
| NY: | 5.2 |
| Flags: | POSTSCRIPT |
|  | OVERRIDE |
|  | !UP |
|  | CONTINUING |
|  | !DIRECT_CLIP |
| Next Segment Address: | Segment CD |

The current value of NY+dNY is re-checked at step 2420, and found to be 5.2+0.3, which is greater than one, so the right branch is taken. The remaining Y extent of the segment is determined by subtracting at step 2435 the value (1−dNY) from the current value of NY in the continuing edge record. The scanline exit point of the edge is determined by adding at step 2436 the value (1−dNY)*DX=(1−0.3)*0.212=0.1484 to the current X position value of the continuing edge record ABCDEF. The current value of X (1.8484) of the continuing edge record ABCDEF is then tested at steps 2438 and 2450 against minX (1.7) and maxX (2.0), and is found to lie between these values. Therefore, two terminating records having a X position value of minX (1.7) are emitted at step 2452 to the edge pool 412 with override asserted. The continuing edge ABCDEF having a X position value of 1.8484 is emitted at step 2454 to the edge pool 412 with override de-asserted, and a third terminating record having a X position value of maxX (2.0) is emitted 2456 to the edge pool 412 with override de-asserted.

Similarly, on the same scanline, segment AH of continuing edge record AHGF finishes, and segment HG is loaded at step 2432, and tracked to the point at which it leaves scanline 6. The edge AHGF enters the scanline at X=7.75, and is tracked to X=7.8, dNY=0.2, before segment HG is read in at step 2432, so Xmin=7.75 and Xmax=7.8. The latter being updated at step 2430 prior to the loading at step 2432 of segment HG. The edge AHGF leaves scanline 6 at X=10.93, which is greater than Xmax, so one terminating record having a X position value of Xmin=7.75, and with the o flag asserted is emitted at step 2446 to the edge pool 402. In addition, the continuing edge record AHGF having an X position value of 10.93, and the o flag de-asserted is emitted at step 2448 to the edge pool 402.

So, when the sorted edges are read in at step 2404 on scanline 6, the following edge crossing messages are sent to the priority determination module 500:

| Terminating record BC0: | |
| --- | --- |
| Level: | P |
| X: | 1 |
| Flags: | POSTSCRIPT |
|  | OVERRIDE |
|  | !UP |
|  | !CONTINUING |
|  | !DIRECT_CLIP |
| Terminating record BC1: | |
| Level: | P |
| X: | 1 |
| Flags: | POSTSCRIPT |
|  | OVERRIDE |
|  | !UP |
|  | !CONTINUING |
|  | !DIRECT_CLIP |
| Continuing edge ABCDEF: | |
| Level: | P |
| X: | 2 |
| Flags: | POSTSCRIPT |
|  | !OVERRIDE |
|  | !UP |
|  | CONTINUING |
|  | !DIRECT_CLIP |
| Terminating record BC2: | |
| Level: | P |
| X: | 2 |
| Flags: | POSTSCRIPT |
|  | !OVERRIDE |
|  | !UP |
|  | !CONTINUING |
|  | DIRECT_CLIP |
| Terminating record HG0: | |
| Level: | P |
| X: | 7 |
| Flags: | POSTSCRIPT |
|  | OVERRIDE |
|  | UP |
|  | !CONTINUING |
|  | !DIRECT_CLIP |
| Continuing edge AHGF: | |
| Level: | P |
| X: | 11 |
| Flags: | POSTSCRIPT |
|  | !OVERRIDE |
|  | UP |
|  | CONTINUING |
|  | !DIRECT_CLIP |

Figure 29:
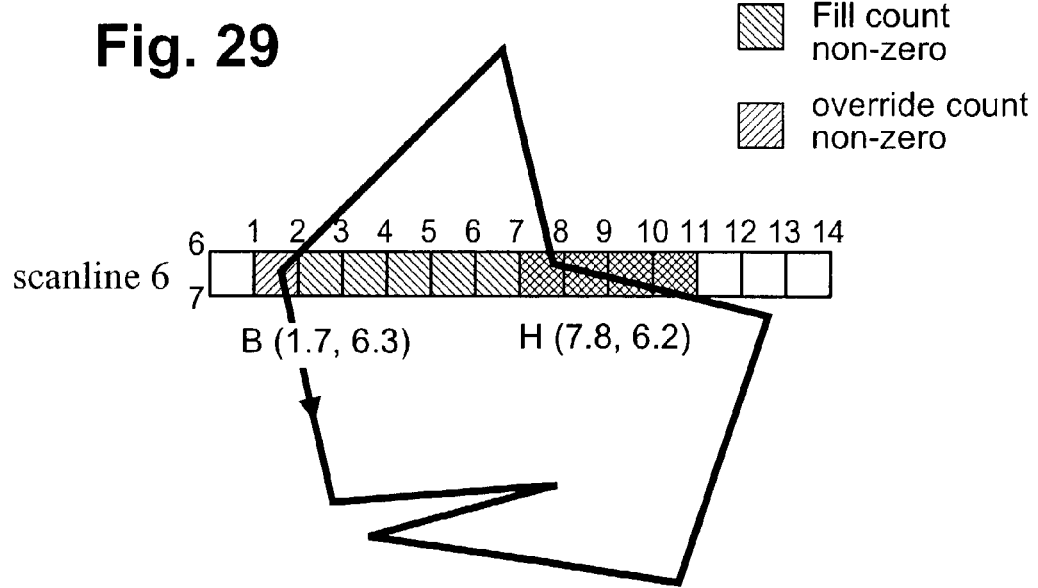
FIG. 29 shows the activation behavior of the object shown in FIG. 28 on a scanline discussed in the example.

The resulting filled area by the pixel sequential rendering apparatus 20 in response to these edge crossing messages sent to the priority determination module 500 is shown in FIG. 29. The first edge crossing message BC0 is received by the priority determination module 500 at pixel 1, so pixel 0 is emitted with level P deactivated. Namely, pixel 0 is not filled. For pixel 1, the override counter in the priority determination module 500 for level P is incremented twice by the first two messages received (BC0 and BC1). Thus level P is activated for pixel 1 by these messages. Furthermore the fill count on level P remains on zero and is not incremented or decremented, because these messages (BC0 and BC1) are not continuing edge messages. The next message received (ABCDEF) by the priority determination module 500 is for pixel 2, so level P is activated for pixel 1 because the override count is non-zero. Message ABCDEF decrements the override count and increments the fill count at pixel 2, and is followed by message BC2, which decrements the override count once more. The next message received (HG0) is for pixel 7, so for pixels 2–6, the override count is zero, and the fill count is 1, so level P still remains activated for pixels 2–6. Note that the override count is zero for pixels which are not touched by the edge: for these pixels, the fill count and the fill rule determine whether a pixel is activated. Message HG0 increments the override counter at pixel 7, and the remaining message (AHGF) is for pixel 11, so for pixels 7–10, the override count is 1, and the fill count is 1, so level P remains activated for these pixels. Message AHGF decrements the fill count and the override count at pixel 11, so for the remaining pixels, the fill and override counts are both zero. When another edge crossing message from another object, or the end of scanline message is received, the remaining pixels starting at 11 are emitted with level N deactivated.

Another embodiment relates to a fully software implementation of the pixel sequential rendering apparatus 20. The software implementation comprises an edge software module that allows the filling in of pixel spans by utilising a linked list of edge records defining the edges of the objects for a current scanline. This edge software module is substantially functionally equivalent to the edge processing module 400. However there are a number of significant functional differences, which will now be described.

In similar fashion to the edge processing module 400 previously described, the edge software module can operate in two or more operating modes. In both the first and second operating modes, the driver software generates continuing edge and terminating edge records, in a similar fashion as previously described. In this embodiment, these continuing and terminating edge records are supplied to the edge software module.

In the second operating mode of the edge software module, the linked list of edge records includes one or more sets of two edge records, wherein each set comprises an edge record of a first type (hereinafter called a shadow edge record) and an edge record of a second type (hereinafter called an original edge record). The shadow and original edge records of a set respectively define a first edge (hereinafter called a shadow edge) and a second edge (hereinafter called an original edge) associated with an edge of an object for a current scanline.

The shadow and original edge records both have the same structure. This structure is substantially as shown and described with reference to FIG. 14A with the following modifications. In addition to the fields shown in FIG. 14A, the shadow and original edge records both contain a further field X.pixel (not shown) for storing integer values. A shadow edge record stores in the X.pixel field the rounded down value of the X co-ordinate of the minimum extent of the edge within a current scanline, with respect to a direction along the scanline. On the other hand, an original edge record stores in the X.pixel field the rounded up value of the X co-ordinate of the maximum extent of the edge within a current scanline, with respect to the same direction along the scanline. The edge records contain a further field (not shown) for containing a pointer (S), which is used by the original edge record for referencing its associated shadow edge record. This last mentioned field in the shadow edge records is not used and is set to Null. Each shadow edge record stores in its X field as a fractional value the X co-ordinate of the exiting position of its associated edge from the current scanline in the X field. It also has its override flag o asserted. On the other hand, the X field of the original edge record is set to Null as this value can be obtained by referencing its associated shadow edge record via the pointer (S). The original edge record has its override flag de-asserted. The shadow edge records also have a field called X.max for storing the rounded up value of the X co-ordinate of the maximum extent of the edge within the current scanline. This field is set to Null in the original edge record.

The linked list may also include continuing and terminating edge records. As mentioned previously, the driver software generates a continuing edge record and terminating edge record for each new edge commencing at a current scanline. These new continuing and terminating edge records are merged into the linked list during the current scanline. After rendering of the current scanline, the terminating edge is discarded from the linked list and the continuing edge record is converted to a shadow or original edge record as appropriate. These shadow, original, continuing, and terminating edge records all have the same structure (ie fields). The c flag (see FIG. 14A) of all these edge records has two bits so as to designate whether the edge record in the linked list is a shadow, original, continuing or terminating edge record. The pointer (S) field is not used by the continuing and terminating edge records and is set to Null.

A continuing edge record stores in its X field as a fractional value the X co-ordinate of the exiting position of its associated edge from the current scanline. A terminating edge record has its X field set to Null. An asserted override flag o in a continuing or terminating edge record indicates that the rounded down value of the X co-ordinate of the minimum extent is stored in the X.pixel field. On the other hand, a de-asserted override flag o in a continuing or terminating edge record indicates that the rounded up value of the X co-ordinate of the maximum extent is stored in the X.pixel field.

In the second operating mode, the edge software module at the commencement of a new scanline retrieves any continuing and terminating edge records generated by the driver software for the new scanline and merges them into the linked list. After merging, the edge records of the linked list are sorted according to the integral X values stored in the field X.pixel. The edge software module then passes the merged linked list for this new scanline to further software modules for implementing the operations of the priority determination module, fill color determination module, pixel compositing module and output module for rendering. The linked list is also retained for updating by the edge software module for the next scanline. The edge software module updates each set of associated shadow and original edge records, terminating edge records, and continuing edge records in the linked list in turn. The software retrieves in turn the first edge record in the list not previously updated for the new scanline.

The software then checks whether this edge record is a terminating, continuing, shadow, or an original edge record. If the edge record is a terminating edge record it is deleted from the linked list and then the software proceeds to the next edge record in the list. If the edge record is a shadow edge record the software calculates from fields in the edge record (e.g., X, NY, DW, SEGMENT ADDR) the following: the exiting position of the edge from the next scanline (new X value) and stores this in the X field of the shadow edge record, the rounded down value of the minimum X position of the edge within the next scanline and stores this in the X.Pixel field of the shadow edge record, the rounded up value of the maximum X position of the edge within the next scanline and stores this in the X.max field of the shadow edge record and if the edge defined by this shadow edge terminates in the next scanline then a willTerminate flag of the record is set. The software then proceeds to the next unprocessed edge in the list. If the edge record is an original edge record then the software uses the S pointer in the edge record to reference the associated shadow edge record and the X.Pixel field of the original edge is set to the same value as the X.max value in the referenced shadow edge record. If the wiliTerminate flag in the referenced shadow edge record is set, then the software deletes both the shadow and the original edge records from the list. The software then proceeds to the next unprocessed edge in the list. If the edge record is a continuing edge record it is converted to an original and shadow edge pair by creating a new edge record, inserting this new edge record before the continuing edge record in the list, setting all fields in the new edge record to have the same values as the corresponding fields in the continuing edge record, selling the c flag in the new edge record to indicate that it is a shadow edge record, selling the c flag in the continuing edge record to indicate that it is now an original edge record, setting the override flag o correctly for both edge records, setting the S pointer of the now original edge record to point to the new shadow edge, updating both these edge records as described above for shadow and original edge records. The software then proceeds to the next unprocessed edge in the list.

After the processing of existing edge records of the linked list have been completed, the software then checks whether new continuing and terminating edge records commence at the next scanline. If so, then the new continuing and terminating edge records are merged into the linked list. The software then sorts the linked list according to field X.pixel in increasing X order and passes the linked list to further software modules for implementing the operations of the priority determination module, fill color determination module, pixel compositing module and output module for rendering. The edge software module then again updates the linked list for the next scanline. The software continues in this fashion until all scanlines are processed.

It will be apparent to a person skilled in the art that a shadow edge of an edge will always fall on one side of an edge, whereas the original edge will always fall on the other side of the edge. On the other hand, a continuing edge of an edge will fall on one side of an edge having a negative slope and the other side of an edge having a positive slope, and vice versa for the terminating edge.

In a variation of this latter embodiment, the driver software instead generates new shadow and original edge records.

The purpose of the 'shadow' and 'original' edges are to mimic the behavior of termination and continuation edges, however the 'shadow' edges exist for the same number of scanlines as the original edge. Thus they are created and destroyed once for the duration of the original edge record, as distinct from the previously described termination edges that are created and destroyed on each scanline. Thus, this software implementation allows for a more efficient processing of the edges than a software equivalent of the hardware version that creates and destroys edge records for each scanline.

In the first operating mode of the edge software module, the linked list of edge records includes only original edge records. In the first operating mode of the edge software module, the linked list of edge records includes only continuing edge records. In this operating mode continuing edge records are updated according to the method described above for updating shadow edges with the exception that if the edge terminates in the next scanline then the edge is deleted and removed from the linked list instead of setting the willTerminate flag.

The aforementioned preferred processes implemented by the computer system 1 comprise a particular control flow. There are many other variants of the preferred processes which use different control flows without departing from the spirit or scope of the invention. Furthermore one or more of the steps of the preferred method(s) may be performed in parallel rather than sequentially.

INDUSTRIAL APPLICABILITY

It is apparent from the above that the arrangements described are applicable to computer graphics and printing industries.

The foregoing describes only some embodiments of the present invention, and modifications and/or changes can be made thereto without departing from the scope and spirit of the invention, the embodiments being illustrative and not restrictive.

TABLE 2

| Raster operation code | Operation | Comment |
| --- | --- | --- |
| 0x00 | r = 0 | BLACKNESS |
| 0x01 | r = src & dest | SRCAND |
| 0x02 | r = src & ~dest | SRCERASE |
| 0x03 | r = src | SRCCOPY |
| 0x04 | r = ~src & dest | |
| 0x05 | r = dest | |
| 0x06 | r = src ^ dest | SRCINVERT |
| 0x07 | r = src | dest | SRCPAINT |
| 0x08 | r = ~(src | dest) | NOTSRCERASE |
| 0x09 | r = ~(src ^ dest) | |
| 0x0a | r = ~dest | DSTINVERT |
| 0x0b | r = src | ~dest | |
| 0x0c | r = ~src | NOTSRCCOPY |
| 0x0d | r = ~src | dest | MERGEPAINT |
| 0x0e | r = ~(src & dest) | |
| 0x0f | r = 0xff | WHITENESS |
| 0x10 | r = min(src, dest) | |
| 0x11 | r = max(src, dest) | |
| 0x12 | r = clamp(src + dest) | |
| 0x13 | r = clamp(src − dest) | |
| 0x14 | r = clamp(dest − src) | |
| 0x15 | r = clamp(src + dest) | |

We claim:

1. A method of activating a filling of a graphical object, the method comprising the steps of:

generating, for a current scanline, a plurality of edge records associated with an edge of the object from a previously generated said edge record for a previous scanline, wherein one of said edge records for the current scanline comprises fractional data which defines a minimum position of the edge within the current scanline or on a border thereto with respect to a direction along said current scanline, one of said edge records for the current scanline comprises fractional data which defines a maximum position of the edge within the current scanline or on a border thereto with respect to a direction along said current scanline, and one of said edge records for the current scanline comprises fractional data which defines an exit position of the edge from the current scanline, and wherein said previously generated edge record comprises fractional data defining a exit point of the edge from the previous scanline; and activating, for the current scanline, the filling of the graphical object over a run of pixels or pixel from a minimum pixel position to a maximum pixel position, wherein said minimum pixel position is derived from rounding down a value equal to said fractional data of said edge record defining said minimum position, and said maximum pixel position is derived from rounding up a value equal to said fractional data of said edge record defining said maximum position.

2. The method as claimed in claim 1, wherein each said edge record includes a flag for distinguishing between those said edge records defining the minimum and maximum positions.

3. The method as claimed in claim 1, wherein said method further comprises the step of activating, for the current scanline, the filling of the object over a run of pixels or pixel within the object.

4. The method as claimed in claim 2, wherein said method further comprises:
   incrementing a first counter when one said edge record comprises said flag indicating the fractional data defines a minimum position of the edge within the current scanline;
   decrementing the first counter when one said edge record comprises said flag indicating the fractional data defines a maximum position of the edge within the current scanline;
   activating, for the current scanline, the filling of the object over a run of pixels or pixel from a minimum pixel position to a maximum pixel position when the first counter becomes non-zero.

5. A method as claimed in claim 4, wherein said method further comprises the step of:
   activating, for the current scanline, the filling of the object over a run of pixels or pixel within the object, wherein said step comprises the sub-steps of:
   incrementing a fill counter when the edge record for the current scanline comprises fractional data defining a exit point of the edge and a flag indicating the edge has a first direction;
   decrementing a fill counter when the edge record for the current scanline comprises fractional data defining a exit point of the edge and a flag indicating the edge has a second direction; and
   activating, for the current scanline, the filling of the object over a run of pixels or pixel within the object when said first counter becomes zero and said fill counter is in a predetermined state.

6. A method as claimed in claim 5, wherein said filling of the object is performed according to a non-zero winding fill rule and said object is activated when said fill counter is non-zero and said first counter is zero.

7. A method as claimed in claim 5, wherein said filling of the object is performed according to an odd-even fill rule and said object is activated when said fill counter is odd and said first counter is zero.

8. A method as claimed in claim 1, wherein said edge records include a flag for identifying those said edge records that comprise fractional data which defines an exit position of the edge from the current scanline or previous scanline.

9. A method as claimed in claim 1, wherein the minimum position of the edge within the current scanline or on a border thereto with respect to a direction along said current scanline corresponds to the exit position of the edge from the current scanline, and said edge record for a current scanline comprises two edge records, one comprising fractional data defining said minimum position and one comprising fractional data defining said maximum position.

10. A method as claimed in claim 1, wherein the maximum position of the edge within the current scanline or on a border thereto with respect to a direction along said current scanline corresponds to the exit position of the edge from the current scanline, and said edge record for a current scanline comprises two edge records, one comprising fractional data defining said minimum position and one comprising fractional data defining said maximum position.

11. A method as claimed in claim 1, wherein the exit position of the edge from the current scanline lies between the maximum position of the edge within the current scanline or on a border thereto with respect to a direction along said current scanline and the minimum position of the edge within the current scanline or on a border thereto with respect to a direction along said current scanline and edge records comprise four edge records, two comprising said fractional data defining said minimum position, one comprising said fractional data defining said exit position, and one comprising said fractional data defining said maximum position.

12. A method as claimed in claim 1, wherein the exit position of the edge from the current scanline lies between the maximum position of the edge within the current scanline or on a border thereto with respect to a direction along said current scanline and the minimum position of the edge within the current scanline or on a border thereto with respect to a direction along said current scanline and edge records comprise three edge records, one comprising said fractional data defining said minimum position, one comprising said fractional data defining said exit position, and one comprising said fractional data defining said maximum position.

13. A method as claimed in 1, wherein said method performs said generating and activating steps in one mode of operation and said method performs the following steps in another mode of operation:
   generating, for a current scanline, an edge record associated with said edge from a previously generated said edge record for a previous scanline, wherein said edge record for the current scanline comprises fractional data which defines an exit position of the edge from the current scanline, and said previously generated edge record comprises fractional data defining a exit point of the edge from the previous scanline; and
   activating, for the current scanline, the filling of an object over a run of pixels or pixel within the object commencing at a scanline location equal to a rounded value of said fractional data defining said exit point.

14. A method as claimed in claim 13, wherein said rounded value is obtained by rounding up said fractional data defining said exit point.

15. A method as claimed in claim 13, wherein said rounded value is obtained by rounding down said fractional data defining said exit point.

16. A method as claimed in claim 2, wherein said minimum pixel position is derived from rounding down a value equal to said fractional data of said edge record defining said minimum position in response to a first state of the flag, and said maximum pixel position is derived from rounding up a value equal to said fractional data of said edge record defining said maximum position in response to a second state of the flag.

17. A method as claimed in claim 1, wherein said exit position of the edge from the current scanline is derived from the exit position of the edge from the previous scanline and the slope of the edge.

18. A method as claimed in claim 1, wherein said edge comprises a plurality of straight segments and said exit position of the edge from the current scanline is derived from the exit position of the edge from the previous scanline and data defining one or more said straight line segments.

19. A method as claimed in claim 1, wherein a page description language defines the graphical object, and when the page description language is of a particular type, the method performs said generating and activating steps, and when the page description language is of another type, the method performs different steps.

20. Apparatus for activating a filling of a graphical object, the apparatus comprising:
   a module for generating, for a current scanline, a plurality of edge records associated with an edge of the object from a previously generated said edge record for a previous scanline, wherein one of said edge records for the current scanline comprises fractional data which defines a minimum position of the edge within the current scanline or on a border thereto with respect to a direction along said current scanline, one of said edge records for the current scanline comprises fractional data which defines a maximum position of the edge within the current scanline or on a border thereto with respect to a direction along said current scanline, and one of said edge records for the current scanline comprises fractional data which defines an exit position of the edge from the current scanline, and wherein said previously generated edge record comprises fractional data defining a exit point of the edge from the previous scanline; and
   a module for activating, for the current scanline, the filling of the graphical object over a run of pixels or pixel from a minimum pixel position to a maximum pixel position, wherein said minimum pixel position is derived from rounding down a value equal to said fractional data of said edge record defining said minimum position, and said maximum pixel position is derived from rounding up a value equal to said fractional data of said edge record defining said maximum position.

21. A computer program for activating a filling of a graphical object, the computer program comprising:
   code for generating, for a current scanline, a plurality of edge records associated with an edge of the object from a previously generated said edge record for a previous scanline, wherein one of said edge records for the current scanline comprises fractional data which defines a minimum position of the edge within the current scanline or on a border thereto with respect to a direction along said current scanline, one of said edge records for the current scanline comprises fractional data which defines a maximum position of the edge within the current scanline or on a border thereto with respect to a direction along said current scanline, and one of said edge records for the current scanline comprises fractional data which defines an exit position of the edge from the current scanline, and wherein said previously generated edge record comprises fractional data defining a exit point of the edge from the previous scanline; and
   code for activating, for the current scanline, the filling of a graphical object over a run of pixels or pixel from a minimum pixel position to a maximum pixel position, wherein said minimum pixel position is derived from rounding down a value equal to said fractional data of said edge record defining said minimum position, and said maximum pixel position is derived from rounding up a value equal to said fractional data of said edge record defining said maximum position.

22. A method of activating a filling of a graphical object, the method comprising the steps of:
   generating, for a current scanline, three edge records associated with an edge of the object from a previously generated said edge record for a previous scanline, wherein one of said edge records for the current scanline comprises data which defines a rounded down value of a minimum position of the edge within the current scanline or on a border thereto with respect to a direction along said current scanline, one of said edge records for the current scanline comprises data which defines a rounded up value of a maximum position of the edge within the current scanline or on a border thereto with respect to a direction along said current scanline, and one of said edge records for the current scanline comprises fractional data which defines an exit position of the edge from the current scanline, and wherein said previously generated edge record comprises fractional data defining a exit point of the edge from the previous scanline; and
   activating, for the current scanline, the filling of the graphical object over a run of pixels or pixel from the rounded down value to the rounded up value.

23. The method as claimed in claim 22, wherein each said edge record includes a flag distinguishing between those said edge records defining said rounded down value and rounded up value.

24. A method as claimed in claim 22, wherein a page description language defines the graphical object, and when the page description language is of a particular type, the method performs said generating and activating steps, and when the page description language is of another type, the method performs different steps.

25. Apparatus for activating a filling of a graphical object, the apparatus comprising:
   means for generating, for a current scanline, three edge records associated with an edge of the object from a previously generated said edge record for a previous scanline, wherein one of said edge records for the current scanline comprises data which defines a rounded down value of a minimum position of the edge within the current scanline or on a border thereto with respect to a direction along said current scanline, one of said edge records for the current scanline comprises data which defines a rounded up value of a maximum position of the edge within the current scanline or on a border thereto with respect to a direction along said current scanline, and one of said edge records for the current scanline comprises fractional data which defines an exit position of the edge from the current scanline, and wherein said previously generated edge record comprises fractional data defining a exit point of the edge from the previous scanline; and
   means for activating, for the current scanline, the filling of the graphical object over a run of pixels or pixel from the rounded down value to the rounded up value.

26. A computer program for activating a filling of a graphical object, the computer program comprising:
   code for generating, for a current scanline, three edge records associated with an edge of the object from a previously generated said edge record for a previous scanline, wherein one of said edge records for the current scanline comprises data which defines a rounded down value of a minimum position of the edge within the current scanline or on a border thereto with respect to a direction along said current scanline, one of said edge records for the current scanline comprises data which defines a rounded up value of a maximum position of the edge within the current scanline or on a border thereto with respect to a direction along said current scanline, and one of said edge records for the current scanline comprises fractional data which defines an exit position of the edge from the current scanline, and wherein said previously generated edge record comprises fractional data defining a exit point of the edge from the previous scanline; and code for activating, for the current scanline, the filling of the graphical object over a run of pixels or pixel from the rounded down value to the rounded up value.

27. A method of activating a filing of a graphical object, the method comprising the steps of:

generating, for a current scanline, a plurality of edge records associated with an edge of the object from a previously generated said edge record for a previous scanline, wherein one of said edge records for the current scanline comprises fractional data which defines a minimum position of the edge within the current scanline or on a border thereto with respect to a direction along said current scanline, and one of said edge records for the current scanline comprises fractional data which defines a maximum position of the edge within the current scanline or on a border thereto with respect to a direction along said current scanline; and activating, for the current scanline, the filing of the graphical object over a run of pixels or pixel from a minimum pixel position to a maximum pixel position, wherein said minimum pixel position is derived from rounding down a value equal to said fractional data of said edge record defining said minimum position, and said maximum pixel position is derived from rounding up a value equal to said fractional data of said edge record defining said maximum position.

* * * * *

UNITED STATES PATENT AND TRADEMARK OFFICE
CERTIFICATE OF CORRECTION

PATENT NO.        : 7,023,439 B2
APPLICATION NO. : 10/283237
DATED              : April 4, 2006
INVENTOR(S)      : Michael Anthony Martin et al.

It is certified that error appears in the above-identified patent and that said Letters Patent is hereby corrected as shown below:

COLUMN 6:

Line 64, "he" should read --the--.

COLUMN 17:

Lines 20 to 40 should be deleted.

COLUMN 18:

Line 1, "size" should read --sized--.

COLUMN 31:

Line 11, "Scr_Active" should read --Src_Active--.
Line 18, "S∩D" should read --S∩$\bar{D}$--.

COLUMN 36:

Line 43, "PostScriPt$^{TM}$" should read --PostScript$^{TM}$--.

COLUMN 39:

Line 19, "minx." should read --minX.--.

COLUMN 43:

Line 25, "minx" should read --minX--.

COLUMN 47:

Line 31, "dc-asserted" should read --de-asserted--.

COLUMN 48:

Line 36, "minx" should read --minX--.
Line 45, "minx" should read --minX--.

UNITED STATES PATENT AND TRADEMARK OFFICE
CERTIFICATE OF CORRECTION

PATENT NO. : 7,023,439 B2
APPLICATION NO. : 10/283237
DATED : April 4, 2006
INVENTOR(S) : Michael Anthony Martin et al.

It is certified that error appears in the above-identified patent and that said Letters Patent is hereby corrected as shown below:

COLUMN 50:

Line 51, "!IRECT_CLIP" should read --!DIRECT_CLIP--.

COLUMN 55:

Line 6, "wili Terminate" should read --will Terminate--.
    Line 15, "selling" should read --setting--.
    Line 16, "selling" should read --setting--.

COLUMN 61:

Line 13, Claim 27 "filing" should read --filling--.

COLUMN 62:

Line 9, Claim 27 "filing" should read --filling.

Signed and Sealed this

Twentieth Day of November, 2007

JON W. DUDAS
*Director of the United States Patent and Trademark Office*